(12) United States Patent
Li

(10) Patent No.: US 8,851,093 B2
(45) Date of Patent: *Oct. 7, 2014

(54) ADJUSTABLE ROTATION BASE

(75) Inventor: Wanda Ying Li, Irvine, CA (US)

(73) Assignee: Oliver Joen-An Ma, Arcadia, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/507,690

(22) Filed: Jul. 21, 2012

(65) Prior Publication Data

US 2012/0285497 A1   Nov. 15, 2012

Related U.S. Application Data

(63) Continuation of application No. 13/134,293, filed on Jun. 3, 2011, which is a continuation-in-part of application No. 12/658,666, filed on Feb. 12, 2010, now abandoned, which is a continuation-in-part of application No. 12/590,942, filed on Nov. 16, 2009, now Pat. No. 7,891,633, and a continuation-in-part of application No. 12/069,759, filed on Feb. 12, 2008, now Pat. No. 7,641,165, which is a continuation-in-part of application No. 11/807,661, filed on May 29, 2007, now Pat. No. 7,513,479.

(51) Int. Cl.

| A45B 23/00 | (2006.01) |
|---|---|
| F16M 13/00 | (2006.01) |
| E04H 12/22 | (2006.01) |
| A45B 25/14 | (2006.01) |
| A45B 25/00 | (2006.01) |
| A45B 17/00 | (2006.01) |

(52) U.S. Cl.
CPC ........... *A45B 23/00* (2013.01); *A45B 2025/003* (2013.01); *A45B 2017/005* (2013.01); *E04H 12/2238* (2013.01); *A45B 25/14* (2013.01); *Y10S 135/912* (2013.01)
USPC ............... 135/16; 135/98; 135/912; 248/519; 248/522

(58) Field of Classification Search
CPC ........... A45B 23/00; A45B 2023/0012; A45B 2017/005; A45B 3/00; F16M 13/00; F16M 7/00; F16M 2200/08; E04H 12/22; E04H 12/2238
USPC .......... 135/16, 96, 98, 912; 280/47.25–47.26; 248/519, 521–523, 125.8, 129, 248/131–132, 346.01, 346.05, 349.1, 188.8
See application file for complete search history.

(56) References Cited

U.S. PATENT DOCUMENTS 2,379,476 A * 7/1945 Cleveland, Jr. ............ 280/43.15
4,365,819 A * 12/1982 Bart .......................... 280/47.41

(Continued)

*Primary Examiner* — Winnie Yip
(74) *Attorney, Agent, or Firm* — Raymond Y. Chan; David and Raymond Patent Firm

(57) ABSTRACT

An outdoor umbrella includes an awning frame, a supporting shaft and an adjustable rotation base including a base housing and a transportation arrangement. The base housing is arranged to couple with the supporting shaft to support the awning frame in an upright manner, and includes a plurality of transferring wheels. The transportation arrangement is provided at the base housing to operate the base housing between an idle mode and a transportation mode, wherein in the idle mode, the transferring wheels are suspendedly lifted up to position above the bottom edge of the base housing such the base housing is sat on the ground surface in a stationary manner, wherein in the transportation mode, the base housing is lifted up by air pressure for allowing the transferring wheels to move out of the receiving cavity at a position below the bottom edge of the base housing.

2 Claims, 38 Drawing Sheets

(56) References Cited

U.S. PATENT DOCUMENTS

| | | | |
|---|---|---|---|
| 4,412,679 A * | 11/1983 | Mahoney et al. | 473/483 |
| 4,978,098 A * | 12/1990 | Peckinpaugh | 248/523 |
| 5,429,378 A * | 7/1995 | Durel-Crain | 280/43.22 |
| 6,305,659 B1 * | 10/2001 | Metelski | 248/519 |
| 6,367,494 B1 * | 4/2002 | Tung | 135/99 |
| 6,439,585 B1 * | 8/2002 | Tan | 280/47.26 |
| 6,467,746 B1 * | 10/2002 | Paskiewicz | 248/349.1 |
| 6,511,033 B2 * | 1/2003 | Li | 248/519 |
| 6,637,717 B2 * | 10/2003 | Li | 248/519 |
| 7,431,259 B2 * | 10/2008 | Tung | 248/521 |
| 7,614,600 B1 * | 11/2009 | Smith et al. | 248/519 |
| 2004/0099782 A1 * | 5/2004 | Schulz | 248/346.06 |
| 2007/0080277 A1 * | 4/2007 | Chen | 248/354.3 |
| 2008/0111046 A1 * | 5/2008 | Tung | 248/521 |

\* cited by examiner

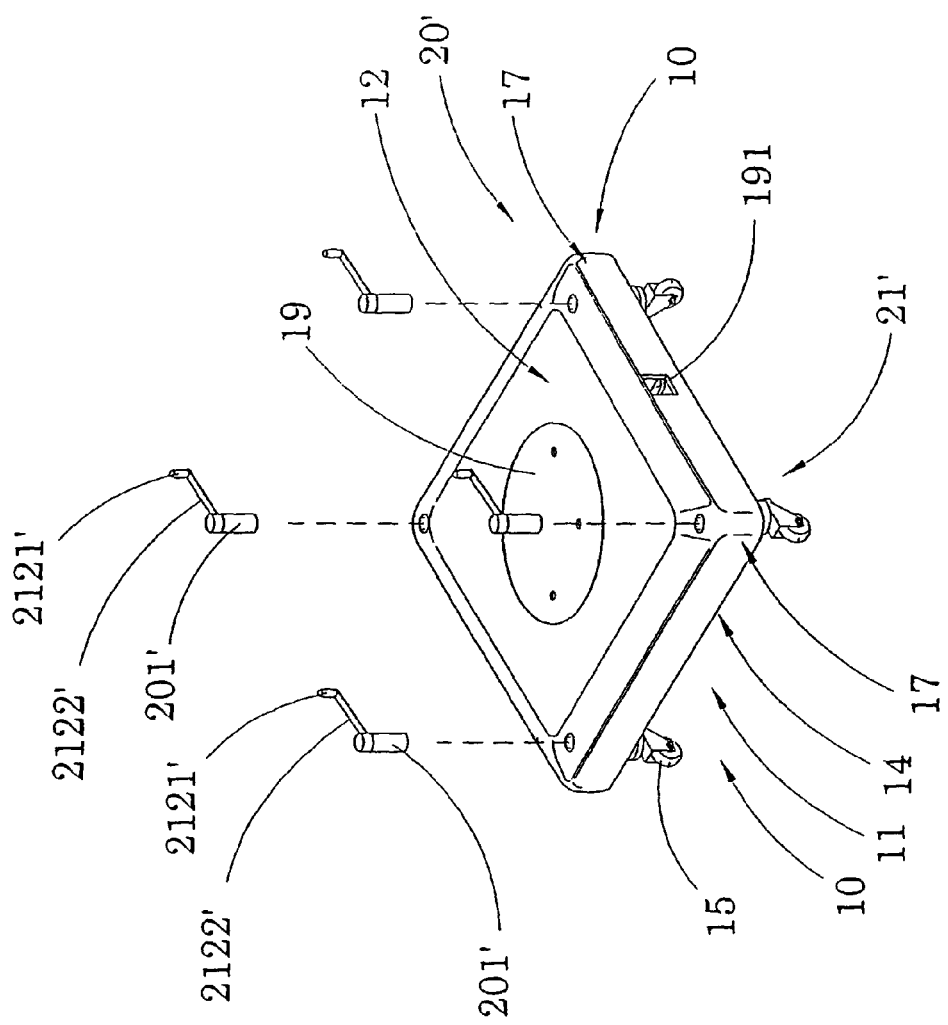

ADJUSTABLE ROTATION BASE

CROSS REFERENCE OF RELATED APPLICATION

This is a Continuation application that claims the benefit of priority under 35U.S.C.§119 to a non-provisional application, application Ser. No. 13/134,293, filed Jun. 3, 2011, which is a Continuation-In-Part application of a non-provisional application, application Ser. No. 12/658,666, filed Feb. 12, 2010, which is a Continuation-In-Part of a non-provision application having an application Ser. No. of 12/590,942 and a filing date of Nov. 16, 2009, and is also a Continuation-In-Part application of a non-provisional application having an application Ser. No. of 12/069,759, and a filing date of Feb. 12, 2008, which is a Continuation-In-Part application of a non-provisional application having an application Ser. No. 11/807,661 and a filing date of May 29, 2007.

BACKGROUND OF THE PRESENT INVENTION

1. Field of Invention

The present invention relates to an outdoor umbrella, and more particularly to an adjustable rotation base for an outdoor umbrella, wherein the adjustable rotation base comprises a transportation arrangement adapted to selectively and conveniently transport the outdoor umbrella for a predetermined distance.

2. Description of Related Arts

A conventional outdoor umbrella usually comprises a supporting base, a central stem upwardly extended from the supporting base, and an awning extended from a top portion of the central stem to provide shading for a predetermined shading area under an awning attached onto the awning frame. This kind of conventional outdoor umbrella has widely been utilized all around the nation for shading sunlight and providing a place where a wide variety of outdoor activities may take place. In order to enhance the performance and function of a typical outdoor umbrella, many inventions have been made to incorporate with a typical outdoor umbrella for achieving additional utility functions of that outdoor umbrella. For example, solar energy systems and illumination systems have been developed provide an environmentally-friendly energy source and illumination to outdoor umbrellas.

Despite these developments, there exists one deep-seated problem which has not been adequately resolved by one skilled in the art. The problem is that the outdoor umbrella is difficult or inconvenient to move while being used in outdoor environment. The most typical instance is that when a user wishes to move the outdoor umbrella from one place to another in a campsite, he or she has to lift up the entire outdoor umbrella and carry it to the intended destination. If that user is unable to move the outdoor umbrella due to its heavy weight, he or she has to ask for help from other people. This scenario presents undue inconvenience and sometimes embarrassment to that user because he or she may actually have to ask the guests to help him or her to move the outdoor umbrella. This scenario is worsened by the fact that in order to stabilize the outdoor umbrella as a whole when it is standing on a ground surface, the supporting base is often disposed with water or sand (i.e. objects of high density) for preventing accidental toppling of the outdoor umbrella. Thus, a typical outdoor umbrella is likely to be very heavy in weight.

In order to inject mobility to a typical outdoor umbrella, one may think that installing some sorts of wheels would be helpful. The problem, however, is that when the user wishes the outdoor umbrella to be stationary for prolonged used, the wheels may actually cause accidental yet undesirable movement of the outdoor umbrella. Therefore, there exist circumstances in which the user of outdoor umbrella may not wish it to be movable. Simply installing wheels to the outdoor umbrella does not resolve this extra problem.

SUMMARY OF THE PRESENT INVENTION

The invention is advantageous in that it provides an adjustable rotation base for an outdoor umbrella, wherein the adjustable rotation base comprises a transportation arrangement adapted to selectively and conveniently transport the outdoor umbrella for a predetermined distance despite its heavy weight.

Another advantage of the present invention is to provide an adjustable rotation base for an outdoor umbrella, wherein the adjustable rotation base is adapted to selectively operate between an idle mode which allows the outdoor umbrella to securely stand on a ground surface, and a transporting mode which allow convenient and easy transportation of the outdoor umbrella. In other words, the present invention allows selective adjustment of the position of the outdoor umbrella.

Another advantage of the present invention is to provide an adjustable rotation base which can be utilized for a wide variety of outdoor umbrellas in a wide variety of circumstances so as to ensure widespread application of the present invention. More importantly, the present invention does not interfere with the operation of the outdoor umbrella.

Another advantage of the present invention is to provide an adjustable rotation base for an outdoor umbrella, which does not involve expensive or complicated mechanical or electrical components so as to minimize the manufacturing cost and the ultimate selling price of the present invention.

Additional advantages and features of the invention will become apparent from the description which follows, and may be realized by means of the instrumentalities and combinations particular point out in the appended claims.

According to the present invention, the foregoing and other objects and advantages are attained by providing an outdoor umbrella, comprising:

an awning frame;

a supporting shaft supporting the awning frame, wherein the supporting shaft comprises a rotatable shaft body having a hollow structure to define a shaft cavity therein; and an adjustable rotation base, which comprise:

a base housing, having a receiving cavity and a bottom edge, arranged to couple with the supporting shaft to support the awning frame in an upright manner, and comprises a plurality of transferring wheels; and a transportation arrangement provided at the base housing to operate the base housing between an idle mode and a transportation mode, wherein in the idle mode, the transferring wheels are suspendedly lifted up to position above the bottom edge of the base housing for defining a clearance between the transferring wheels and the ground surface such the base housing is sat on the ground surface in a stationary manner, wherein in the transportation mode, the base housing is lifted up by air pressure for allowing the transferring wheels to move out of the receiving cavity at a position below the bottom edge of the base housing for allowing the transferring wheels to rotatably sit on a ground surface to free transport the outdoor umbrella along the ground surface.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 6A to FIG. 6c are schematic diagrams illustrating a first alternative mode of the adjustable rotation base according to the above preferred embodiment of the present invention.

DETAILED DESCRIPTION OF THE PREFERRED EMBODIMENT

Figure 1:
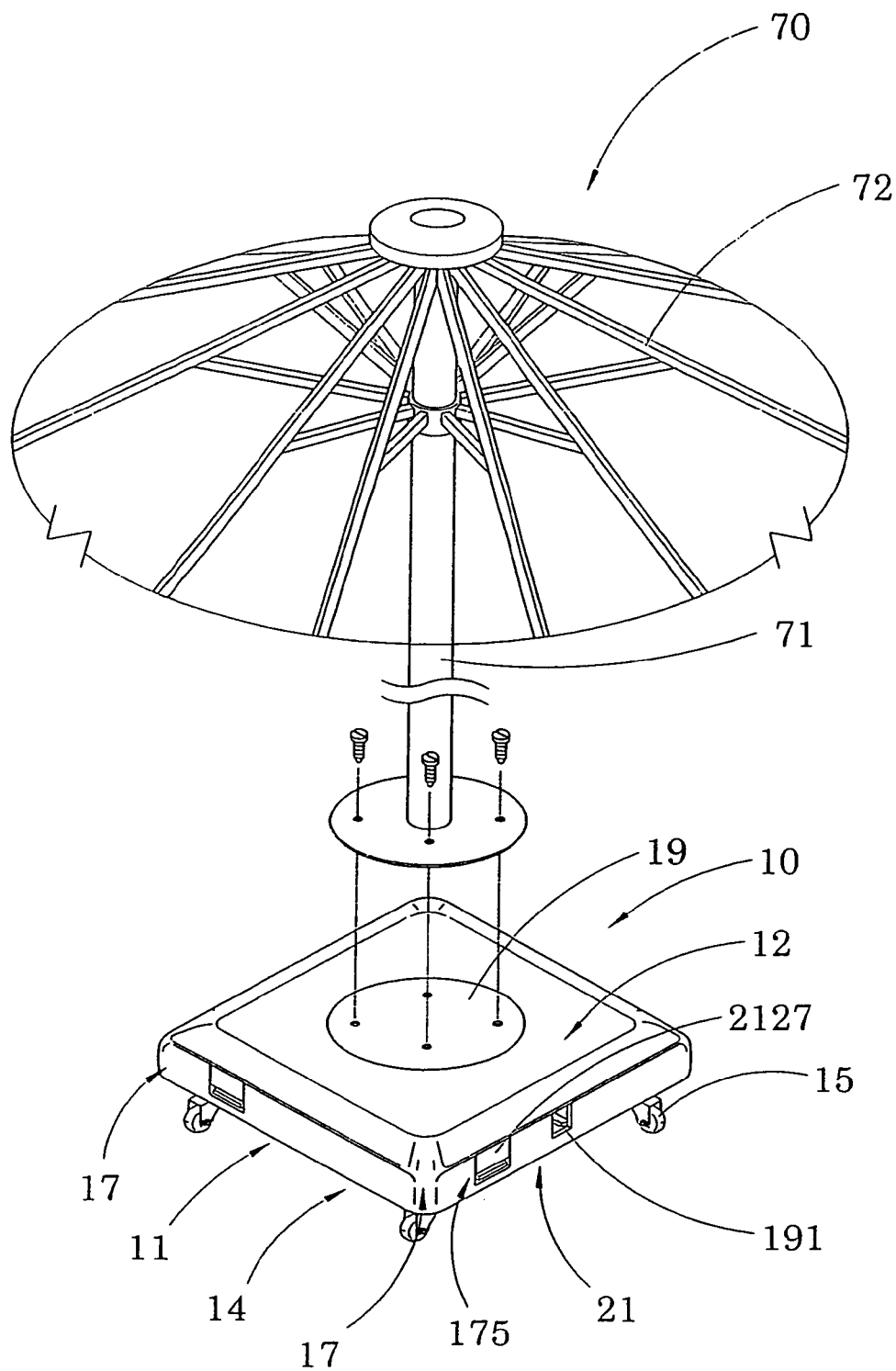
FIG. 1 is a perspective view of an adjustable rotation base according to a preferred embodiment of the present invention.
Figure 2:
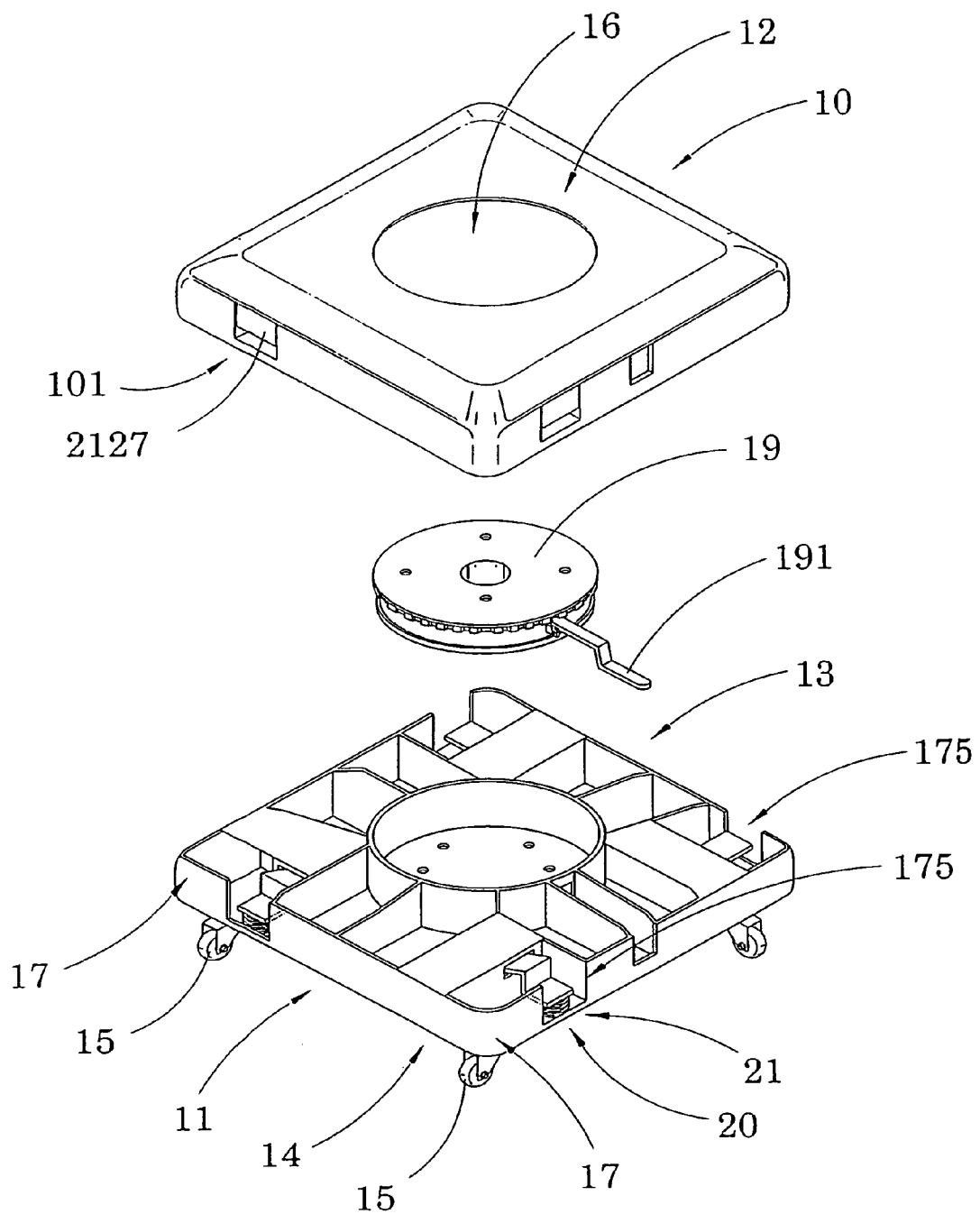
FIG. 2 is an exploded perspective view of the adjustable rotation base according to the above preferred embodiment of the present invention.

Referring to FIG. 1, FIG. 2, FIG. 3A, FIG. 3B, FIG. 4, FIG. 5A and FIG. 5B of the drawings, an adjustable rotation base for supporting an outdoor umbrella 70 according to a first preferred embodiment of the present invention is illustrated, in which the adjustable rotation base comprises a base housing 10 and a transportation arrangement 20. The outdoor umbrella 70 is meant to be a regular outdoor umbrella 70 which comprises a supporting post 71 extended from a ground surface, and an awning frame 72 extended from the top end portion of the supporting post 71.

The base housing 10 has a bottom side 11, an upper side 12 for coupling with the supporting post 71 to support the outer umbrella 70 in an upright manner, and a receiving cavity 13 indently formed on the bottom side 11 of the base housing 10, wherein the base housing 10 comprises a stationary unit 14 provided at the bottom side 11 for sitting on the ground surface in a station manner, and a plurality of transferring wheels 15 rotatably supported at the bottom side 11 of the base housing 10.

The transportation arrangement 20 is provided at the base housing 10 to operate the base housing 10 between an idle mode and a transportation mode, wherein in the idle mode, the transferring wheels 15 are suspenedly lifted up to define a clearance between the transferring wheels 15 and the ground surface such the base housing 10 is sat on the ground surface via the stationary unit 14 in a stationary manner, wherein in the transportation mode, the stationary unit 14 is upwardly lifted to allow the transferring wheels 15 being sitting on the ground surface, such that the base housing 10 is adapted to be transported on the ground surface via the transferring wheels 15.

According to the preferred embodiment of the present invention, the base housing 10 further has a coupling hole 16 formed at the upper side 11 of the base housing 10 to communicate with the receiving cavity 13, wherein the supporting post 71 of the outdoor umbrella 70 is coupled with the base housing 10 through the coupling hole 16. Moreover, the stationary unit 14 is preferably embodied as bottom surfaces of the base housing 10.

Moreover, the base housing 10 further comprises a rotary support 19 rotatably mounted within the base housing 10, in such a manner that the outdoor umbrella 70 is adapted to couple with the rotary support 19 via the coupling hole 16. Moreover, the base housing 10 further comprises a control pedal 191 extended from the rotary support 19 to an exterior of the base housing 10, so as to selectively control a rotation of the rotary support 19. Thus, when the control pedal 191 is actuated, the rotary support 19 is rotatable with respective to the base housing 10 for adjusting an orientation of the outdoor umbrella 70.

Referring to FIG. 1 to FIG. 2, FIG. 3A, FIG. 3B, FIG. 4, FIG. 5A and FIG. 5B of the drawings, the transportation arrangement 20 comprises a plurality of driving units 21 operatively and spacedly provided in the base housing 10 to mechanically communicate with the transferring wheels 15 respectively, wherein the driving units 21 are adapted to be selectively activated to operate the base housing 10 between the idle mode and the transportation mode.

More specifically, each of the driving units 21 comprises an adjustment assembly 211 mounted in the receiving cavity 13 and a manual actuation unit 212 extended from the adjustment assembly 211 out of the base housing 10 in such a manner that the manual actuation unit 212 is adapted to be manually and selectively operated for driving the adjustment assembly 211 to lift up the base housing 10 with respect to the transferring wheels 15.

Referring to FIG. 3A, FIG. 3B, FIG. 4, FIG. 5A and FIG. 5B of the drawings, the base housing 10 further has a plurality of seat portions 17 formed as four corner portions of the base housing 10, wherein the transferring wheels 15 and the driving units 21 are coupled at the corresponding seat portion 17 for selectively operating the base housing 10 between the idle mode and the transportation mode. Each of the seat portions 17 is divided into a driving compartment 171 and a control compartment 172 by a partitioning wall 173 having a through communication slot 174, wherein the adjustment assembly 211 and the manual actuation unit 212 are mounted in the driving compartment 171 and the control compartment 172 respectively and communicate through the communication slot 174 of the partitioning wall 173. According to the preferred embodiment of the present invention, the base housing 10 further comprises a base panel 18 transversely extended between an inner side of the partitioning wall 173 and an inner side of the opposed sidewall of the driving compartment 171 so as to further divide the driving compartment 171 into an upper compartment chamber 1711 for receiving the adjustment assembly 211 of the corresponding driving unit 21, and a lower compartment chamber 1712 for receiving the transferring wheels 15.

For each of the driving units 21, the adjustment assembly 211 comprises a connecting shaft 201, having a lower end portion connected with the corresponding transferring wheel 15, longitudinally extended within the driving compartment 171 of the base housing 10, a biasing member 202 outwardly extended from the connecting shaft 201 within the upper compartment chamber 1711 at a position which is spacedly apart from an upper surface of the base panel 18, and a resilient element 203 disposed between the base panel 18 and the biasing member 202 to normally exert an upward urging force toward the connecting shaft 201 so as to normally retain the corresponding transferring wheel 15 within the lower compartment chamber 1712.

Moreover, each of the adjustment assemblies 211 further comprises a plurality of locking teeth 204 formed an outer side of the connecting shaft 201 for engaging with the corresponding manual actuation unit 212 of the driving unit 21. Accordingly, each of the manual actuation units 212 comprises an actuation pedal 2121, having a driving end portion 2122 and an actuation end portion 2123, extended from the adjustment assembly 211 to the control compartment 172 of the seat portion 17 through the communication slot 174 of the partitioning wall 173, a first and a second locking members 2124, 2128 pivotally and downwardly extended from the actuation end portion 2123 of the actuation pedal 2121 for selectively engaging with the locking teeth 204 of the corresponding driving assembly 211. In order to normally retain engagement between the locking teeth 204 and the locking members 2124, the manual actuation unit 212 further comprises a plurality of retention springs 2125 mounted within the upper compartment chamber 1711 of the driving compartment 171 to normally bias against the locking members 2124 respectively so as to make the locking members 2124 normally engaging with the locking teeth 204 for restricting a lateral movement between the connecting shaft 201 and the actuation pedal 2121.

Figure 3A:
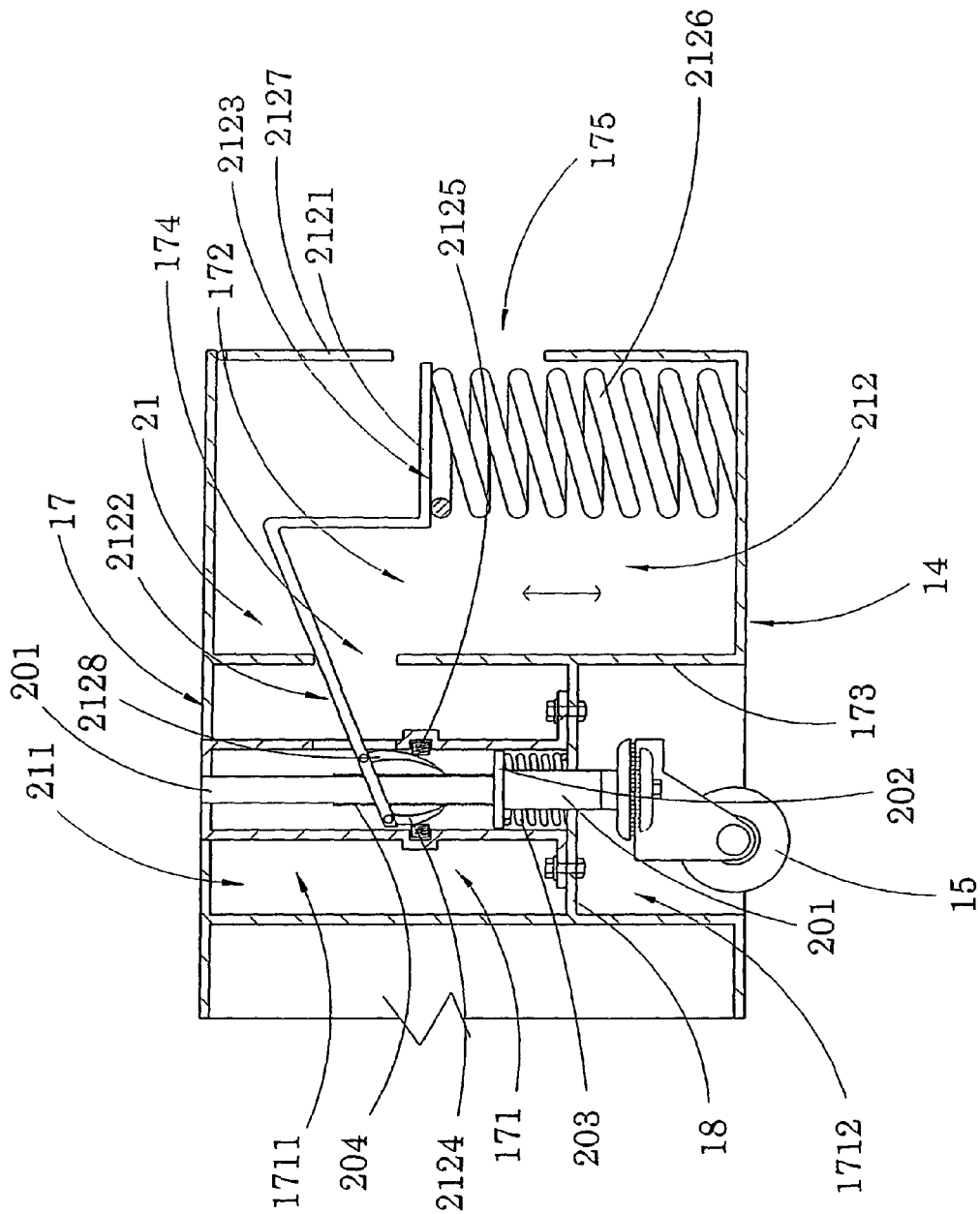
FIG. 3A and FIG. 3B are sectional side views of the adjustable rotation base according to the above preferred embodiment of the present invention.
Figure 3B:
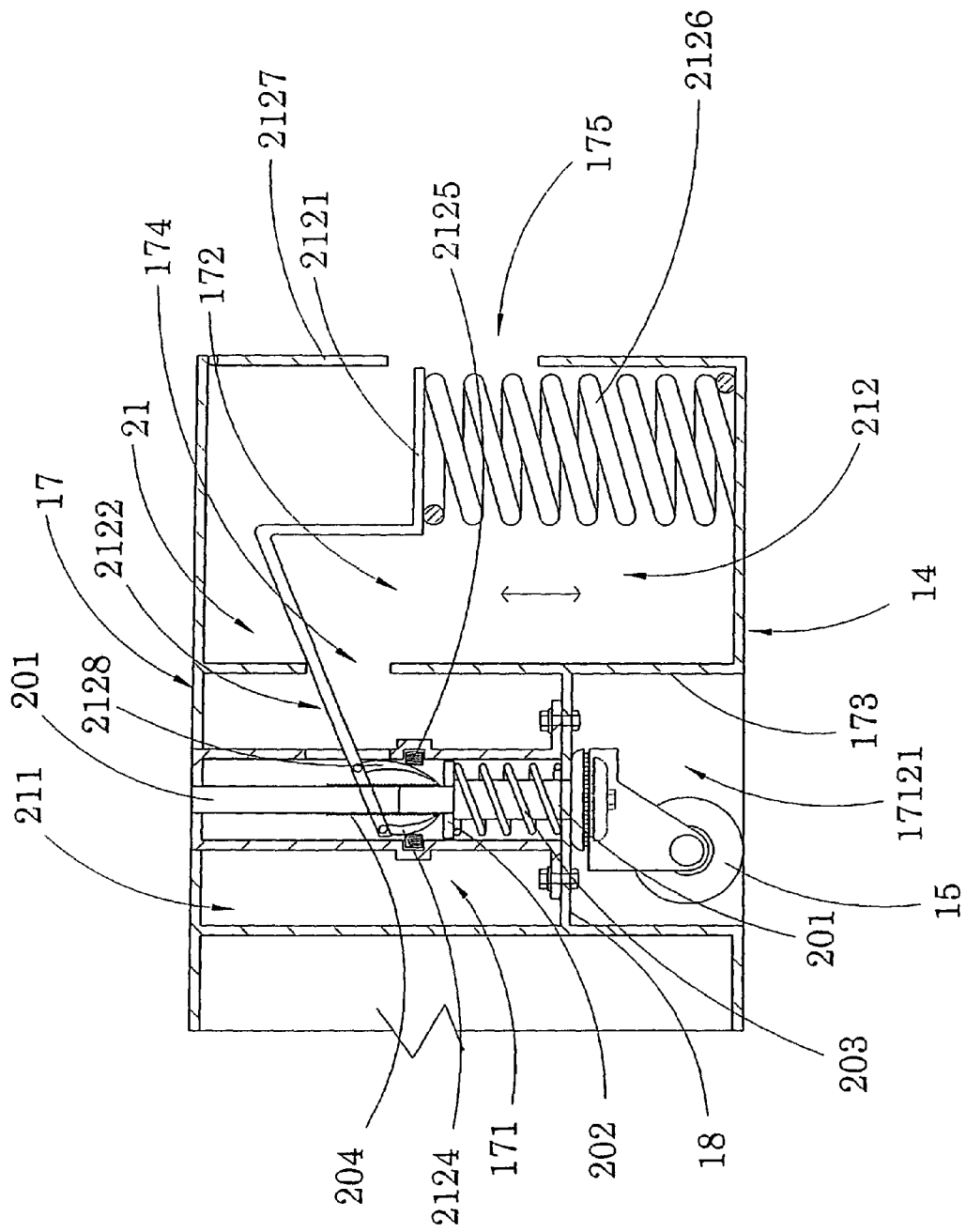
Figure 4:
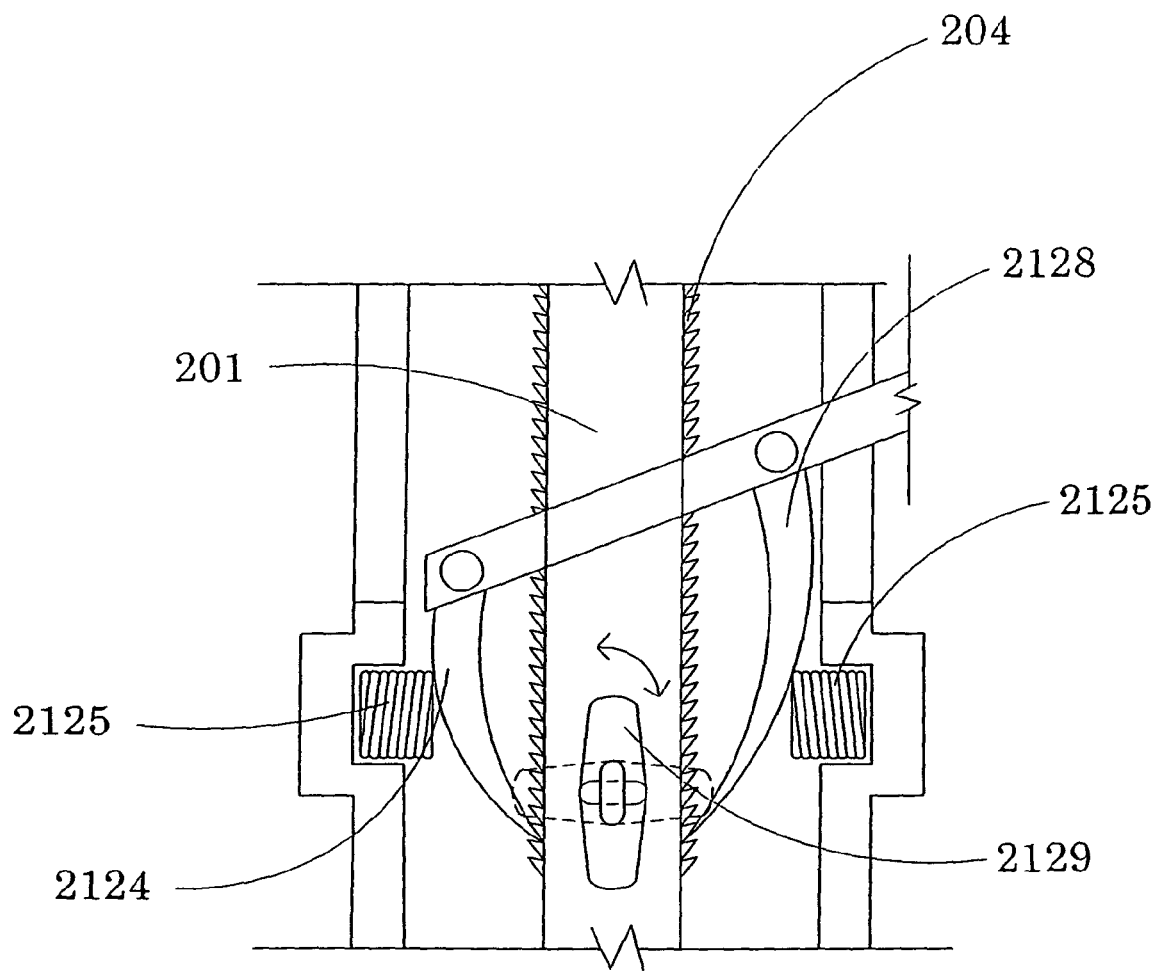
FIG. 4 is a schematic diagram of a driving unit according to the above preferred embodiment of the present invention.

As shown in FIG. 3A and FIG. 3B of the drawings, each of the manual actuation units 212 further comprises a resilient member 2126 mounted in the control compartment 172 of the corresponding seat portion 17 of the base housing 10 to normally exert an upward urging force toward the actuation end portion 2123 of the actuation pedal 2121, which is adapted for being stepped on by a user of the present invention. Thus, when the user steps on the actuation end portion 2123 of the actuation pedal 2121, the actuation pedal 2121 is depressed so as to compress the resilient member 2126 mounted underneath the actuation end portion 2123 of the actuation pedal 2121. Conversely, when the depression force is released (i.e. the user stops stepping onto the actuation pedal 2121), the actuation end portion 2123 of the actuation pedal 2121 is restored to its original position with the resilient member 2126 decompressed.

In order to access the driving units 21 from an exterior of the base housing 10, the base housing 10 further has a plurality of wheels control slot 175 formed on the seat portions 17 of the base housing respectively to communicate with the control compartments 172 for allowing users to access the driving units 21 via the wheels control slot 175. In order that the transportation arrangement 20 does not affect the aesthetic appearance of the entire outdoor umbrella structure, each of the manual activation units 212 further comprises a pedal cover 2127 pivotally mounted to the base housing 10 at a top side edge of the corresponding wheels control slot 175 in an inwardly flappable manner, so that the pedal cover 2127 is arranged to normally cover the corresponding wheels control slot 175, and when the user wishes to access the driving units 21 from exterior of the base housing 10, he or she needs only to inwardly push the pedal cover 2127 into the control compartment 172 which then allows access to the actuation end portion 2123 of the actuation pedal 2121. The user is then able to step onto the actuation end portion 2123 of the actuation pedal 2121.

The operation of each of the driving units 21 is as follows: when the actuation end portion 2123 of the actuation pedal 2121 is depressed, the first locking member 2124 is also depressed to drive the connecting shaft 201 to move downwardly for a predetermined distance as dictated by the displacement of the driving end portion 2122 of the actuation pedal 2121. When the actuation end portion 2123 of the actuation pedal 2121 is depressed to its maximum displacement (i.e. when the resilient member 2126 is compressed to its maximum extent) the user is unable to further depress the actuation end portion 2123 of the actuation pedal 2121. At this stage, the user should release the depression force to the actuation pedal 2121 which is then rebounded to its original position by the resilient member 2126. When the actuation end portion 2123 of the actuation pedal 2121 is rebounded, the engagement between the second locking member 2128 and the locking teeth 204 prevents the connecting shaft 201 from being driven to move upwardly so as to retain the position thereof. As such, the user is able to depress the actuation end portion 2123 of the actuation pedal 2121 for several times so as to incrementally lower the position of the corresponding transferring wheel 15 until it is lowered to stand on the ground surface for suspending supporting the base housing 10 and the outdoor umbrella 70. When the four transferring wheels 15 are sequentially lowered, the user is able to transport the outdoor umbrella 70 by the transferring wheels 15.

It is worth mentioning that the locking members 2124, 2128 are selectively engaged with the locking teeth 204 such that when the locking members 2124, 2128 are selectively disengaged from the locking teeth 204, the connecting shaft 201 is pushed upwardly by the resilient element 203 and the transferring wheel 15 is then pushed to restore to its original position (i.e. received into the base housing 10). Accordingly, each of the manual activation units 212 further comprises an adjusting screw 2129 rotatably provided on the base housing 10 to communicate with the first and the second locking member 2124, 2128, in such a manner that the adjusting screw 2129 is adapted to selectively engage and disengage the locking member 2124, 2128 with and from the locking teeth 204 respectively.

Moreover, in order further enhance the stability of the base housing 10, the base housing 10 further comprises a stabilizing agent filled therewithin for substantially increasing the weight of the base housing 10. The stabilizing agent is preferably a predetermined amount of sands or water having a relatively high density among other objects.

It is worth mentioning that as a slight alternative of this third alternative mode, the base housing 10 may further comprise a supporting panel wherein the transferring wheels 15 are attached onto the supporting panel. The supporting shaft 201 is connected with the supporting panel in such a manner that when the supporting shaft 201 is driven to move longitudinally, the supporting panel is also driven to move correspondingly and therefore lifting up or lowering down the transferring wheels 15.

Figure 6A:
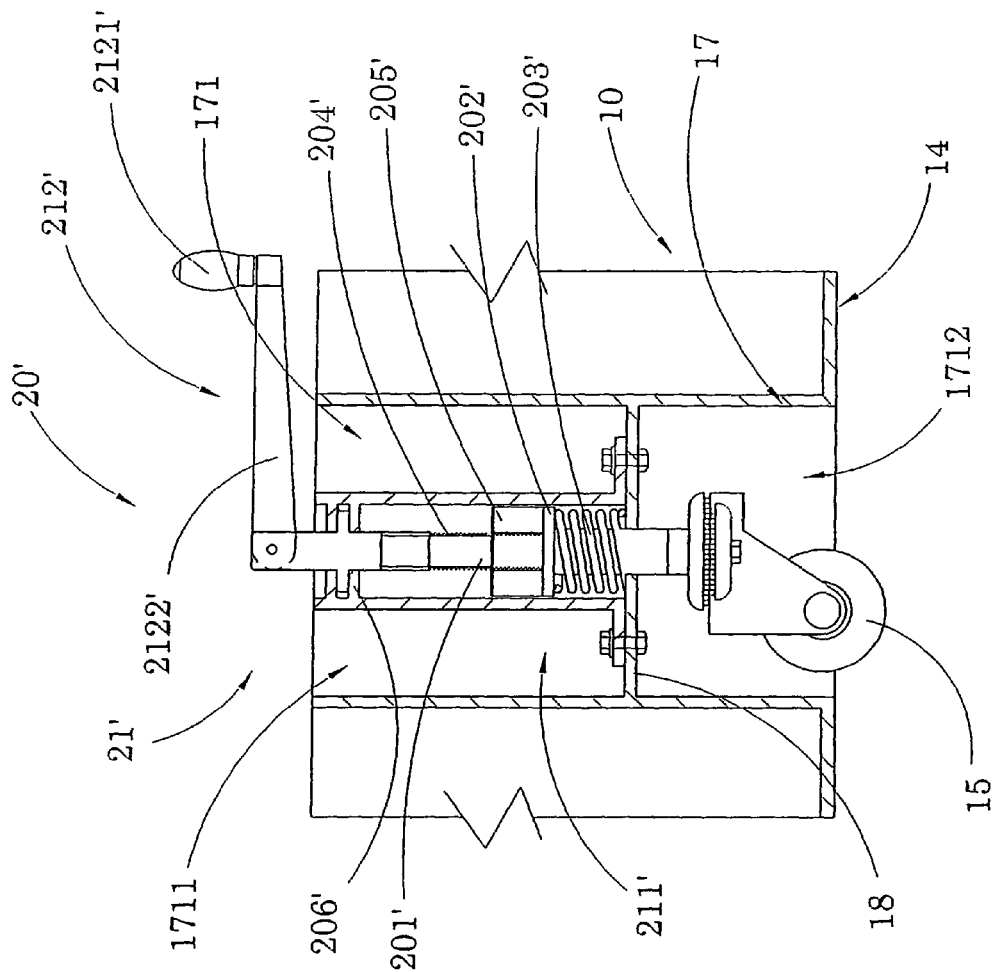
Figure 6B:
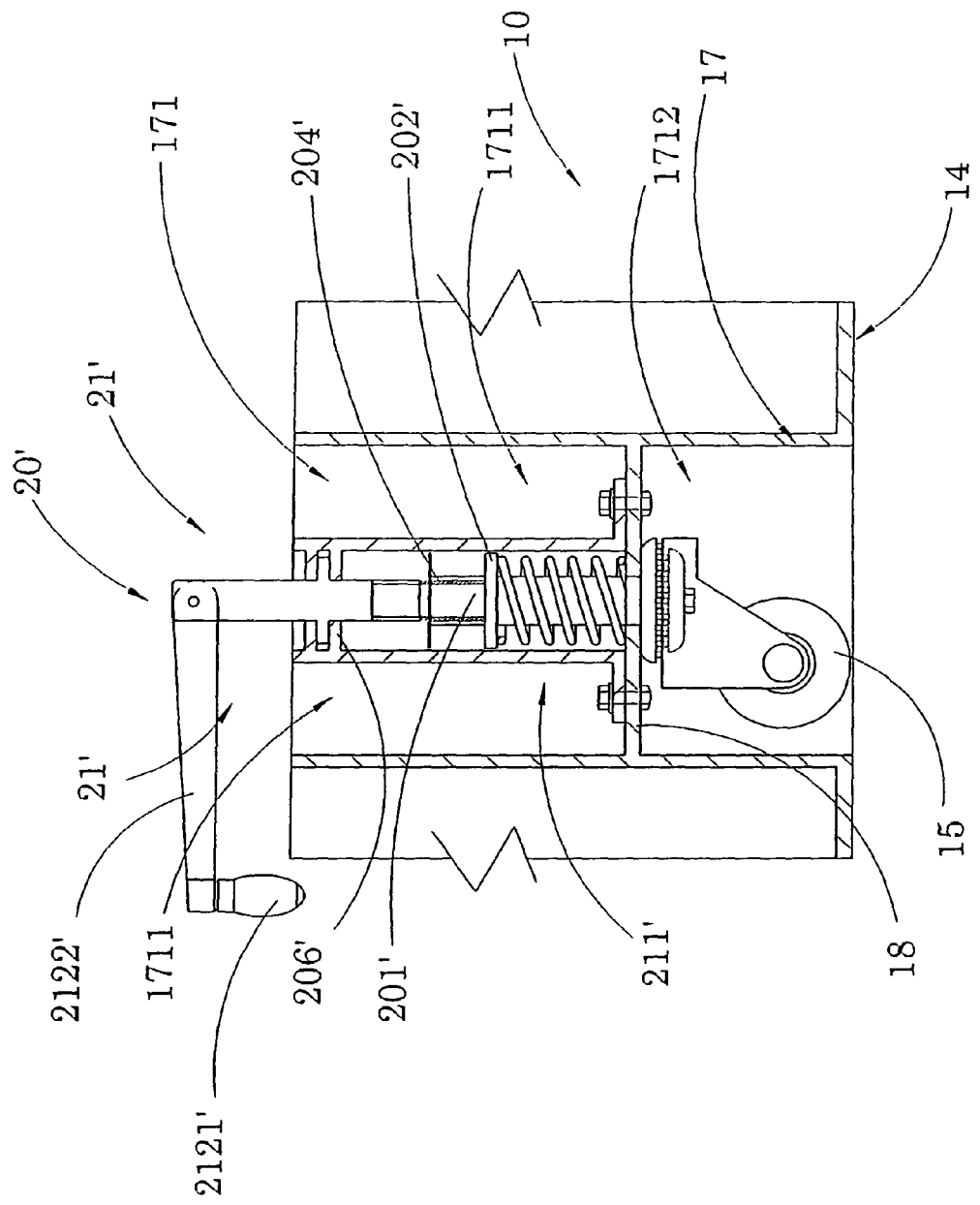

Referring to FIG. 6A to FIG. 6C of the drawings, an alternative mode of the adjustable rotation base according to the above preferred embodiment of the present invention is illustrated. The first alternative mode is similar to the preferred embodiment except the transportation arrangement 20'. According to the first alternative mode, the transportation arrangement 20' comprises a plurality of driving units 21' operatively and spacedly provided in the base housing 10 to mechanically communicate with the transferring wheels 15 respectively, wherein the driving units 21' are adapted to be selectively activated to operate the base housing 10 between the idle mode and the transportation mode.

More specifically, each of the driving units 21' comprises an adjustment assembly 211' mounted in the receiving cavity 13 and a manual actuation unit 212' extended from the adjustment assembly 211' out of the base housing 10 in such a manner that the manual actuation unit 212' is adapted to be manually and selectively operated for driving the adjustment assembly 211' to lift up the base housing 10 with respect to the transferring wheels 15.

For each of the driving units 21', the adjustment assembly 211' comprises a connecting shaft 201', having a lower end portion communicating with the corresponding transferring wheel 15, longitudinally extended within the driving compartment 171 of the base housing 10, a biasing member 202' outwardly extended from the connecting shaft 201' within the upper compartment chamber 1711 at a position which is spacedly apart from an upper surface of the base panel 18, and a resilient element 203' disposed between the base panel 18 and the biasing member 202' to normally exert an upward urging force toward the connecting shaft 201' so as to normally retain the corresponding transferring wheel 15 within the lower compartment chamber 1712.

According to the first alternative mode, the adjustment assembly 211' further comprises a rotary member 205' movably provided within the driving compartment 171 of the corresponding seat portion 17 of the base housing 10 to engage with the lower end portion of the connecting shaft 201'. More specifically, the rotary member 205' has a circular, ring-shaped cross section, wherein the rotary member 205' has a threaded inner surface for forming a plurality of screwing teeth 2051' on the inner surface of the rotary member 205'. On the other hand, the connecting shaft 201' further has a plurality of teeth 204' formed thereon to engage with the threaded inner surface of the rotary member 205', in such a manner that when the connecting shaft 201' is driven to rotate, the rotary member 205' is also driven to rotate so as to initiate a linear movement within the driving compartment 171 of the base housing 10.

Referring to FIG. 6A to FIG. 6B of the drawings, the driving assembly 211' further comprises a shaft holder 206' provided on the upper compartment chamber 1711 of the base housing 10 for retaining a longitudinal movement of the connecting shaft 201' within the upper compartment chamber 1711. Thus, when the connecting shaft 201' is driven to rotate in a predetermined direction, the rotary member 205' is also driven to rotate in such a manner that the rotary member 205' travels downwardly and longitudinally along the connecting shaft 201' to bias against the biasing member 202' which then lowers the corresponding transferring wheel 15 and compress the resilient element 203'.

On the other hand, the manual activation unit 212' comprises a handle member 2121' extended out of the base housing 10 in a rotatably movable manner, and an actuation rod 2122' extended from an upper end portion of the connecting shaft 201' to the handling member 2121'. Thus, when the handle member 2121' is driven to rotate in a predetermined direction, the connecting shaft 201' is also driven to rotate for lowering the corresponding transferring wheel 15 by the descending movement of the rotary member 205'. When all of the transferring wheels 15 are descended to a position underneath the base housing 10, the outdoor umbrella is readily transported by the transferring wheels 15. When the user wishes to restore the position of the transferring wheel 15, he or she simply needs to rotate the handle member 2121' in an opposed direction for screwing the rotary member 205' in that corresponding direction. Thus, the rotary member 205' is adapted to displace upwardly along the connecting shaft 201' for receiving into the base housing 10.

Figure 7:
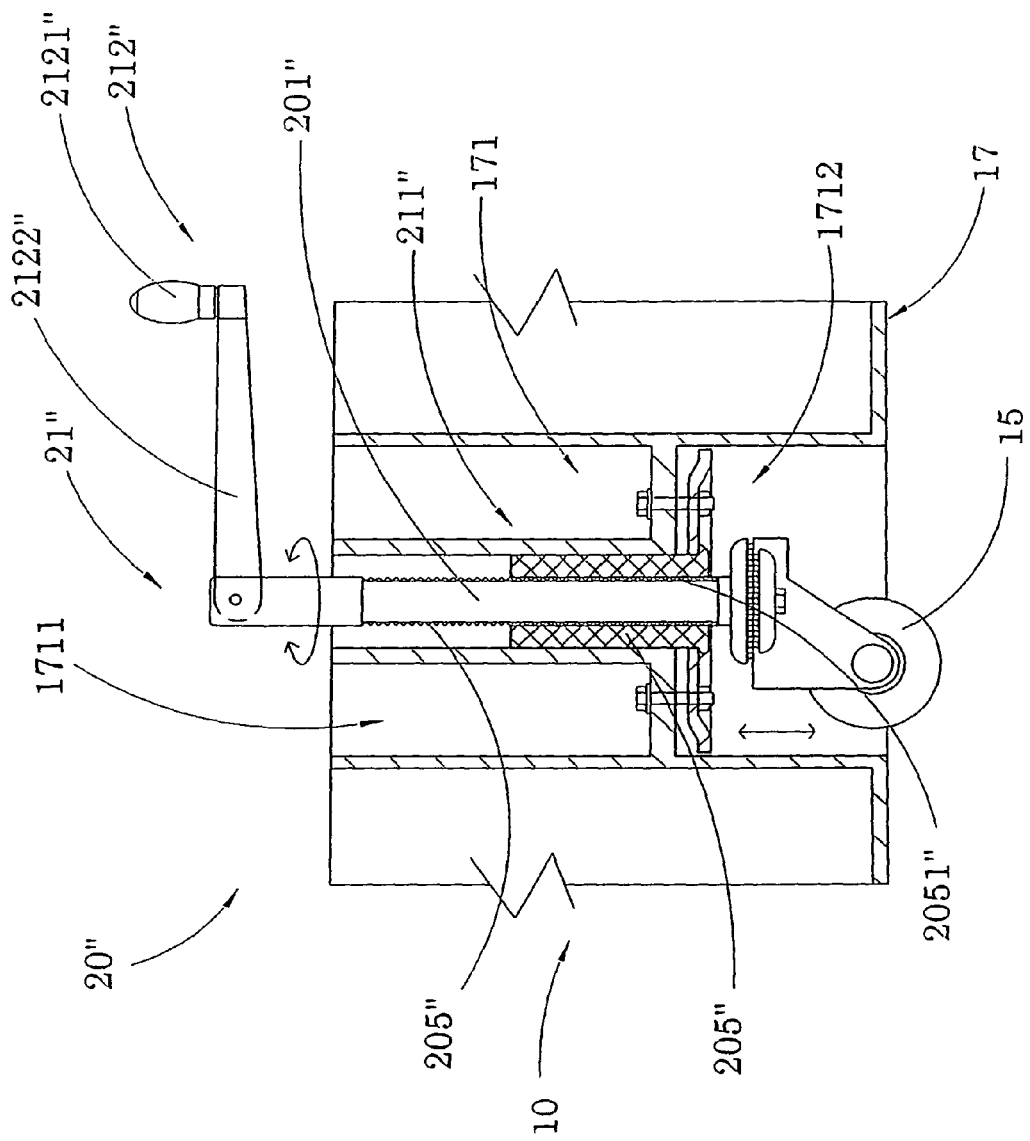
FIG. 7 is a second alternative mode of the adjustable rotation base according to the above preferred embodiment of the present invention.

Referring to FIG. 7 of the drawings, a second alternative mode of the adjustable rotation base according to the preferred embodiment of the present invention is illustrated. The second alternative mode is similar to the preferred embodiment except the transportation arrangement 20". According to the second alternative mode, the transportation arrangement 20" comprises a plurality of driving units 21" operatively and spacedly provided in the base housing 10 to mechanically communicate with the transferring wheels 15 respectively, wherein the driving units 21" are adapted to be selectively activated to operate the base housing 10 between the idle mode and the transportation mode.

Each of the driving units 21" comprises an adjustment assembly 211" mounted in the receiving cavity 13 and a manual actuation unit 212" extended from the adjustment assembly 211" out of the base housing 10 in such a manner that the manual actuation unit 212" is adapted to be manually and selectively operated for driving the adjustment assembly 211" to lift up the base housing 10 with respect to the transferring wheels 15.

For each of the driving units 21", the adjustment assembly 211" comprises a connecting shaft 201", having a lower end portion directly connecting with the corresponding transferring wheel 15, longitudinally extended within the driving compartment 171 of the base housing 10.

According to the second alternative mode, the adjustment assembly 211" further comprises a rotary member 205" securely provided within the driving compartment 171 of the corresponding seat portion 17 of the base housing 10 to engage with the lower end portion of the connecting shaft 201". More specifically, the rotary member 205" has a circular, ring-shaped cross section, wherein the rotary member 205" has a threaded inner surface for forming a plurality of screwing teeth 2051" on the inner surface of the rotary member 205'. On the other hand, the connecting shaft 201" further has a plurality of teeth 204" formed thereon to engage with the threaded inner surface of the rotary member 205", in such a manner that when the connecting shaft 201" is driven to rotate, the connecting shaft 201" also displaces longitudinally along the driving compartment 171 to initiate a linear movement of the transferring wheel 15.

On the other hand, each of the manual actuation unit 212" comprises a handle member 2121" extended out of the base housing 10 in a rotatably movable manner, and a actuation rod 2122" extended from an upper end portion of the connecting shaft 201" to the handling member 2121". Thus, when the handle member 2121" is driven to rotate in a predetermined direction, the connecting shaft 201" is also driven to rotate for lowering the corresponding transferring wheel 15 by the descending movement of the rotary member 205".

When all of the transferring wheels 15 are descended to a position underneath the base housing 10, the outdoor umbrella is readily transported by the transferring wheels 15. When the user wishes to restore the position of the transferring wheel 15, he or she simply needs to rotate the handle member 2121" in an opposed direction for rotating the connecting shaft 201" in that corresponding direction, which is then adapted to displace upwardly along the driving compartment 17 for receiving the transferring wheel 15 back into the base housing 10 so that the outdoor umbrella 70 is supported by the stationary unit 14.

Figure 8:
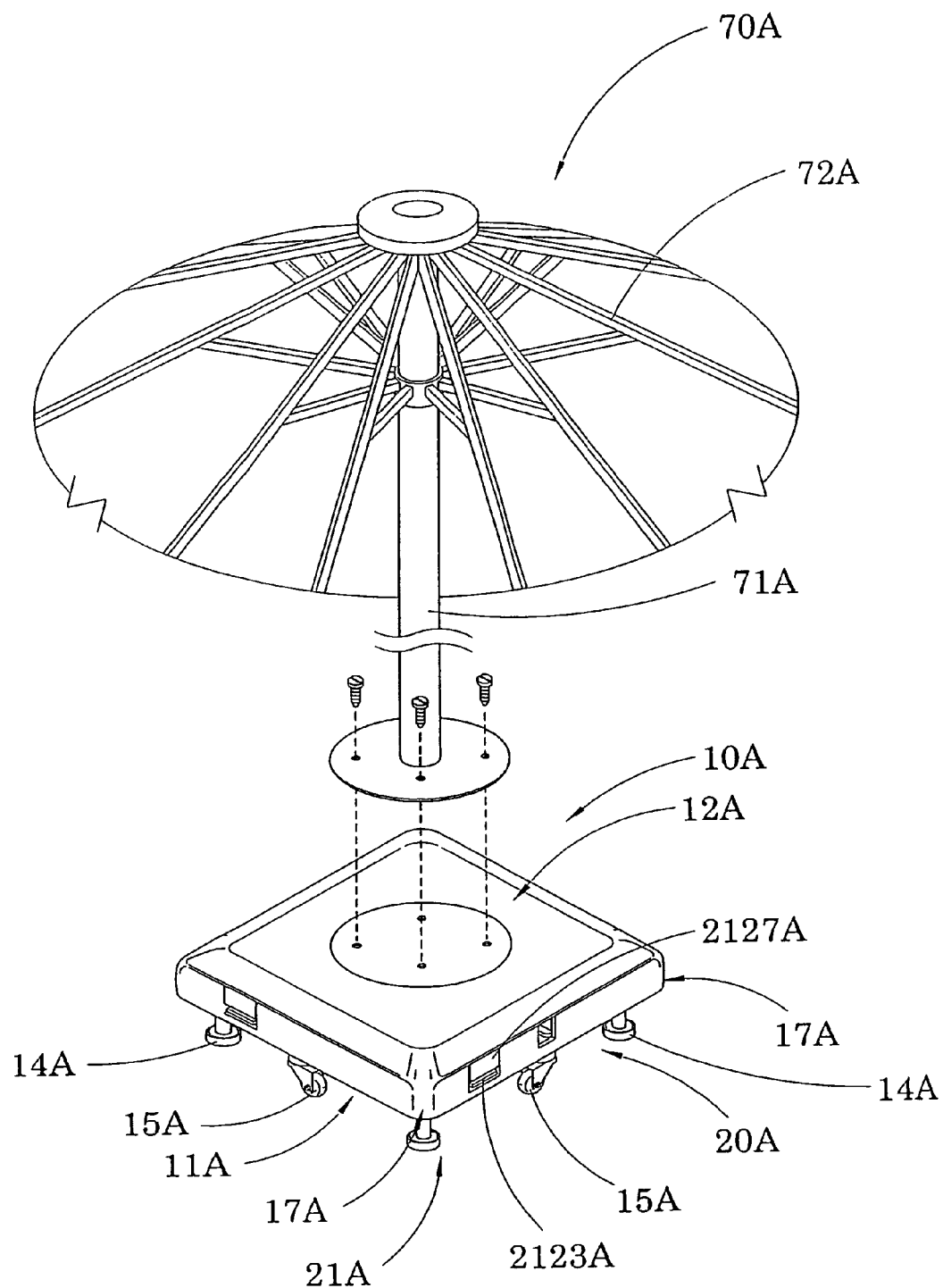
FIG. 8 is a perspective view of an adjustable rotation base according to a second preferred embodiment of the present invention.
Figure 9:
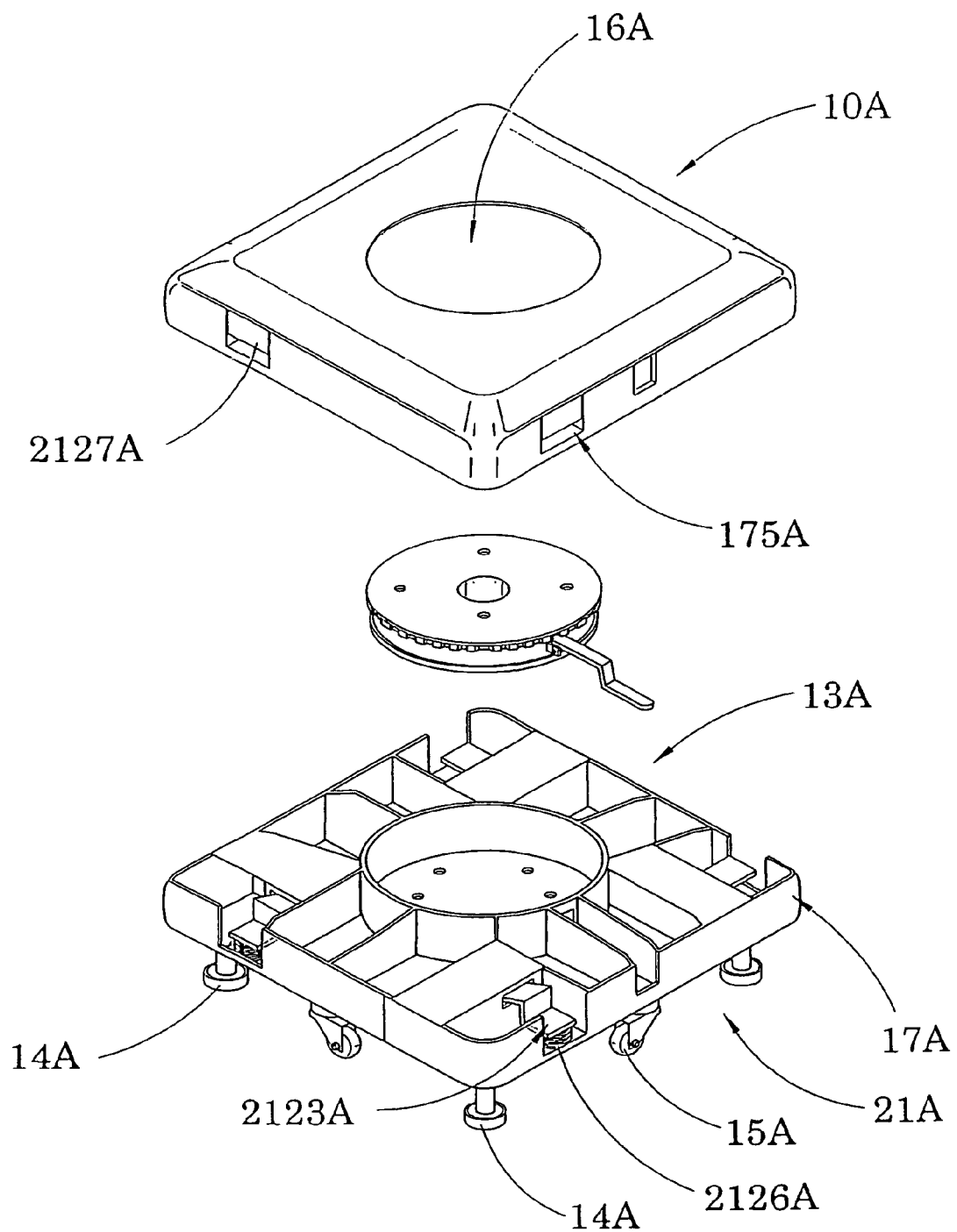
FIG. 9 is an exploded perspective view of an adjustable rotation base according to the above second preferred embodiment of the present invention.

Referring to FIG. 8 to FIG. 9 of the drawings, an adjustable rotation base for supporting an outdoor umbrella 70A according to second preferred embodiment of the present invention is illustrated, in which the adjustable rotation base comprises a base housing 10A and a transportation arrangement 20A. The outdoor umbrella 70A is meant to be a regular outdoor umbrella 70A which comprises a supporting post 71A extended from a ground surface, and an awning frame extended from the top end portion of the supporting post 71A.

The base housing 10A has a bottom side 11A, an upper side 12A for coupling with the supporting post 71A to support the outer umbrella 70A in an upright manner, and a receiving cavity 13A indently formed on the bottom side 11A of the base housing 10A, wherein the base housing 10A comprises at least one stationary unit 14A provided at the bottom side 11A for sitting on the ground surface in a station manner, and a plurality of transferring wheels 15A rotatably supported at the bottom side 11A of the base housing 10A.

The transportation arrangement 20A is provided at the base housing 10A to operate the base housing 10A between an idle mode and a transportation mode, wherein in the idle mode, the transferring wheels 15A are suspendedly lifted up to define a clearance between the transferring wheels 15A and the ground surface such the base housing 10A is sat on the ground surface via the stationary unit 14A in a stationary manner, wherein in the transportation mode, the stationary unit 14A is upwardly lifted to allow the transferring wheels 15A being sitting on the ground surface, such that the base housing 10A is adapted to be transported on the ground surface via the transferring wheels 15A.

According to the preferred embodiment of the present invention, the base housing further has a coupling hole 16A formed at the upper side 11A of the base housing 10A to communicate with the receiving cavity 13A, wherein the supporting post 71A of the outdoor umbrella 70A is coupled with the base housing 10A through the coupling hole 16A. Each of the stationary units 14A is preferably embodied as a three-dimensional supporting member adapted to normally rest on the ground surface.

Referring to FIG. 8 to FIG. 9, FIG. 10A and FIG. 10B of the drawings, the transportation arrangement 20A comprises a plurality of driving units 21A operatively and spacedly provided in the base housing 10A to mechanically communicate with the stationary units 14A respectively, wherein the driving units 21A are adapted to be selectively activated to operate the base housing 10A between the idle mode and the transportation mode.

More specifically, each of the driving units 21A comprises an adjustment assembly 211A mounted in the receiving cavity 13A and a manual actuation unit 212A extended from the adjustment assembly 211A out of the base housing 10 in such a manner that the manual actuation unit 212A is adapted to be manually and selectively operated for driving the adjustment assembly 211A to lift up the base housing 10A with respect to the ground surface.

Figure 10A:
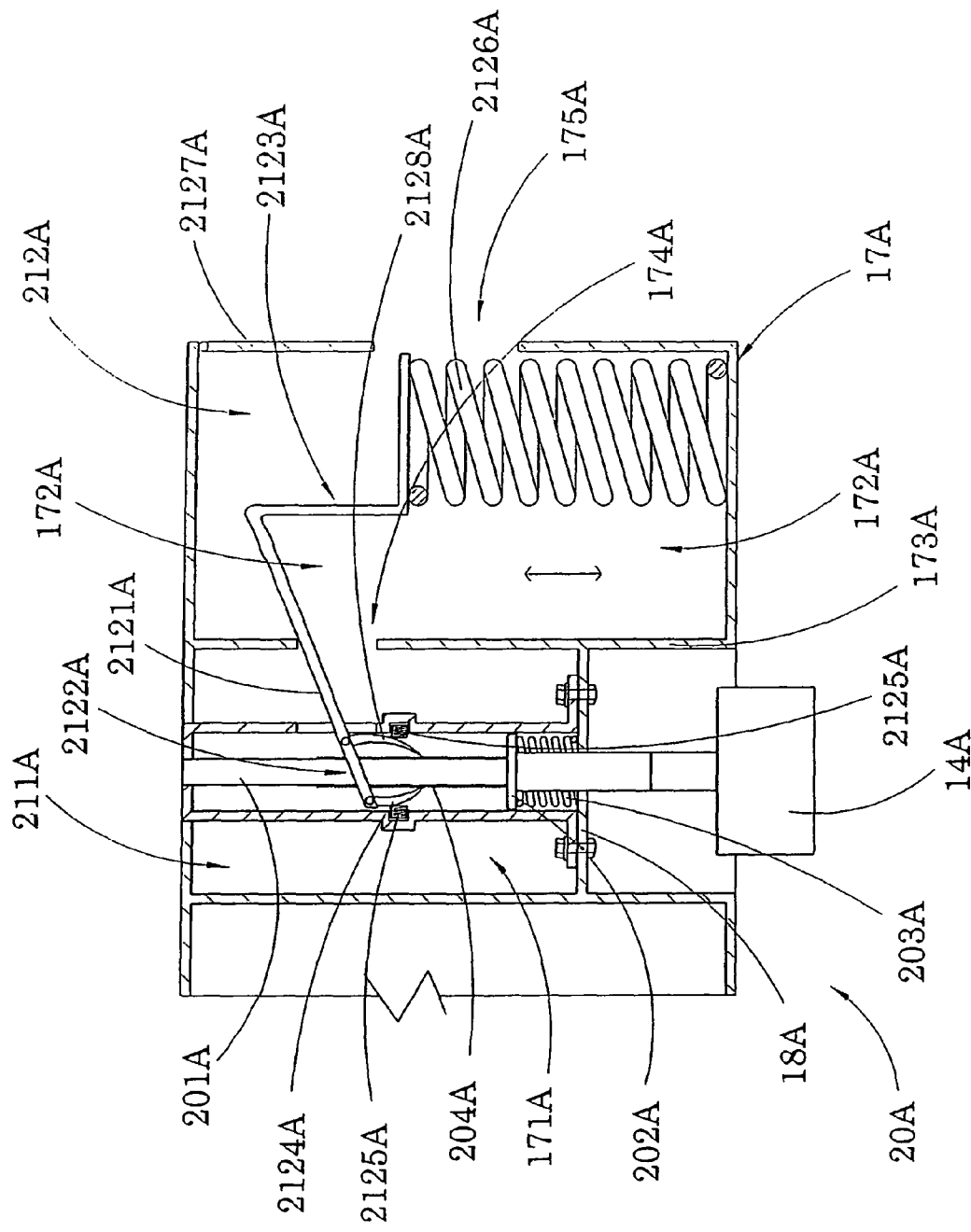
FIG. 10A and FIG. 10B are sectional side views of the adjustable rotation base according to the above second preferred embodiment of the present invention.
Figure 10B:
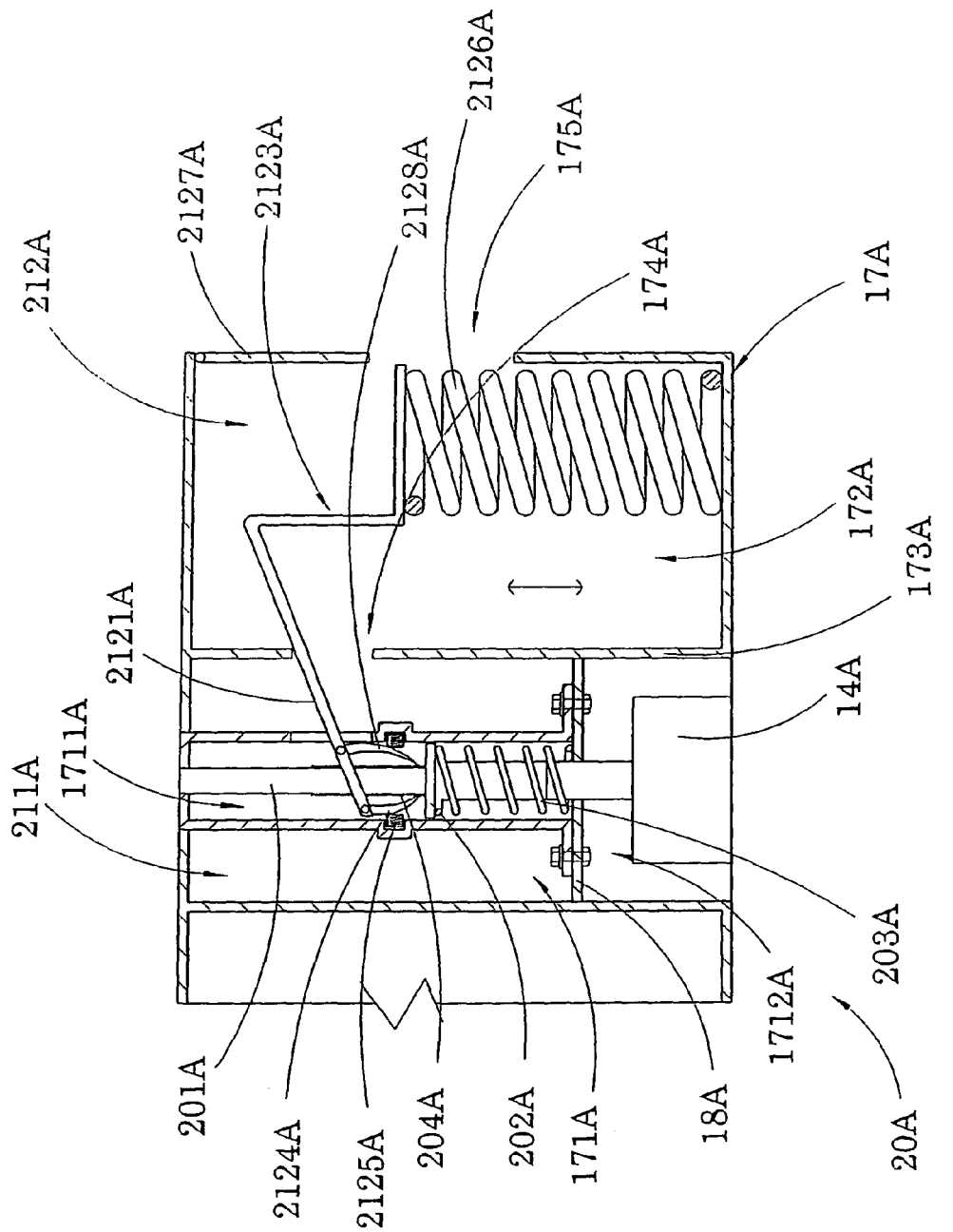

Referring to FIG. 10A and FIG. 10B of the drawings, the base housing 10A further has a plurality of seat portions 17A formed as four corner portions of the base housing 10A, wherein the stationary units 14A and the driving units 21A are coupled at the corresponding seat portion 17A for selectively operating the base housing 10A between the idle mode and the transportation mode. Each of the seat portions 17A is divided into a driving compartment 171A and a control compartment 172A by a partitioning wall 173A having a through communication slot 174A, wherein the adjustment assembly 211A and the manual actuation unit 212A are mounted in the driving compartment 171A and the control compartment 172A respectively and communicate through the communication slot 174A of the partitioning wall 173A.

According to the second preferred embodiment of the present invention, the base housing 10A further comprises a base panel 18A transversely extended between an inner side of the partitioning wall 173A and an inner side of the opposed sidewall of the driving compartment 171A so as to further divide the driving compartment 171A into an upper compartment chamber 1711A for receiving the adjustment assembly 211A of the corresponding driving unit 21A, and a lower compartment chamber 1712A for receiving the stationary unit 14A.

For each of the driving units 21A, the adjustment assembly 211A comprises a connecting shaft 201A, having a lower end portion connected with the corresponding stationary unit 14A, longitudinally extended within the driving compartment 171A of the base housing 10A, a biasing member 202A outwardly extended from the connecting shaft 201A within the upper compartment chamber 1711A at a position which is spacedly apart from an upper surface of the base panel 18A, and a resilient element 203A disposed between the base panel 18A and the biasing member 202A to normally exert an upward urging force toward the connecting shaft 201A so as to normally retain the corresponding stationary unit 14A within the lower compartment chamber 1712A.

Moreover, each of the adjustment assemblies 211A further comprises a plurality of locking teeth 204A formed an outer side of the connecting shaft 201A for engaging with the corresponding manual actuation unit 212A of the driving unit 21A. Accordingly, each of the manual actuation units 212A comprises an actuation pedal 2121A, having a driving end portion 2122A and an actuation end portion 2123A, extended from the adjustment assembly 211A to the control compartment 172A of the seat portion 17A through the communication slot 174A of the partitioning wall 173A, a first and a second locking members 2124A, 2128A pivotally and downwardly extended from the actuation end portion 2123A of the actuation pedal 2121A for selectively engaging with the locking teeth 204A of the corresponding driving assembly 211A. In order to normally retain engagement between the locking teeth 204A and the locking members 2124A, the manual actuation unit 212A further comprises a plurality of retention springs 2125A mounted within the upper compartment chamber 1711A of the driving compartment 171A to normally bias against the locking members 2124A respectively so as to make the locking members 2124A normally engaging with the locking teeth 204A for restricting a lateral movement between the connecting shaft 201A and the actuation pedal 2121A.

As shown in FIG. 10A and FIG. 10B of the drawings, each of the manual actuation units 212A further comprises a resilient member 2126A mounted in the control compartment 172A of the corresponding seat portion 17A of the base housing 10A to normally exert an upward urging force toward the actuation end portion 2123A of the actuation pedal 2121A, which is adapted for being stepped on by a user of the present invention. Thus, when the user steps on the actuation end portion 2123A of the actuation pedal 2121A, the actuation pedal 2121A is depressed so as to compress the resilient member 2126A mounted underneath the actuation end portion 2123A of the actuation pedal 2121A. Conversely, when the depression force is released (i.e. the user stops stepping onto the actuation pedal 2121A), the actuation end portion 2123A of the actuation pedal 2121A is restored to its original position with the resilient member 2126A decompressed.

In order to access the driving units 21A from an exterior of the base housing 10A, the base housing 10A further has a plurality of wheels control slot 175A formed on the seat portions 17A of the base housing respectively to communicate with the control compartments 172A for allowing users to access the driving units 21A via the wheels control slot 175A. In order that the transportation arrangement 20A does not affect the aesthetic appearance of the entire outdoor umbrella structure, each of the manual activation units 212A further comprises a pedal cover 2127A pivotally mounted to the base housing 10A at a top side edge of the corresponding wheels control slot 175A in an inwardly flappable manner, so that the pedal cover 2127A is arranged to normally cover the corresponding wheels control slot 175A, and when the user wishes to access the driving units 21A from exterior of the base housing 10A, he or she needs only to inwardly push the pedal cover 2127A into the control compartment 172A which then allows access to the actuation end portion 2123A of the actuation pedal 2121A. The user is then able to step onto the actuation end portion 2123A of the actuation pedal 2121A.

The operation of each of the driving units 21A is as follows: when the actuation end portion 2123A of the actuation pedal 2121A is depressed, the first locking member 2124A is also depressed to drive the connecting shaft 201A to move downwardly for a predetermined distance as dictated by the displacement of the driving end portion 2122A of the actuation pedal 2121A. When the actuation end portion 2123A of the actuation pedal 2121A is depressed to its maximum displacement (i.e. when the resilient member 2126A is compressed to its maximum extent) the user is unable to further depress the actuation end portion 2123A of the actuation pedal 2121A. At this stage, the user should release the depression force to the actuation pedal 2121A which is then rebounded to its original position by the resilient member 2126A. When the actuation end portion 2123A of the actuation pedal 2121A is rebounded, the engagement between the second locking member 2128A and the locking teeth 204A prevents the connecting shaft 201A from being driven move upwardly so as to retain the position thereof. As such, the user is able to depress the actuation end portion 2123A of the actuation pedal 2121A for several times so as to incrementally lower the position of the corresponding stationary unit 14A until it is lowered to stand on the ground surface for suspending supporting the base housing 10A and the outdoor umbrella 70A. When the four stationary units 14A are sequentially lowered, the base housing 10A is arranged to securely stand on the ground surface (i.e. idle mode).

Figure 5A:
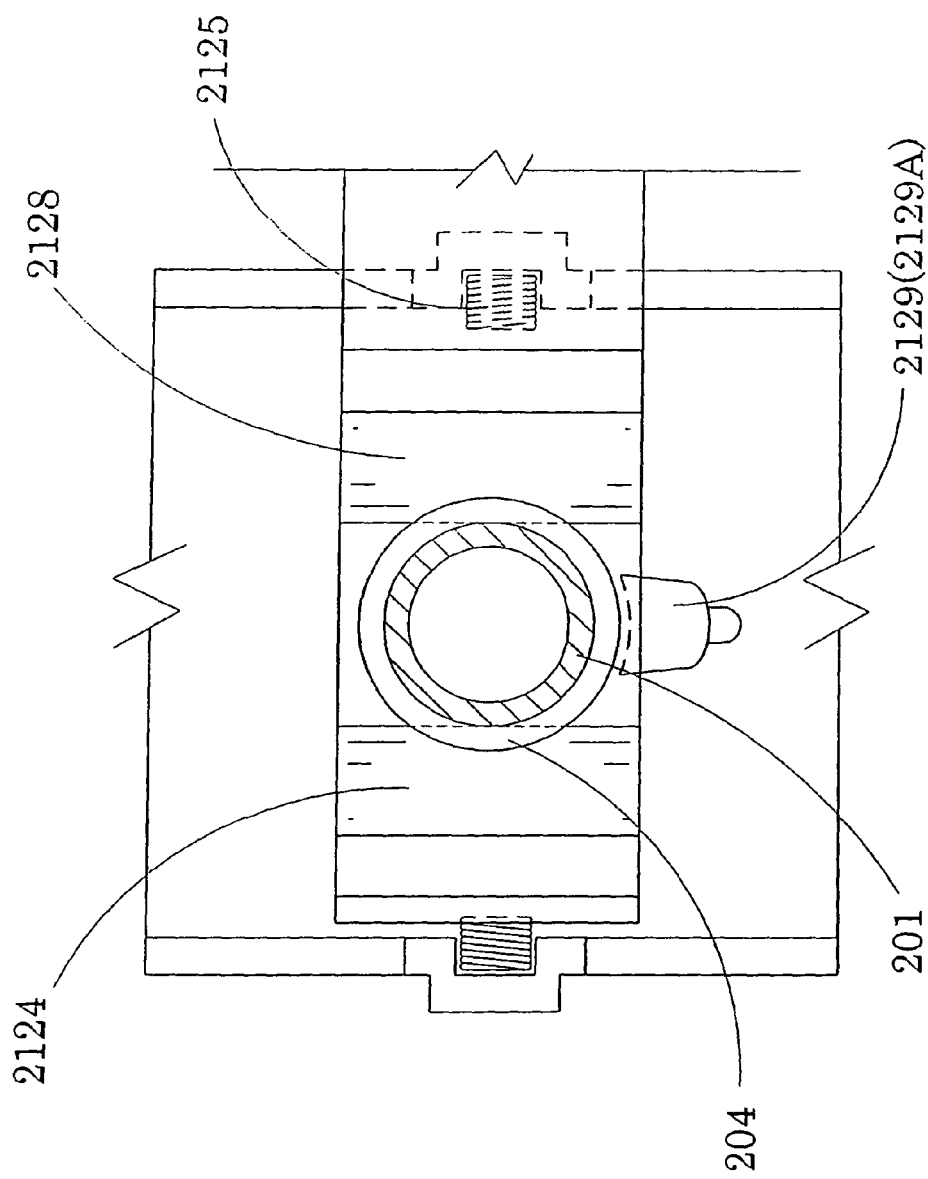
FIG. 5A and FIG. 5B are other schematic diagrams of the driving unit according to the above preferred embodiment of the present invention.
Figure 5B:
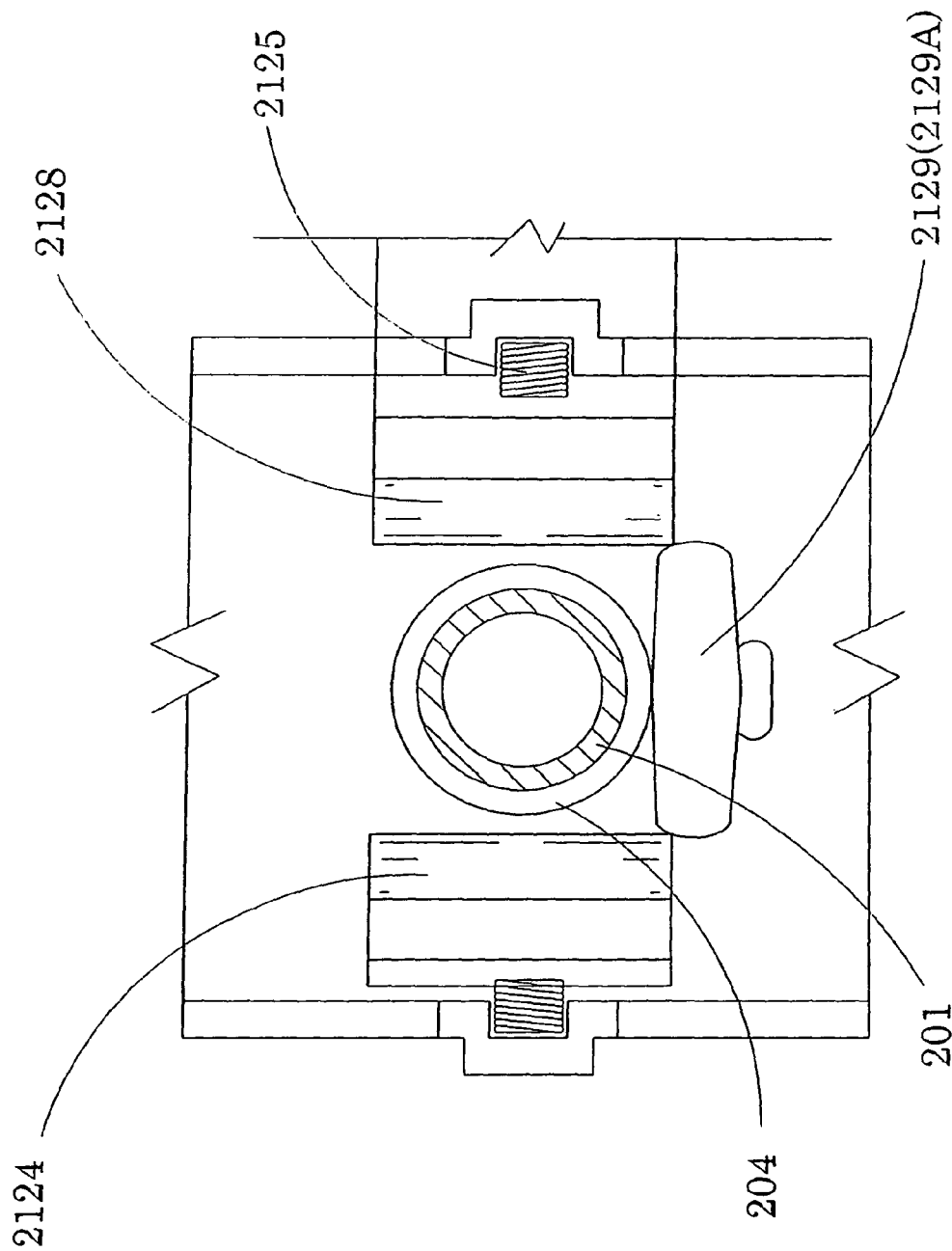

It is worth mentioning that the locking members 2124A, 2128A are selectively engaged with the locking teeth 204A such that when the locking members 2124A, 2128A are selectively disengaged from the locking teeth 204A, the connecting shaft 201A is pushed upwardly by the resilient element 203A and the stationary unit 14A is then pushed to restore to its original position (i.e. received into the base housing 10A). Accordingly, each of the manual activation units 212A further comprises an adjusting screw 2129A (as shown in FIG. 5A and FIG. 5B of the drawings) rotatably provided on the base housing 10A to connect with the first and the second locking member 2124A, 2128A, in such a manner that the adjusting screw 2129A is adapted to selectively engage and disengage the locking member 2124A, 2128A with and from the locking teeth 204A respectively. When the stationary units 14A are all received into the base housing 10A, the transferring wheels 15A are positioned underneath the stationary units 14A and left to stand on the ground surface. As a result, a user is able to transport the outdoor umbrella 70A via the transferring wheels (i.e. transportation mode).

Moreover, in order further enhance the stability of the base housing 10A, the base housing 10A further comprises a stabilizing agent filled therewithin for substantially increasing the weight of the base housing 10A. The stabilizing agent is preferably a predetermined amount of sand or water having a relatively high density among other objects.

Figure 11A:
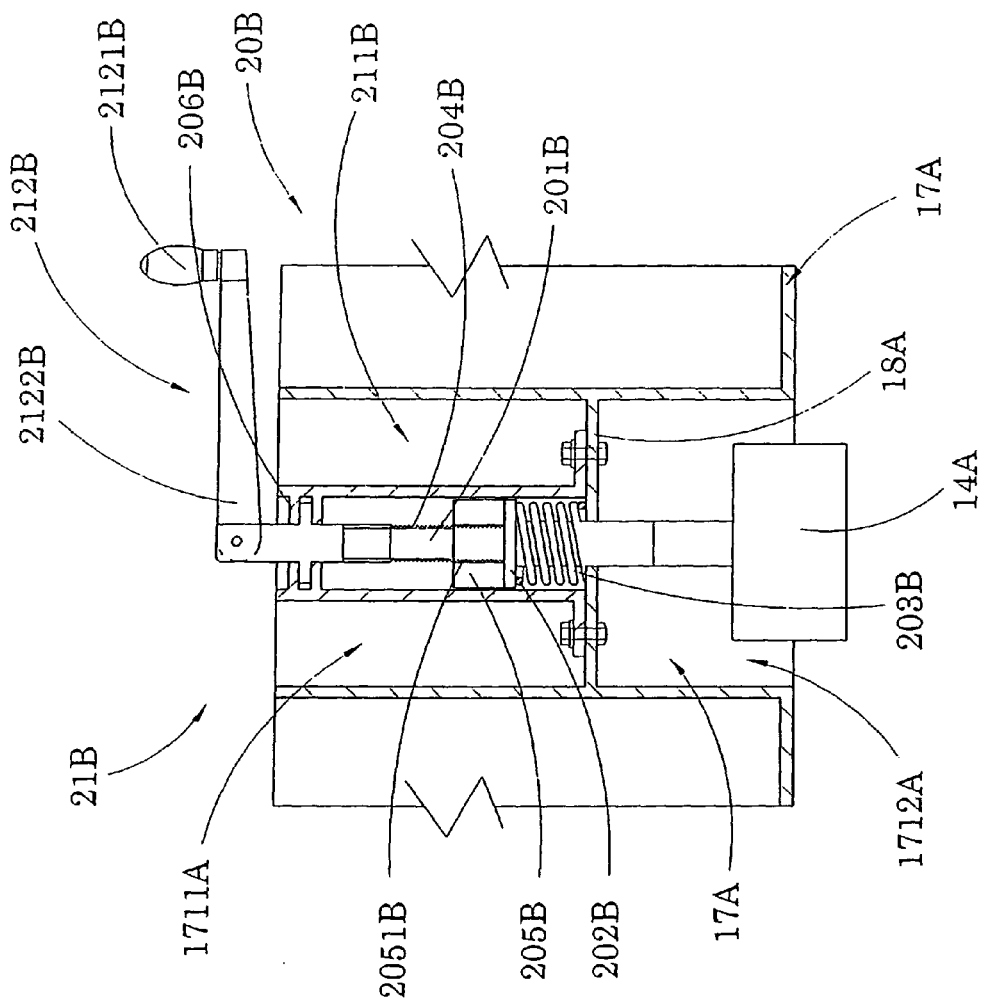
FIG. 11A and FIG. 11B are schematic diagrams of a first alternative mode of the adjustable rotation base according to the above second preferred embodiment of the present invention.
Figure 11B:
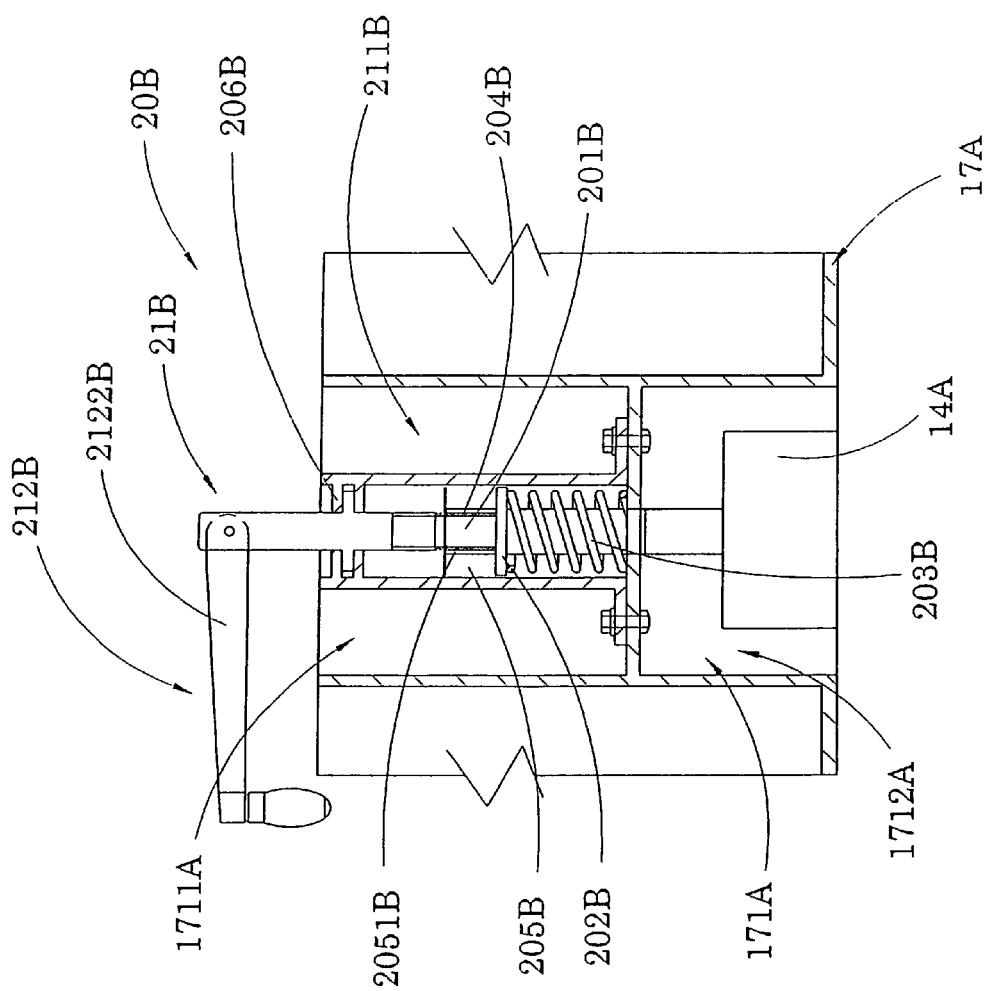

Referring to FIG. 11A to FIG. 11B of the drawings, a first alternative mode of the adjustable rotation base according to the above second preferred embodiment of the present invention is illustrated. The first alternative mode is similar to the preferred embodiment except the transportation arrangement 20B. According to the first alternative mode, the transportation arrangement 20B comprises a plurality of driving units 21B operatively and spacedly provided in the base housing 10A to mechanically communicate with the stationary units 14A respectively, wherein the driving units 21B are adapted to be selectively activated to operate the base housing 10A between the idle mode and the transportation mode.

More specifically, each of the driving units 21B comprises an adjustment assembly 211B mounted in the receiving cavity 13A and a manual actuation unit 212B extended from the adjustment assembly 211B out of the base housing 10A in such a manner that the manual actuation unit 212B is adapted to be manually and selectively operated for driving the adjustment assembly 21B to lift up the base housing 10A with respect to the ground surface.

For each of the driving units 21B, the adjustment assembly 211B comprises a connecting shaft 201B, having a lower end portion communicating with the corresponding stationary unit 14A, longitudinally extended within the driving compartment 171A of the base housing 10A, a biasing member 202B outwardly extended from the connecting shaft 201B within the upper compartment chamber 1711A at a position which is spacedly apart from an upper surface of the base panel 18A, and a resilient element 203B disposed between the base panel 18A and the biasing member 202B to normally exert an upward urging force toward the connecting shaft 201B so as to normally retain the corresponding stationary unit 14A within the lower compartment chamber 1712A.

According to the first alternative mode, the adjustment assembly 211B further comprises a rotary member 205B movably provided within the driving compartment 171A of the corresponding seat portion 17A of the base housing 10A to engage with the lower end portion of the connecting shaft 201B. More specifically, the rotary member 205B has a circular, ring-shaped cross section, wherein the rotary member 205B has a threaded inner surface for forming a plurality of screwing teeth 2051B on the inner surface of the rotary member 205B. On the other hand, the connecting shaft 201B further has a plurality of teeth 204B formed thereon to engage with the threaded inner surface of the rotary member 205B, in such a manner that when the connecting shaft 201B is driven to rotate, the rotary member 205B is also driven to rotate so as to initiate a linear movement thereof within the driving compartment 171A of the base housing 10A.

Referring to FIG. 11A to FIG. 11B of the drawings, the driving assembly 211B further comprises a shaft holder 206B provided on the upper compartment chamber 1711A of the base housing 10A for retaining a longitudinal movement of the connecting shaft 201B within the upper compartment chamber 1711A. Thus, when the connecting shaft 201B is driven to rotate in a predetermined direction, the rotary member 205B is also driven to rotate in such a manner that the rotary member 205B travels downwardly and longitudinally along the connecting shaft 201B to bias against the biasing member 202B which then lowers the corresponding stationary unit 14A and compress the resilient element 203B.

On the other hand, the manual activation unit 212B comprises a handle member 2121B extended out of the base housing 10A in a rotatably movable manner, and a actuation rod 2122B extended from an upper end portion of the connecting shaft 201B to the handling member 2121B.

Thus, when the handle member 2121B is driven to rotate in a predetermined direction, the connecting shaft 201B is also driven to rotate for lowering the corresponding stationary unit 14A by the descending movement of the rotary member 205B. When all of the stationary units 14A are descended to a position underneath the base housing 10A, the outdoor umbrella 70A is arranged to securely stand on the ground surface.

Conversely, when the user wishes to restore the position of the stationary units 14A, he or she simply needs to rotate the handle member 2121B in an opposed direction for screwing the rotary member 205B in that corresponding direction. Thus, the rotary member 205B is adapted to displace upwardly along the connecting shaft 201B for receiving into the base housing 10A with the assistance of the resilient member 2126B. When all the stationary units 14A are received into the base housing 10A so that the transferring wheels 15A are positioned underneath the stationary units 14A, the outdoor umbrella is readily transported by the transferring wheels 15A.

Figure 12:
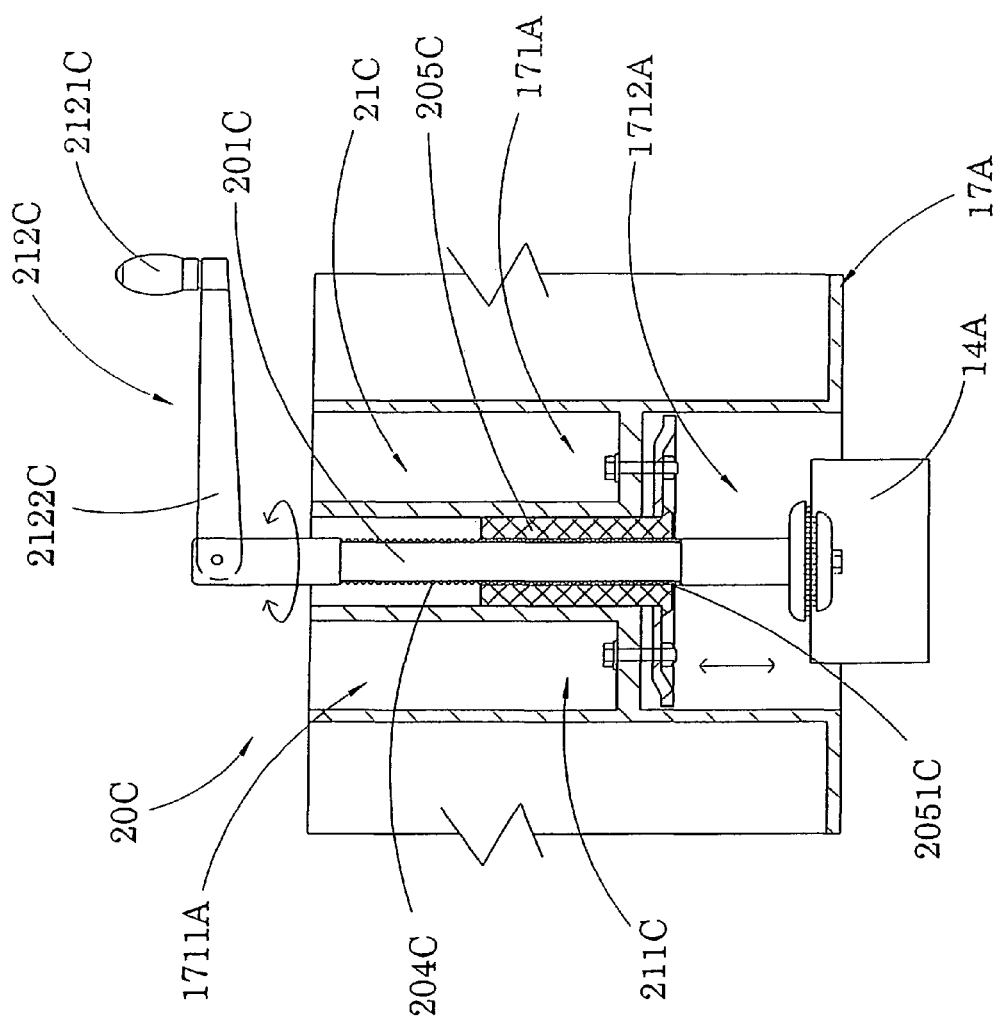
FIG. 12 is a second alternative mode of the adjustable rotation base according to the above second preferred embodiment of the present invention.

Referring to FIG. 12 of the drawings, a second alternative mode of the adjustable rotation base according to the preferred embodiment of the present invention is illustrated. The second alternative mode is similar to the preferred embodiment except the transportation arrangement 20C. According to the second alternative mode, the transportation arrangement 20C comprises a plurality of driving units 21C operatively and spacedly provided in the base housing 10A to mechanically communicate with the stationary units 14A respectively, wherein the driving units 21C are adapted to be selectively activated to operate the base housing 10A between the idle mode and the transportation mode.

Each of the driving units 21C comprises an adjustment assembly 211C mounted in the receiving cavity 13A and a manual actuation unit 212C extended from the adjustment assembly 211C out of the base housing 10 in such a manner that the manual actuation unit 212C is adapted to be manually and selectively operated for driving the adjustment assembly 211C to lift up the base housing 10A with respect to the ground surface.

For each of the driving units 21C, the adjustment assembly 211C comprises a connecting shaft 201C, having a lower end portion directly connecting with the corresponding stationary unit 14A, longitudinally extended within the driving compartment 171A of the base housing 10A.

According to the second alternative mode, the adjustment assembly 211C further comprises a rotary member 205C securely provided within the driving compartment 171A of the corresponding seat portion 17A of the base housing 10A to engage with the lower end portion of the connecting shaft 201C. More specifically, the rotary member 205C has a circular, ring-shaped cross section, wherein the rotary member 205C has a threaded inner surface for forming a plurality of screwing teeth 2051C on the inner surface of the rotary member 205C. On the other hand, the connecting shaft 201C further has a plurality of teeth 204C formed thereon to engage with the threaded inner surface of the rotary member 205C, in such a manner that when the connecting shaft 201C is driven to rotate, the connecting shaft 201C also displaces longitudinally along the driving compartment 171A to initiate a linear movement of the stationary unit 14A.

On the other hand, each of the manual actuation unit 212C comprises a handle member 2121C extended out of the base housing 10A in a rotatably movable manner, and a actuation rod 2122C extended from an upper end portion of the connecting shaft 201C to the handling member 2121C. Thus, when the handle member 2121C is driven to rotate in a predetermined direction, the connecting shaft 201C is also driven to rotate for lowering the corresponding stationary unit 14A by the descending movement of the connecting shaft 201C.

When all of the stationary units 14A are descended to a position underneath the base housing 10, the outdoor umbrella is securely supported by the stationary units 14A and is arranged to securely stand on a ground surface (i.e. the idle mode). When the user wishes to restore the position of the stationary unit 14A, he or she simply needs to rotate the handle member 2121C in an opposed direction for rotating the connecting shaft 201C in that corresponding direction, which is then adapted to displace upwardly along the driving compartment 17C for receiving the stationary units 14A back into the base housing 10A.

When all the stationary units 14A are received into the base housing 10A so that the transferring wheels 15A are positioned underneath the stationary units 14A, the outdoor umbrella is readily transported by the transferring wheels 15A (i.e. the transportation mode).

Figure 13:
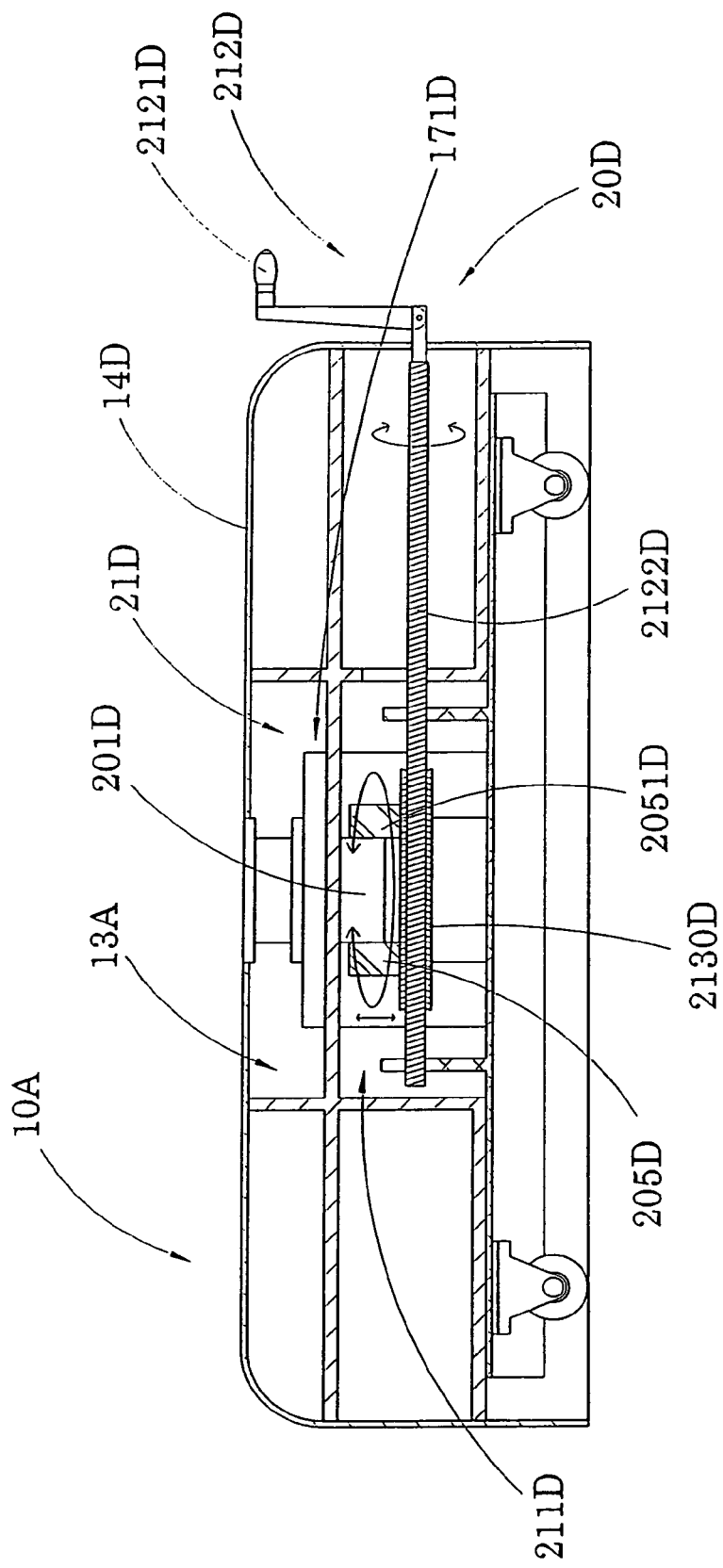
FIG. 13 is a third alternative mode of the adjustable rotation base according to the above second preferred embodiment of the present invention.

Referring to FIG. 13 of the drawings, a third alternative mode of the adjustable rotation base according to the above second preferred embodiment of the present invention is illustrated. The third alternative mode is similar to the second preferred embodiment except the transportation arrangement 20D, and that the stationary unit 14D is integrally incorporated with the base housing 10A to become a supporting frame for the base housing 10A.

According to the third alternative mode, the transportation arrangement 20D comprises a driving unit 21D operatively and spacedly provided in the base housing 10A, wherein the driving unit 21D is adapted to be selectively activated to operate the base housing 10A between the idle mode and the transportation mode.

The driving unit 21D comprises an adjustment assembly 211D mounted in the receiving cavity 13A and a manual actuation unit 212D extended from the adjustment assembly 211D out of the base housing 10A in such a manner that the manual actuation unit 212D is adapted to be manually and selectively operated for driving the adjustment assembly 211D to lift up the base housing 10A with respect to the ground surface.

The adjustment assembly 211D comprises a connecting shaft 201D connecting with the base housing 10A and longitudinally extending within the driving compartment 171A of the base housing 10A.

Moreover, the adjustment assembly 211D further comprises a plurality of rotary members 205D securely provided within the driving compartment 171A of the corresponding seat portion 17A of the base housing 10A to engage with the connecting shaft 201D. Each of the rotary members 205D has a circular, ring-shaped cross section, and a threaded inner surface for forming a plurality of screwing teeth on the inner surface of the respective rotary member 205D. On the other hand, the connecting shaft 201D further has a plurality of teeth 2051D formed thereon to engage with the threaded inner surface of the rotary member 205D, in such a manner that when the connecting shaft 201D is driven to rotate, the connecting shaft 201D also displaces longitudinally along the driving compartment 171A to initiate a linear movement stationary unit 14D.

On the other hand, each of the manual actuation unit 212D comprises a handle member 2121D extended out of the base housing 10A in a rotatably movable manner, an actuation rod 2122D extended from the connecting shaft 201D to the handling member 2121D, and an actuation rotor 2130D coupling with the actuation rod 2122D and the rotary members 205D in such a manner that when the actuation rod 2122D is driven to rotate about its own axis, the actuation rotor 2130D is arranged to be driven to rotate about the longitudinal axis of the connecting shaft 201D. Thus, when the handle member 2121D is driven to rotate in a predetermined direction, the actuation rod 2122D is also driven to rotate about its own axis which then drives the rotary members 205D to rotate about the longitudinal axis of the connecting shaft 201D. As such, the connecting shaft 201D, which is coupling with the rotary members 205D, is also driven to move upwardly and longitudinally to bias against the supporting frame as the stationary unit 14D. Therefore, the connecting shaft 201D is adapted to uplift the stationary unit 14D and eventually the entire base housing 10A with respective to the ground surface so as to allow the transferring wheels 15A to be positioned underneath the base housing 10A (i.e. transportation mode). At this transportation mode, a user is able to transport the outdoor umbrella 70A via the transferring wheels 15A.

Conversely, when the handle member 2121D is rotated at an opposed direction, the actuation rod 2122D is also driven to rotate about its own axis which then drives the rotary members 205D to rotate about the longitudinal axis of the connecting shaft 201D in the corresponding direction as opposed to lifting up the base housing 10A. As such, the connecting shaft 201D, which is coupling with the rotary members 205D, is also driven to move downwardly and longitudinally for releasing an upward urging force towards the supporting frame as the stationary unit 14D. Therefore, the entire base housing 10A and the stationary unit 14D is gradually lowered to sit on the ground surface (i.e. the idle mode) for securely supporting the outdoor umbrella 70A.

Figure 14A:
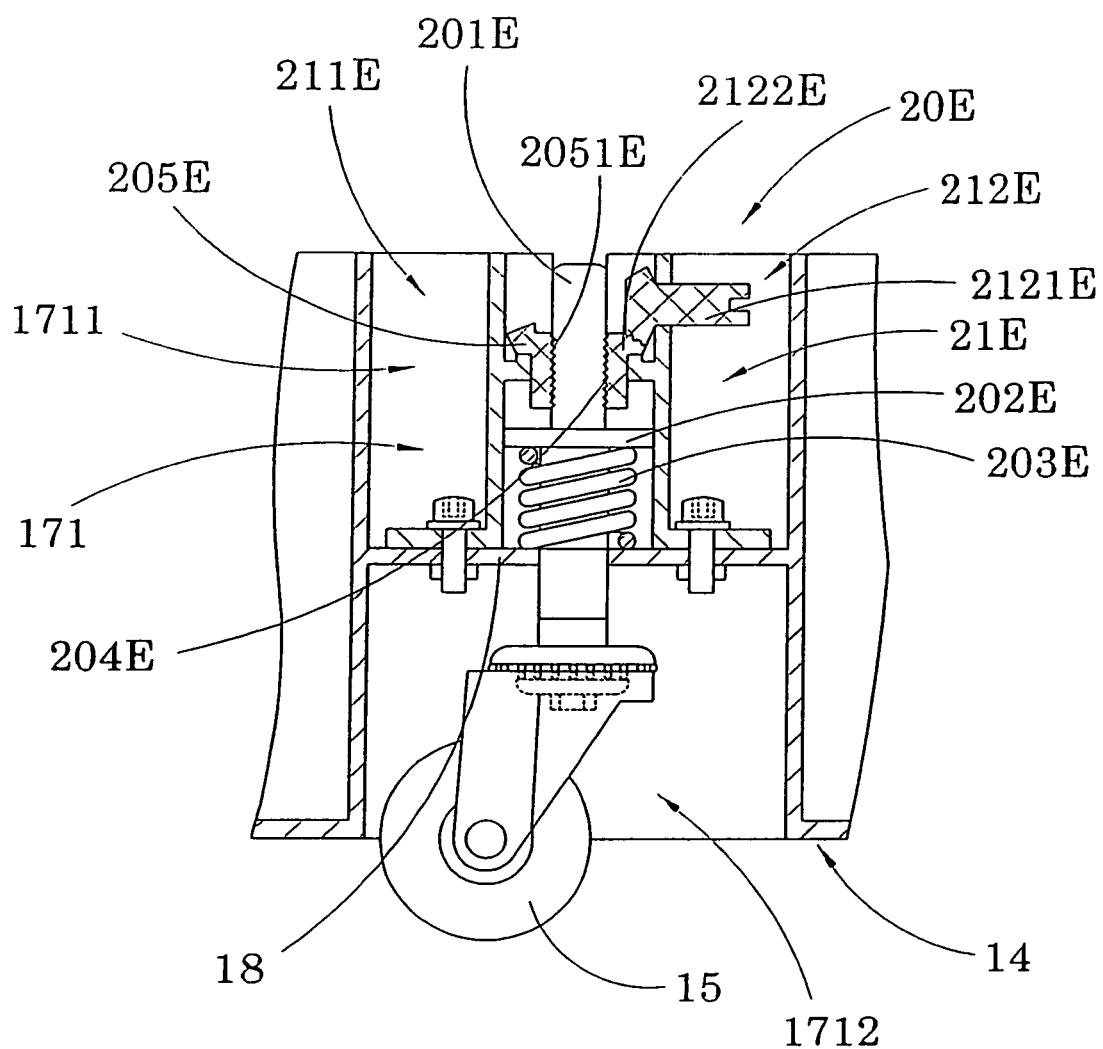
FIGS. 14A and 14B are fourth alternative mode of the adjustable rotation base according to the above preferred embodiment of the present invention.
Figure 14B:
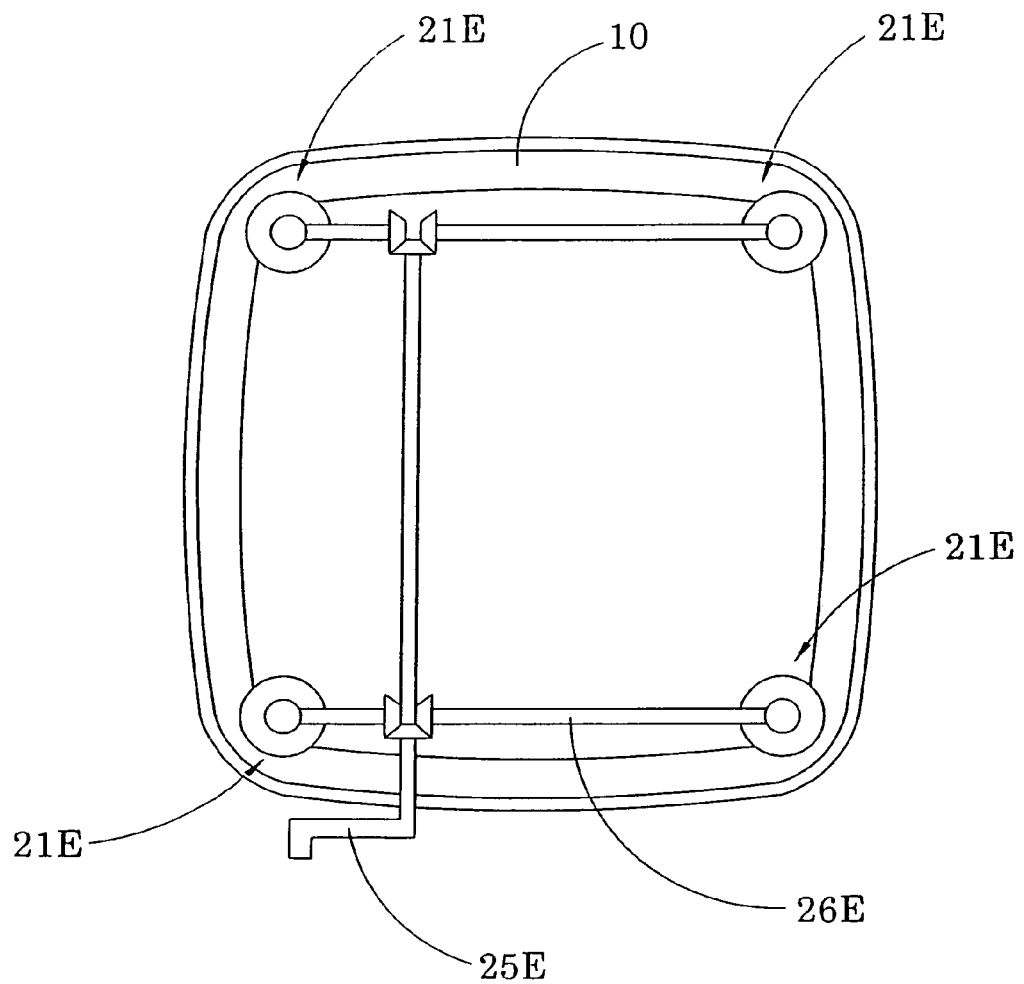

Referring to FIG. 14A and FIG. 14B of the drawings, a fourth alternative mode of the adjustable rotation base according to the preferred embodiment of the present invention is illustrated. The fourth alternative mode is similar to the preferred embodiment except the transportation arrangement 20E.

According to the fourth alternative mode, the transportation arrangement 20E comprises a plurality of driving units 21E operatively and spacedly provided in the base housing 10 to mechanically communicate with the stationary units 14 respectively, wherein the driving units 21E are adapted to be selectively activated to operate the base housing 10 between the idle mode and the transportation mode.

Each of the driving units 21E comprises an adjustment assembly 211E mounted in the receiving cavity 13 and a manual actuation unit 212E extended from the adjustment assembly 211E out of the base housing 10 in such a manner that the manual actuation unit 212E is adapted to be manually and selectively operated for driving the adjustment assembly 211E to lift up the base housing 10 with respect to the ground surface.

For each of the driving units 21E, the adjustment assembly 211E comprises a connecting shaft 201E, having a lower end portion directly connecting with the corresponding transferring wheels 15, longitudinally extended within the driving compartment 171 of the base housing 10.

According to the fourth alternative mode, the adjustment assembly 211E further comprises a rotary member 205E securely provided within the driving compartment 171 of the corresponding seat portion 17 of the base housing 10 to engage with the connecting shaft 201E. The rotary member 205E has a circular, ring-shaped cross section, wherein the rotary member 205E has a threaded inner surface for forming a plurality of screwing teeth 2051E on the inner surface of the rotary member 205E. On the other hand, the connecting shaft 201E further has a plurality of teeth 204E formed thereon to engage with the threaded inner surface of the rotary member 205E, in such a manner that when the connecting shaft 201E is driven to rotate, the connecting shaft 201E also displaces longitudinally along the driving compartment 171 to initiate a linear movement of the transferring wheels 15.

On the other hand, each of the manual actuation unit 212E comprises a handle member 2121E extended out of the base housing 10 in a rotatably movable manner, and an actuation member 2122E rotatably mounted on the base housing 10 to engage with the rotary member 205E of the adjustment assembly 211E. When the handle member 2121E is drive to rotate, the actuation member 2122E is also driven to rotate so as to drive the connecting shaft 201E to displace linearly along the driving compartment 171 for lowering the corresponding transferring wheel 15. The resilient element 203E is disposed between the base panel 18 and the biasing member 202E to normally exert an upward urging force toward the connecting shaft 201E so as to normally retain the corresponding transferring wheel 15 within the lower compartment chamber 1712.

The transportation arrangement 20E further comprises a main actuation handle 25E movably extended from the base housing 10 and a plurality of actuating members 26E operatively connected between the main actuation handle 25E and the four driving units 21E in such a manner that when the main actuation handle 25E is driven to rotate, the actuating members 26E are also driven to operate the driving units 21E in the above-mentioned manner so as to operate the main housing 10 idle mode and the transportation mode by one single main actuating handle 25E.

When all of the transferring wheels 15 are descended to a position underneath the base housing 10, the outdoor umbrella is movably supported by the transferring wheels 15. When the user wishes to restore the position of the transferring wheels 15, he or she simply needs to rotate the handle member 2121E in an opposed direction for rotating the connecting shaft 201E in that corresponding direction, which is then adapted to displace upwardly along the driving compartment 17 for receiving the transferring wheels 15 back into the base housing 10. The stationary units 14E in this fourth alternative mode are embodied as the bottom surfaces of the base housing 10.

Figure 15A:
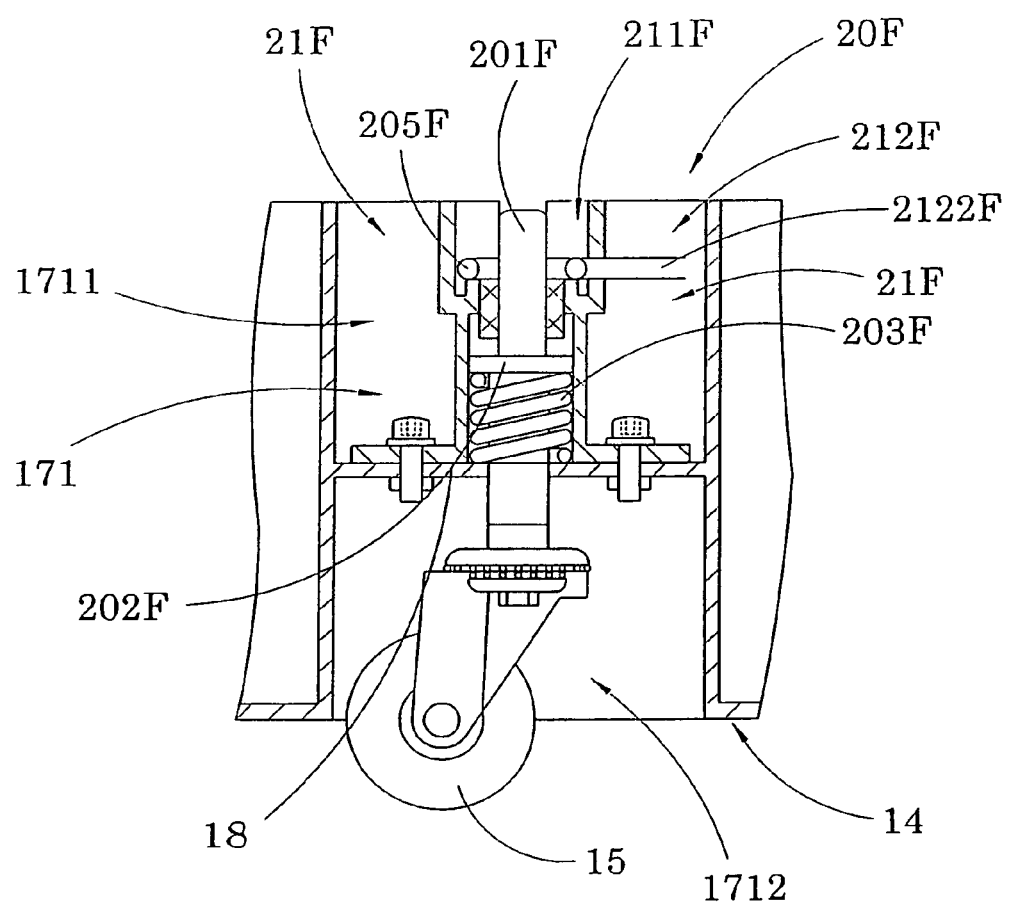
FIGS. 15A and 15B are fifth alternative mode of the adjustable rotation base according to the above preferred embodiment of the present invention.
Figure 15B:
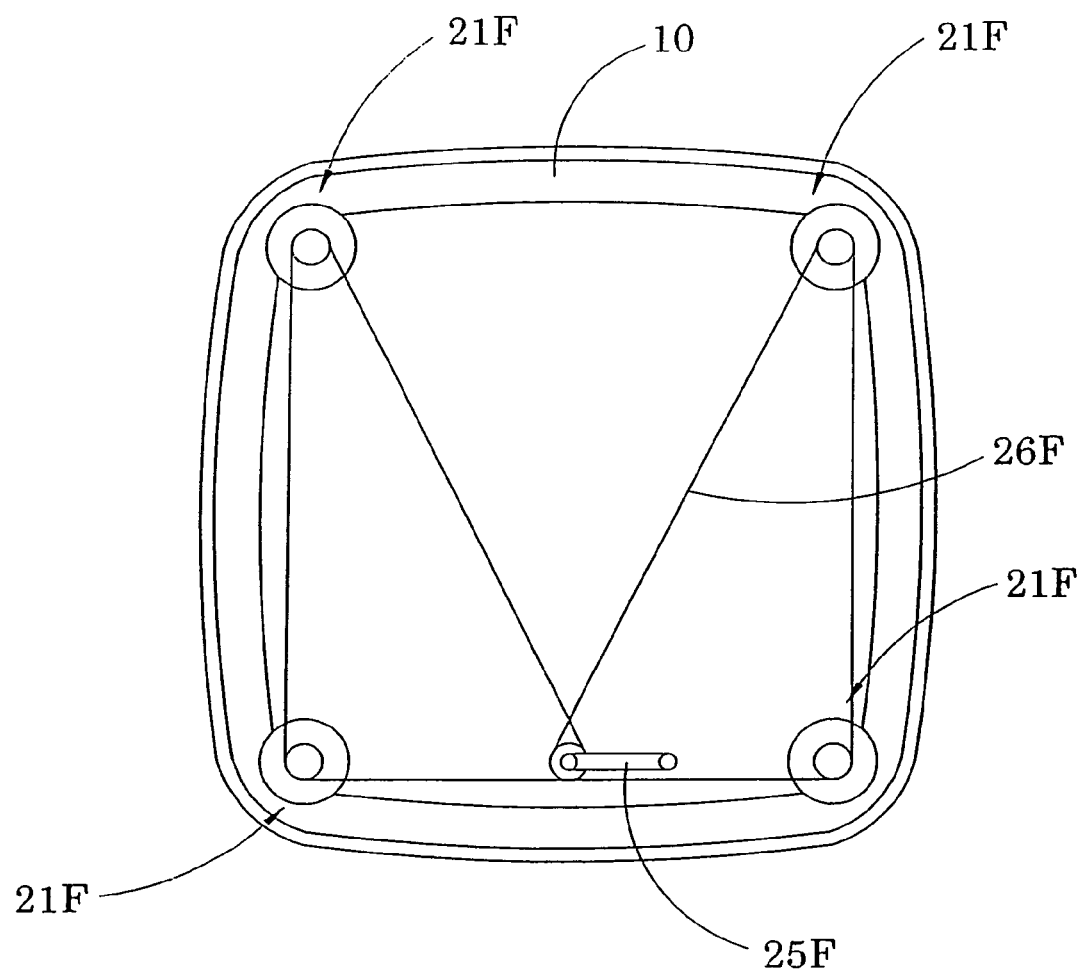

Referring to FIG. 15A and FIG. 15B of the drawings, a fifth alternative mode of the adjustable rotation base according to the preferred embodiment of the present invention is illustrated. The fifth alternative mode is similar to the preferred embodiment except the transportation arrangement 20F.

The transportation arrangement 20F comprises a plurality of driving units 21F operatively and spacedly provided in the base housing 10, to mechanically communicate with the stationary units 14 respectively, wherein the driving units 21F are adapted to be selectively activated to operate the base housing 10 between the idle mode and the transportation mode.

Each of the driving units 21F comprises an adjustment assembly 211F mounted in the receiving cavity 13 and a manual actuation unit 212F extended from the adjustment assembly 211F out of the base housing 10 in such a manner that the manual actuation unit 212F is adapted to be manually and selectively operated for driving the adjustment assembly 211F to lift up the base housing 10 with respect to the ground surface.

For each of the driving units 21F, the adjustment assembly 211F comprises a connecting shaft 201F, having a lower end portion directly connecting with the corresponding transferring wheels 15, longitudinally extended within the driving compartment 171 of the base housing 10.

According to the fifth alternative mode, the adjustment assembly 211F further comprises a rotary member 205F securely provided within the driving compartment 171 of the corresponding seat portion 17 of the base housing 10 to engage with the connecting shaft 201F. On the other hand, each of the manual actuation units 212F comprises an actuation member 2122F, preferably embodied as a driving chain, movably mounted on the base housing 10 to engage with the rotary member 205F of the adjustment assembly 211F. When the actuation member 2122F is driven to move, the connecting shaft 201F is also driven to displace linearly along the driving compartment 171 for lowering the corresponding transferring wheel 15. The resilient element 203F is disposed between the base panel 18 and the biasing member 202F to normally exert an upward urging force toward the connecting shaft 201F so as to normally retain the corresponding transferring wheel 15 within the lower compartment chamber 1712.

The transportation arrangement 20F further comprises a main actuation handle 25F movably extended from the base housing 10 and a plurality of actuating chains 26F operatively connected between the main actuation handle 25F and the four driving units 21F in such a manner that when the main actuation handle 25F is driven to rotate, the actuating chains 26F are also driven to operate the driving units 21F in the above-mentioned manner so as to operate the main housing 10 idle mode and the transportation mode by one single main actuating handle 25F.

When all of the transferring wheels 15 are descended to a position underneath the base housing 10, the outdoor umbrella is movably supported by the transferring wheels 15. When the user wishes to restore the position of the transferring wheels 15, he or she simply needs to rotate the main handle member 25F in an opposed direction for rotating the connecting shaft 201F in that corresponding direction, which is then adapted to displace upwardly along the driving compartment 17 for receiving the transferring wheels 15 back into the base housing 10. The stationary units 14 in this fifth alternative mode are embodied as the bottom surfaces of the base housing 10.

Figure 16:
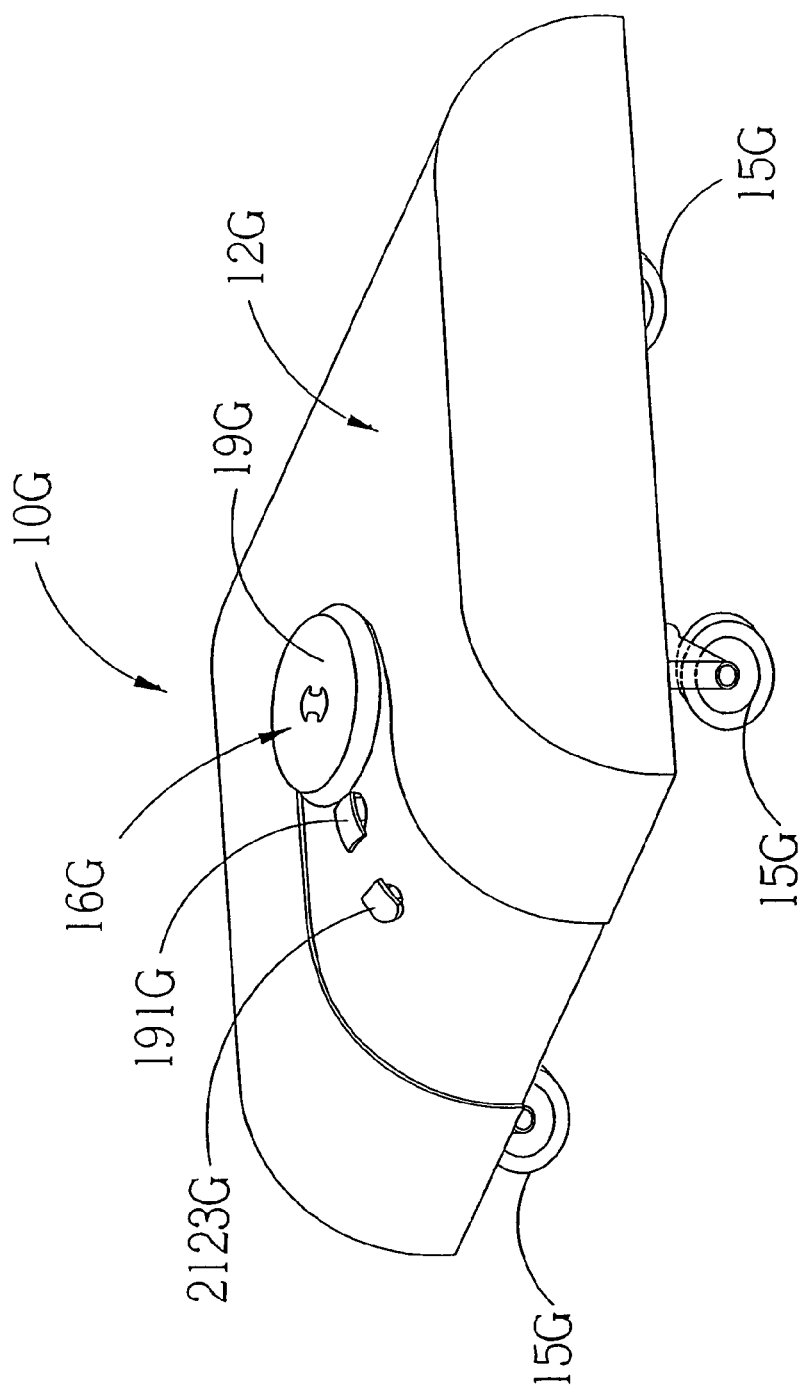
FIG. 16 is a sixth alternative mode of the adjustable rotation base according to the above preferred embodiment of the present invention.

Referring to FIG. 16 of the drawings, a sixth alternative mode of the adjustable rotation base according to the above preferred embodiment of the present invention is illustrated, in which the adjustable rotation base comprises a base housing 10G and a transportation arrangement 20G.

The base housing 10G has a bottom side 11G, an upper side 12G for coupling with the supporting post to support the outer umbrella in an upright manner, and a receiving cavity 13G indently formed on the bottom side 11G of the base housing 10B, wherein the base housing 10G comprises a stationary unit 14G provided at the bottom side 11G for sitting on the ground surface in a stationary manner, and a plurality of transferring wheels 15G rotatably supported at the bottom side 11G of the base housing 10G.

The transportation arrangement 20G is provided at the base housing 10G to operate the base housing 10G between an idle mode and a transportation mode, wherein in the idle mode, the transferring wheels 15G are suspendly lifted up to define a clearance between the transferring wheels 15G and the ground surface such the base housing 10G is sat on the ground surface via the stationary unit 14G in a stationary manner, wherein in the transportation mode, the stationary unit 14G is upwardly and concurrently lifted to allow the transferring wheels 15G being sitting on the ground surface, such that the base housing 10G is adapted to be transported on the ground surface via the transferring wheels 15G.

According to the preferred embodiment of the present invention, the base housing 10G further has a coupling hole 16G formed at the upper side 12G of the base housing 10G to communicate with the receiving cavity 13G, wherein the supporting post of the outdoor umbrella is coupled with the base housing 10G through the coupling hole 16G. The stationary unit 14G is preferably embodied as bottom surfaces of the base housing 10G.

Moreover, the base housing 10G further comprises a rotary support 19G rotatably mounted at the receiving cavity 13G of the base housing 10G, in such a manner that the outdoor umbrella is adapted to couple with the rotary support 19G via the coupling hole 16G. Moreover, the base housing 10G further comprises a control pedal 191G extended from the rotary support 19G to an exterior of the base housing 10G, so as to selectively control a rotation of the rotary support 19G. Thus, when the control pedal 191G is actuated, the rotary support 19G is rotatable with respective to the base housing 10G for adjusting an orientation of the outdoor umbrella. Accordingly, a rotational movement of the rotary support 19G is locked up at the base housing 10G unless a stepping force is applied at the control pedal 191G. Therefore, the user is able to step at the control pedal 191G to release the locked rotary support 19G to turn the outdoor umbrella at the desired orientation.

Figure 17:
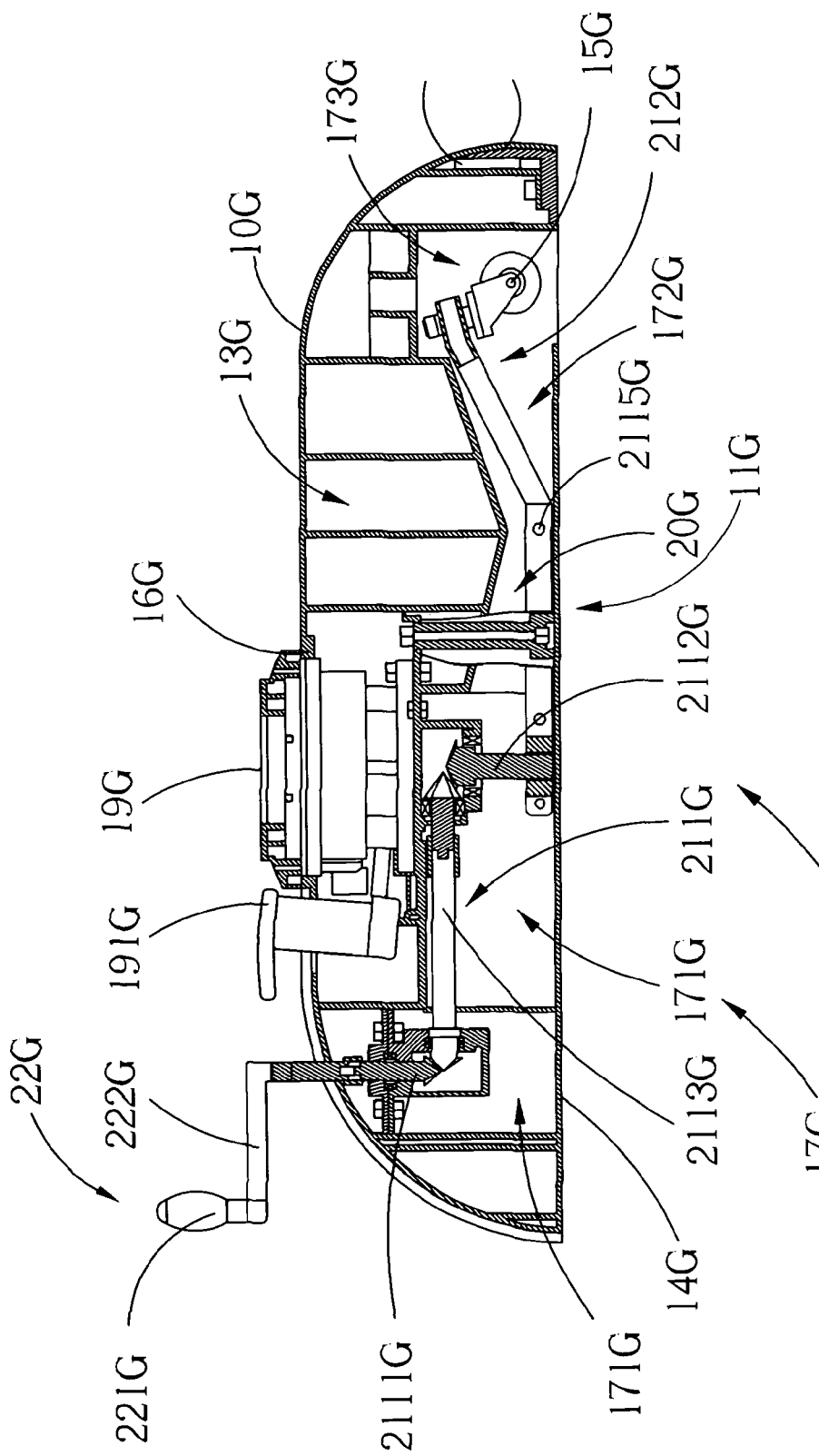
FIG. 17 is a sectional side view of the adjustable rotation base according to the above sixth preferred embodiment of the present invention.

According to the sixth alternative mode, referred to FIG. 16 and FIG. 17 of the drawings, the transportation arrangement 20G comprises a driving unit operatively provided in the base housing 10G to mechanically communicate with the transferring wheels 15G respectively, wherein the driving unit are adapted to be selectively activated to operate the base housing 10G between the idle mode and the transportation mode.

The driving unit of the transportation arrangement 20G comprises an adjustment assembly 21G mounted in the receiving cavity 13G and a manual actuation unit 22G extended from the adjustment assembly 21G out of the base housing 10G in such a manner that the manual actuation unit 22G is adapted to be manually and selectively operated for driving the adjustment assembly 21G to lift up the base housing 10G with respect to the transferring wheels 15G.

According to the sixth alternative mode, referred to FIG. 16 and FIG. 17 of the drawings, the base housing 10G further comprises a plurality of seat portions 17G formed in the receiving cavity 13G of the base housing 10G, wherein the transferring wheels 15G and the transportation arrangement 20G are coupled at the corresponding seat portions 17G for selectively operating the base housing 10G between the idle mode and the transportation mode, wherein each of the seat portions 17G further comprises a control compartment 171G, a plurality of transferring wheel receiving compartments 173G and a plurality of driving compartments 172G communicating the control compartment 171G with the respective transferring wheel receiving compartments 173G respectively, wherein the adjustment assembly 21G and the manual actuation unit 22G are mounted in the driving compartments 172G and the control compartment 171G respectively and communicating with each other, and the transferring wheels 15G are provided in the transferring wheel receiving compartments 173G respectively.

Figure 18A:
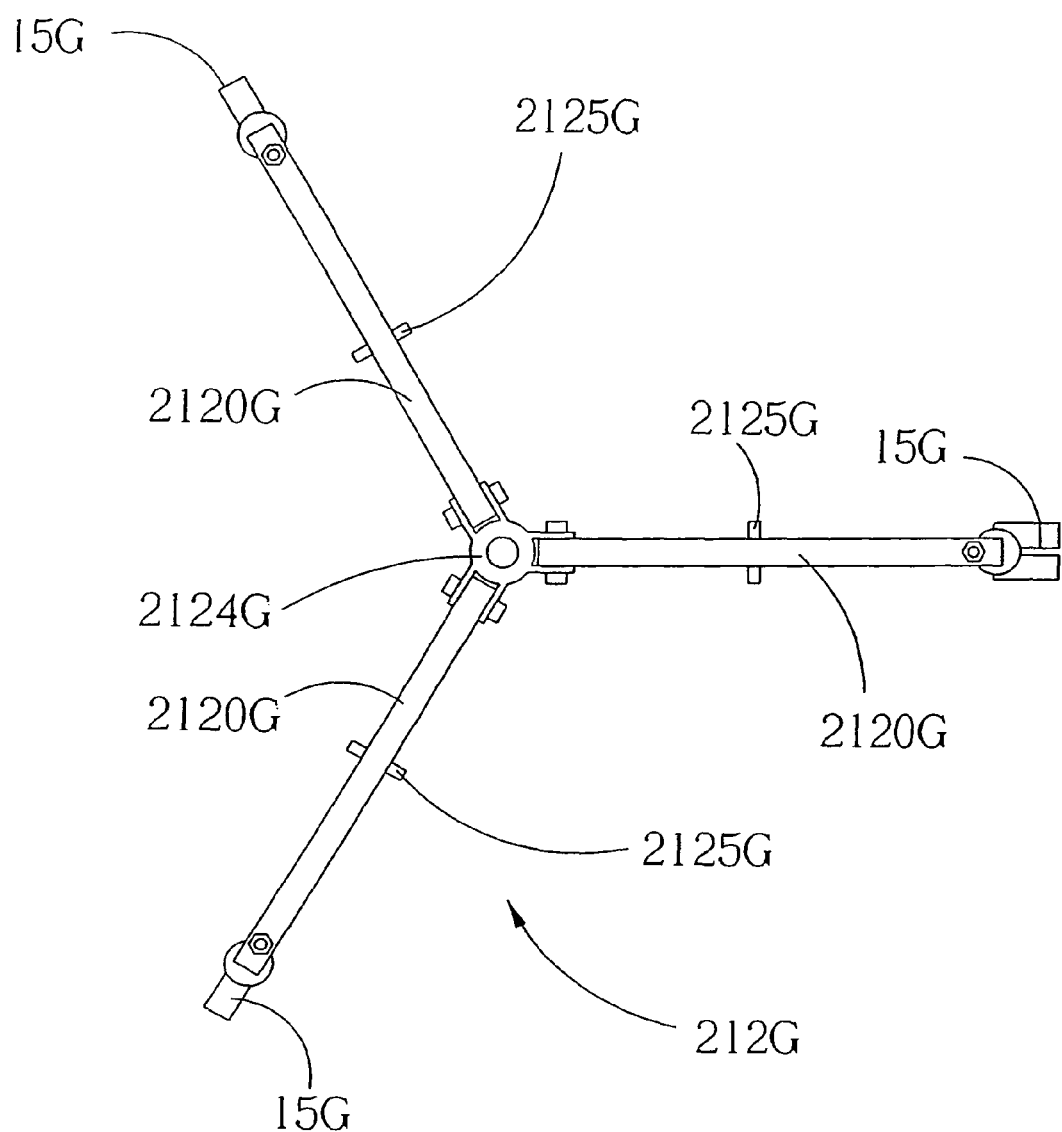
FIG. 18A is a perspective view of an adjustment assembly of the adjustable rotation base according to the above sixth preferred embodiment of the present invention.
Figure 18B:
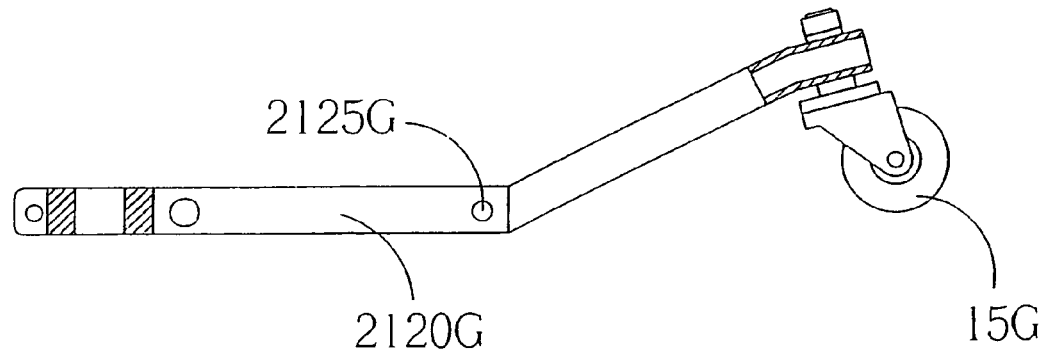
FIG. 18B is a sectional side view of a leverage driving unit of the adjustment assembly of the adjustable rotation base according to the above sixth preferred embodiment of the present invention.

Referred to FIGS. 17, 18A and 18B of the drawings, the adjustment assembly 21G comprises a transferring magnitude unit 211G arranged in the control compartment 171G, and a leverage driving unit 212G arranged in the driving compartments respectively and pivotally coupling with the transferring magnitude unit 211G. The transferring magnitude unit 211G comprises a driving angle gear 2111G arranged in the control compartment 171G, and a transferring magnitude angle gear 2112G coupling with the driving angle gear 2111G by a driving rod 2113G transversely provided in the control compartment 171B. As shown in FIG. 17, the transferring magnitude angle gear 2112G is extended parallel to the driving angle gear 2111G, wherein the driving rod 2113G is perpendicularly coupled between the transferring magnitude angle 2112G and the driving angle gear 2111G end-to-end to transmit the rotational force in a directional manner.

The leverage driving unit 212G comprises a central hub 2124G slidably coupled with the transferring magnitude angle gear 2112G and a plurality of levers 2120G supported in the corresponding driving compartment 172G to pivotally and radially coupled with the central hub 2124G. Accordingly, when the manual actuation unit 22G is operated for generating a rotational force, the central hub 2124G is lifted upwardly to drop down the transferring wheels 15G at the transportation mode.

Accordingly, each of the levers 2120G has an inner pivot end pivotally coupled with the central hub 2124G and an outer end coupling with the respective transferring wheel 15G, wherein each of the levers 2120G is pivotally coupled with the base housing 10G between the inner pivot end and the outer end of the lever 2120G.

Each of the levers 2120G has an inclined lower end portion connected with the corresponding transferring wheel 15G and an upper end portion movably coupled with the central hub 2124G to be driven by the transferring magnitude angle gear 2112G in a movably bolt manner. Accordingly, when the upper end portion of each of the levers 2120G is positioned horizontally, the lower end portion of the respective lever 2120G is upwardly and inclinedly extended to suspendedly support the transferring wheel 15G. Such that the leverage driving units 212G are driven by the transferring magnitude unit 211G to selectively retain the corresponding transferring wheel 15G for the idle mode and the transportation mode. More specifically, the driving compartments 172G of these seat portions 17G are formed at the base housing 10G in three-cornered manner, and the leverage driving units 212G are spacedly and pivotally provided at the driving compartments 172G respectively. More specifically, each lever 2120G of the leverage driving units 212G is mounted on the bottom side 11G by a pin 2125G to form a pivot point of each of the levers 2120G.

On the other hand, the manual activation unit 22G comprises a handle member 221G extended out of the base housing 10G in a rotatably movable manner, and an actuation rod 222G transversely extended from the handle member 221G and having a lower end portion to detachably engage with the driving angle gear 2111G, in such a manner that when the handle member 221G is driven to rotate in a predetermined direction as a hand crank action to generate the rotational force, the driving angle gear 2111G is also driven for lowering the corresponding transferring wheel 15G by the corresponding transferring magnitude angle gear 2112G and the corresponding leverage driving unit 212G to allow the transportation arrangement 20G to be in the transportation mode; and when the handle member 221G is driven to rotate in an opposed direction when the transportation arrangement 20G is in the transportation mode, the leverage driving units 212G are driven by the transferring magnitude unit 211G respectively to receive the corresponding transferring wheel 15G into the base housing 10G and restore the transportation arrangement 20G at the idle mode. More specifically, a control compartment cover 2123G is detachably covered on the control compartment 171G when the handle member 221G is detached from the driving angle gear 2111G.

In other words, when the handle member 221G is driven to rotate by the user, the rotational force of the handle member 221G is transferred to the transferring magnitude angle gear 2112G through the driving angle gear 2111G and the driving rod 2113G, so as to drive the transferring magnitude angle gear 2112G. Once the transferring magnitude angle gear 2112G is rotated, the central hub 2124G is driven to slide upwardly to pivotally lift up the corresponding ends of the levers 2120G. As a result, the transferring wheels 15G are dropped downwardly by the pivotal movements of the levers 2120G until the transferring wheels 15G ground on the surface to lift up the base housing 10G. Likewise, by applying an opposed rotational force at the handle member 221G, the transferring magnitude angle gear 2112G is rotated at an opposite direction such that the central hub 2124G is driven to slide downwardly to pivotally drop down the corresponding ends of the levers 2120G. Therefore, the transferring wheels 15G are lifted upwardly by the pivotal movements of the levers 2120G and are returned back into the base housing 10G. It is worth to mention that the magnitude angle gear 2112G has an outer threaded portion engaging with an inner threaded portion of the central hub 2124G such that when the magnitude angle gear 2112G is rotated, the central hub 2124G will be correspondingly driven to slide along the magnitude angle gear 2112G. Therefore, the central hub 2124G is slid upwardly along the magnitude angle gear 2112G to drop down the transferring wheels 15G or is slid downwardly along the magnitude angle gear 2112G to lift up the transferring wheels 15G.

Thus, when the handle member 221G is driven to rotate in a predetermined direction, the driving angle gear 2111G is also driven to rotate for lowering the corresponding transferring wheel 15G by the engagement of the transferring magnitude angle gear 2112G. When all of the transferring wheels 15G are descended to a position underneath the base housing 10G, the outdoor umbrella is set to be transported by the transferring wheels 15G. When the user wishes to restore the position of the transferring wheel 15B, he or she simply needs to rotate the handle member 221G in an opposed direction for screwing the transferring magnitude unit 211G in that corresponding direction. Thus, the transferring wheels 15G are adapted to displace upwardly for receiving into the base housing 10G.

Figure 19:
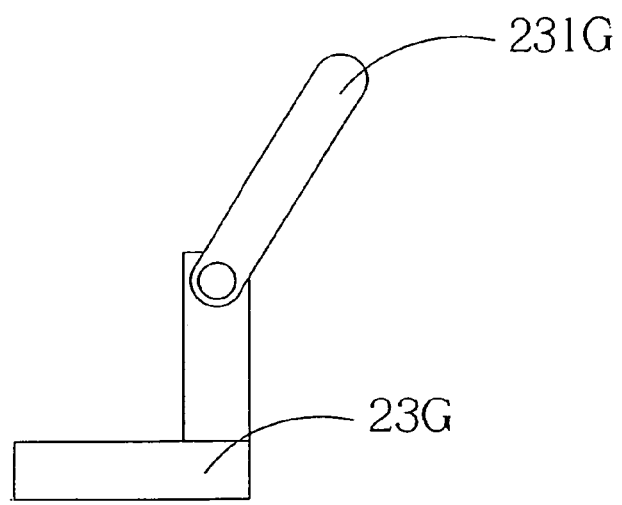
FIG. 19 is a sectional side view of a pull seat of the adjustable rotation base according to the above sixth preferred embodiment of the present invention.

Referred to FIG. 19 of the drawings, the transportation arrangement 20G further comprises a pull seat 23G provided at an upper portion of the base housing 10G, wherein the pull seat 23G comprises a pull member 231G rotatably arranged therein to pull the base housing 10G to any directions when the transportation arrangement 20G is in the transportation mode, and a seat cover 232G detachably covered on the pull seat 23G for hiding the pull member 231G in the pull seat 23G of the base housing 10G when the transportation arrangement 20G is in the idle mode.

Figure 20:
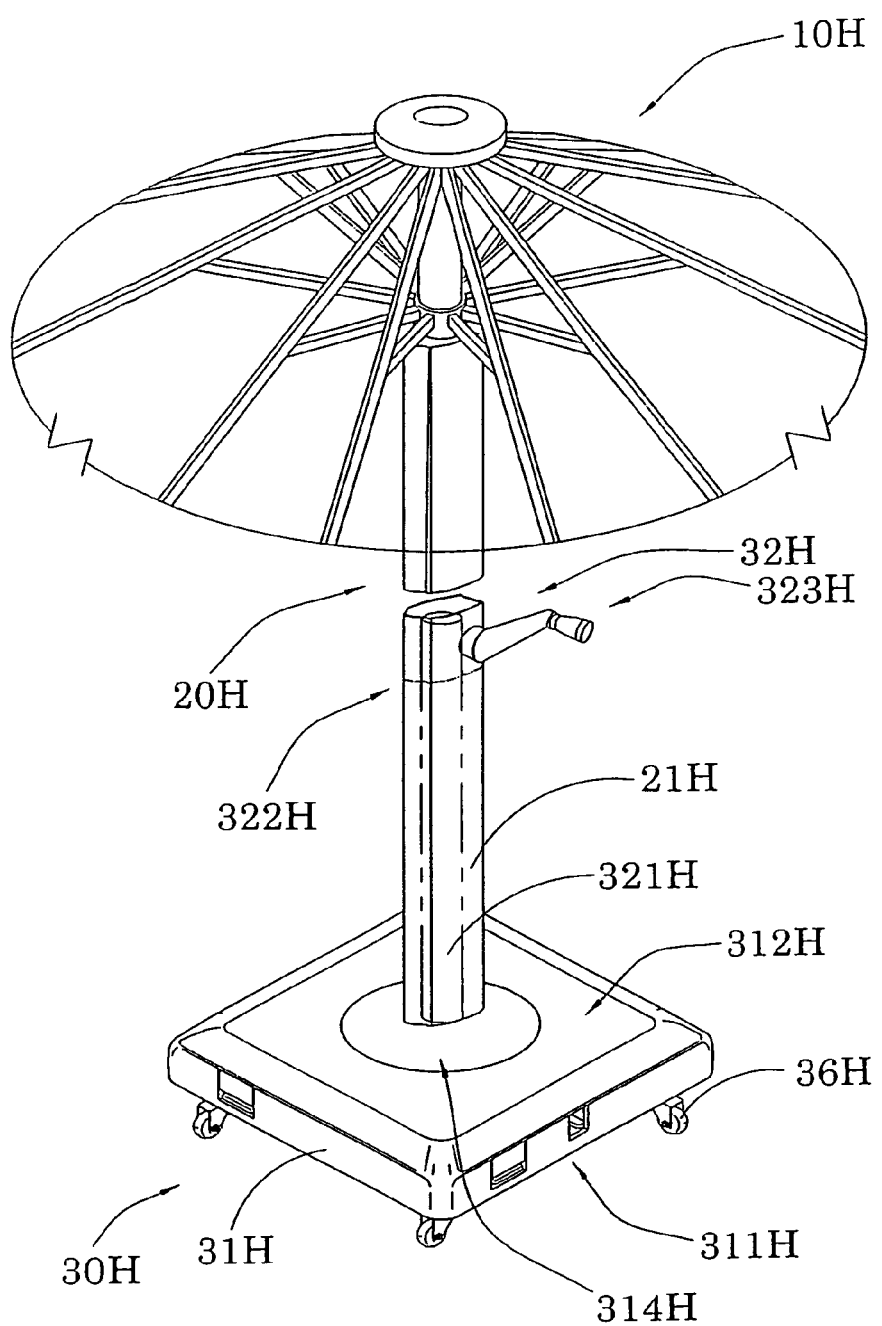
FIG. 20 is a perspective view of an outdoor umbrella according to a seventh preferred embodiment of the present invention.
Figure 21:
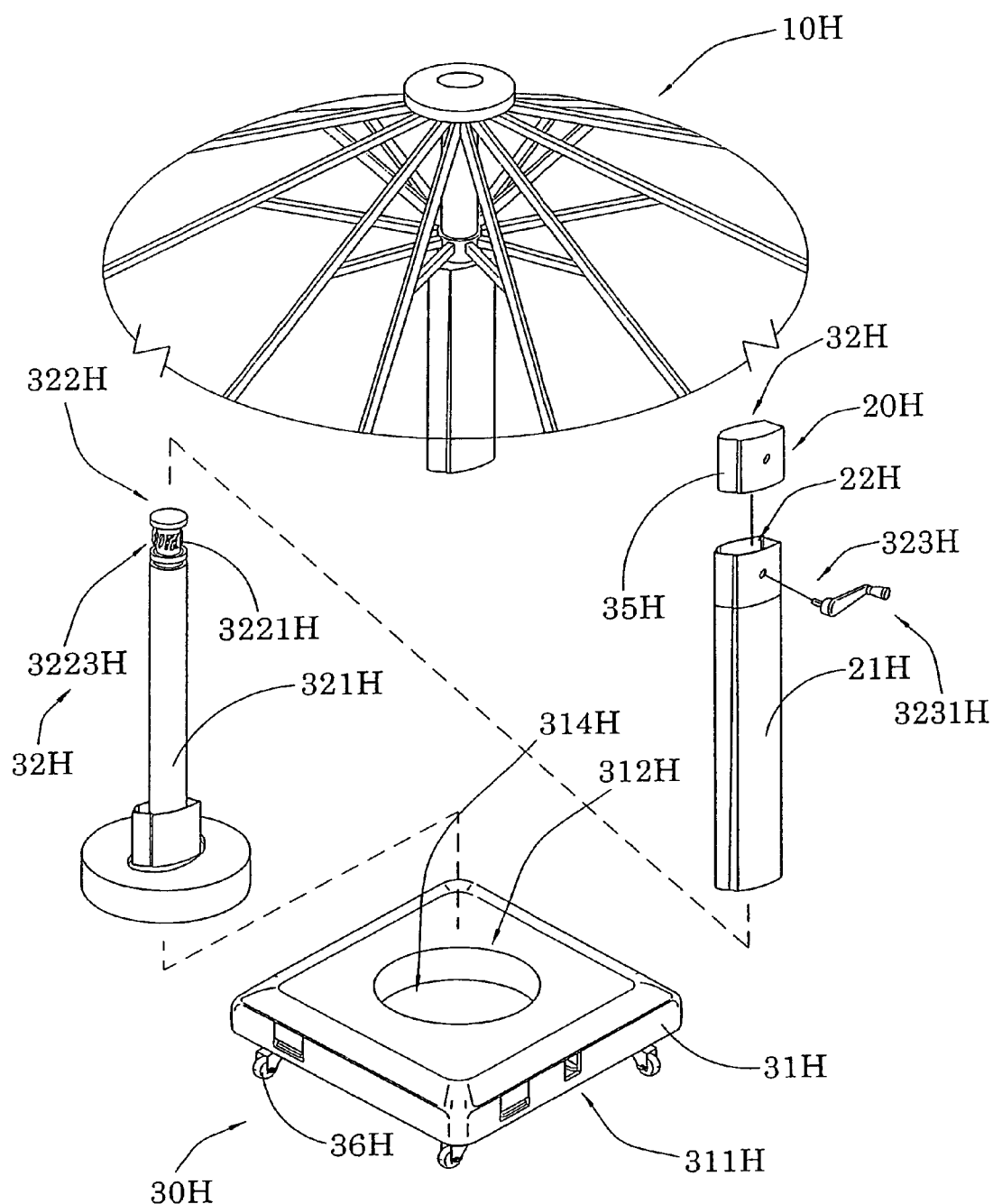
FIG. 21 is an exploded perspective view of an outdoor umbrella according to the above seventh preferred embodiment of the present invention.
Figure 22:
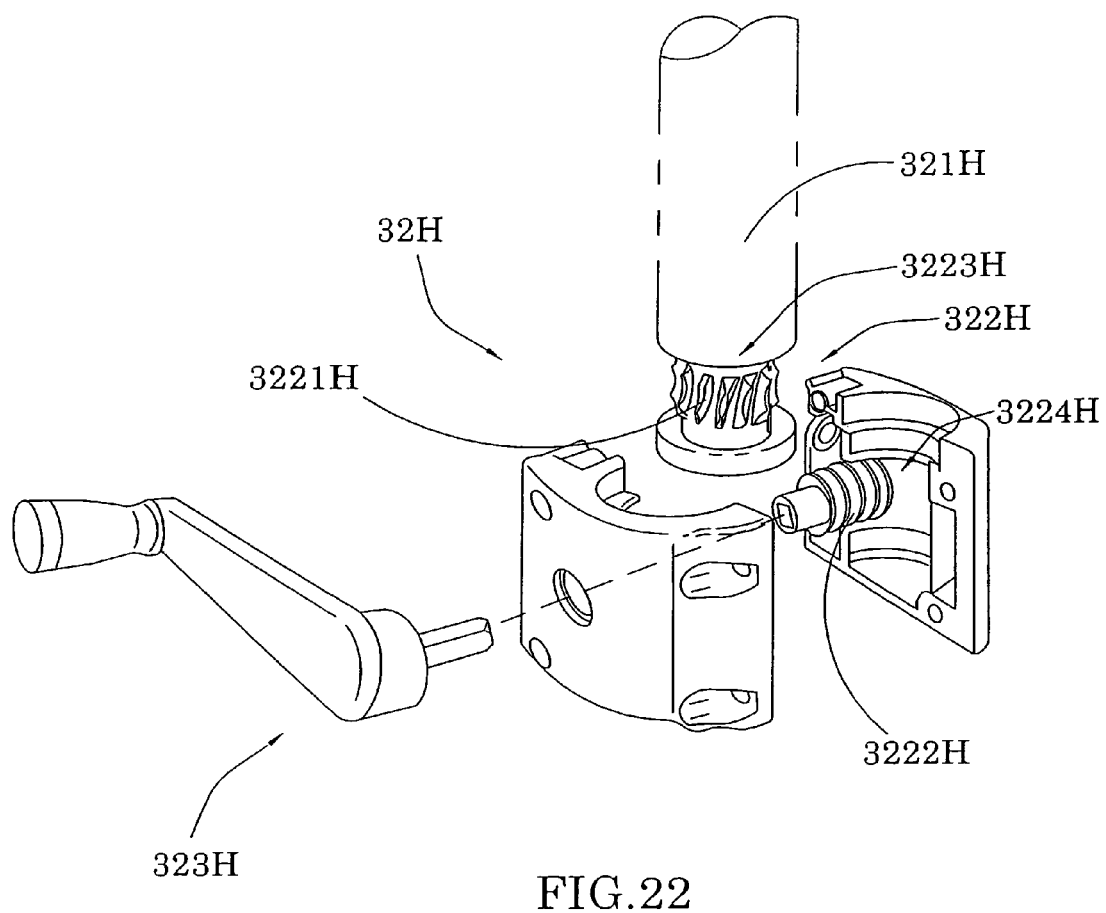
FIG. 22 is a schematic view of the outdoor umbrella according to the above seventh preferred embodiment of the present invention.

Referring to FIG. 20 to FIG. 22 of the drawings, an outdoor umbrella according to a seventh preferred embodiment of the present invention is illustrated, in which the outdoor umbrella comprises an awning frame 10H, a supporting shaft 20H, and an adjustable rotation base 30H.

The supporting shaft 20H is arranged to support the awning frame 10H, wherein the supporting shaft 20H comprises a rotatable shaft body 21H having a hollow structure to define a shaft cavity 2211 therein.

On the other hand, the adjustable rotation base 30H comprises a base housing 31H, and a rotation arrangement 32H.

The base housing 31H is arranged to couple with the supporting shaft 20H to support the awning frame 10H in an upright manner.

The rotation arrangement 32H comprises a base shaft 321H, an engaging head 322H, and an actuation unit 323H. The base shaft 321H is upwardly extended from the base housing 31H, and is arranged to be received in the shaft cavity 22H of the rotatable shaft body 21H.

The engaging head 322H is received in the shaft cavity 22H of the rotatable shaft body 21H, and comprises a plurality of first engaging teeth 3221H formed on the base shaft 321H, and a plurality of second engaging teeth 3222H formed on a sidewall of the shaft cavity 22H of the rotatable shaft body 21H for engaging with the first engaging teeth 3221H.

The actuation unit 323H is extended from the engaging head 322H in such a manner that when the actuation unit 323H is actuated, the second engaging teeth 3222H is adjustably driven to rotate with respective to the first engaging teeth 3221H, so as to impart a controlled relative rotational movement between the rotatable shaft body 21H and the base shaft 321H for allowing the supporting shaft 20H to rotate with respective to the adjustable rotation base 30H. As such, the orientation of the supporting shaft and the awning frame 10H can be freely and controllably adjusted.

According to the seventh preferred embodiment of the present invention, and awning frame 10H is a typical awning frame of a typical outdoor umbrella, which may includes a central hub and a plurality of an awning ribs radially and outwardly extended from the central hub for supporting an awning fabric on the awning ribs.

The base housing 31H has a bottom side 311H, an upper side 312H for coupling with the supporting shaft 20H to support the outdoor umbrella in an upright manner, and a receiving cavity formed within the base housing 31H. Moreover, the base housing 31H further has a through slot 314H formed on the upper side 312H for allowing the rotatably shaft body 21H to rotatably coupled with the base shaft 321H and the base housing 31H through the through slot 314H.

The engaging head 322H comprises a first gear unit 3223H mounted on top of the base shaft 321H, wherein the first engaging teeth 3221H is formed as the teeth of the first gear unit 3223H for engaging with the second engaging teeth 3222H. Note that the first gear unit 3223H is mounted on a top portion of the base shaft 321H in a stationary manner. As a result, the first engaging teeth 3221H is therefore also stationary. When a rotation force is applied to the first gear unit 3223H, the object from which the rotational force applies would be rotated in reverse direction as a result of action and reaction under simple physics theory.

On the other hand, the engaging head 322H further comprises a second gear unit 3224H provided within the shaft cavity 22H of the rotatable shaft body 21H, wherein the second engaging teeth 3222H is formed as the teeth of the second gear unit 3224H. The second gear unit 3224H is provided in the shaft cavity 22H at a position aligning with the first gear unit 3223H via a gear housing 35H so that the first gear unit 3223H is normally engaged to the second gear unit 3224H. As a result, when the second gear unit 3224H is driven to rotate, the rotational movement will be transferred to the first gear unit 3223H, which is stationary whatsoever. Then, the theory of action and the reaction makes the second gear unit 3224H to rotate, wherein the rotational speed and the extent of rotation is directly corresponding to the manner in which the second gear unit 3224H is actuated.

The actuation unit 323H according to this seventh preferred embodiment may take a wide variety of different alternatives. The goal is to actuate the second gear unit 3224H for produce a relative motion between the first gear unit 3223H and the second gear unit 3224H. As such, the actuation unit 323H can be designed for use with a user's hand or a user's foot.

Referring to FIG. 20 to FIG. 22 of the drawings, the actuation unit 323H comprises an actuating handle 3231H rotatably connected with the second gear unit 3224H for driving the second gear unit 3224H to rotate about a transverse axis of the base shaft 321H. In this particular embodiment, the first and the second gear unit 3223H, 3224H form a worm and wheel set gear unit for transforming driving force through 90°. In other words, a rotational movement of the second gear unit 3224H about a transverse axis would impart a rotational force on the part of the first gear unit 3223H, which is stationary. The theory of action and reaction allows the rotational force to be transferred to the rotatable shaft body 21H, rendering rotational movement on the part of the rotatable shaft 21H about its longitudinal axis.

The adjustable rotation base further comprises a plurality of transportation wheels rotatably provided at a bottom side 311H of the base housing 31H so as to facilitate easy transportation of the adjustable rotation base.

Figure 23:
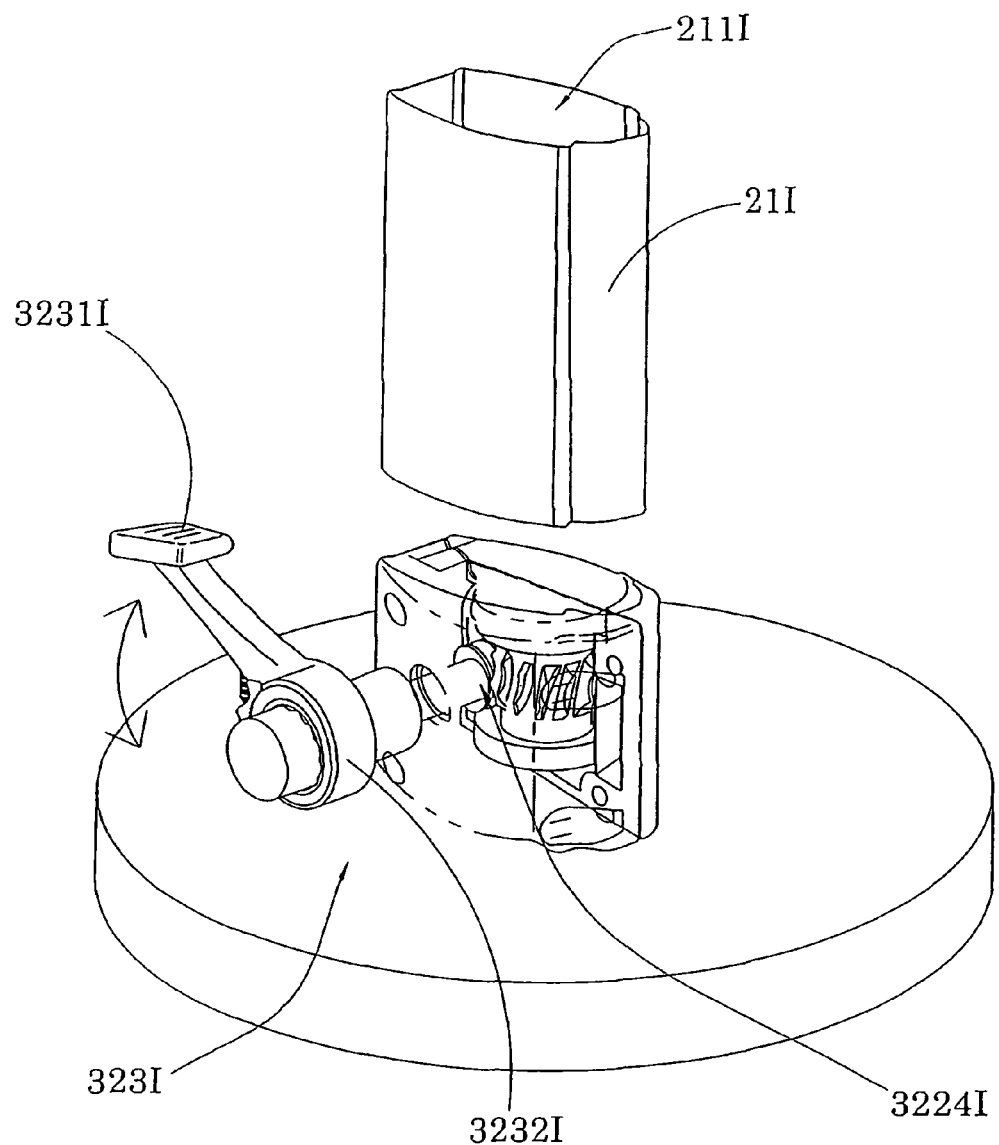
FIG. 23 is an alternative mode of the outdoor umbrella according to the above seventh preferred embodiment of the present invention.

As an alternative mode (FIG. 23), the actuating unit 323I comprises an actuating pedal 3231I extended out of the rotatable shaft 21I and pivotally connected with respective to the rotatable shaft 21I, and a unidirectional gear unit 3232I connecting between the actuating pedal 3231I and the second gear unit 3224I, wherein the unidirectional gear unit 3232I is arranged to transform a downward pivotal movement to a transverse rotational movement of the second gear unit 3224I while stalling the transfer of movement from the actuating pedal 3231I to the second gear unit 3224I while the pedal is moving in an upward pivotal movement. When the actuating pedal 3231I is stepped on by the user, the downward pivotal motion thereof will drive the second gear unit 3232I to rotate at the transverse axis of the rotatable shaft 21I, so as to impart a rotational movement to the rotatable shaft 21I in the same manner described above.

Figure 24:
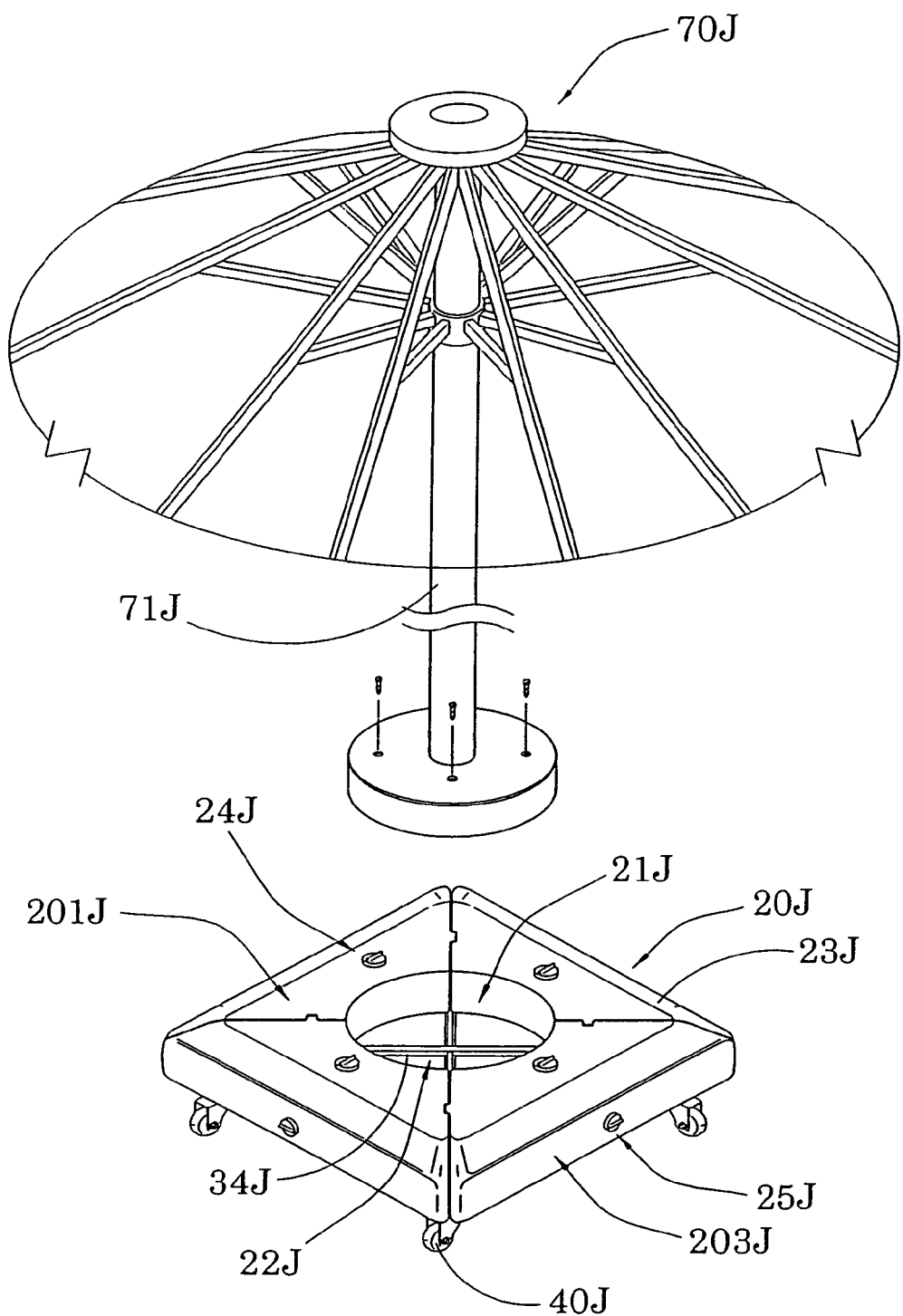
FIG. 24 is a perspective view of an outdoor umbrella having a base structure according to an eighth preferred embodiment of the present invention.
Figure 25:
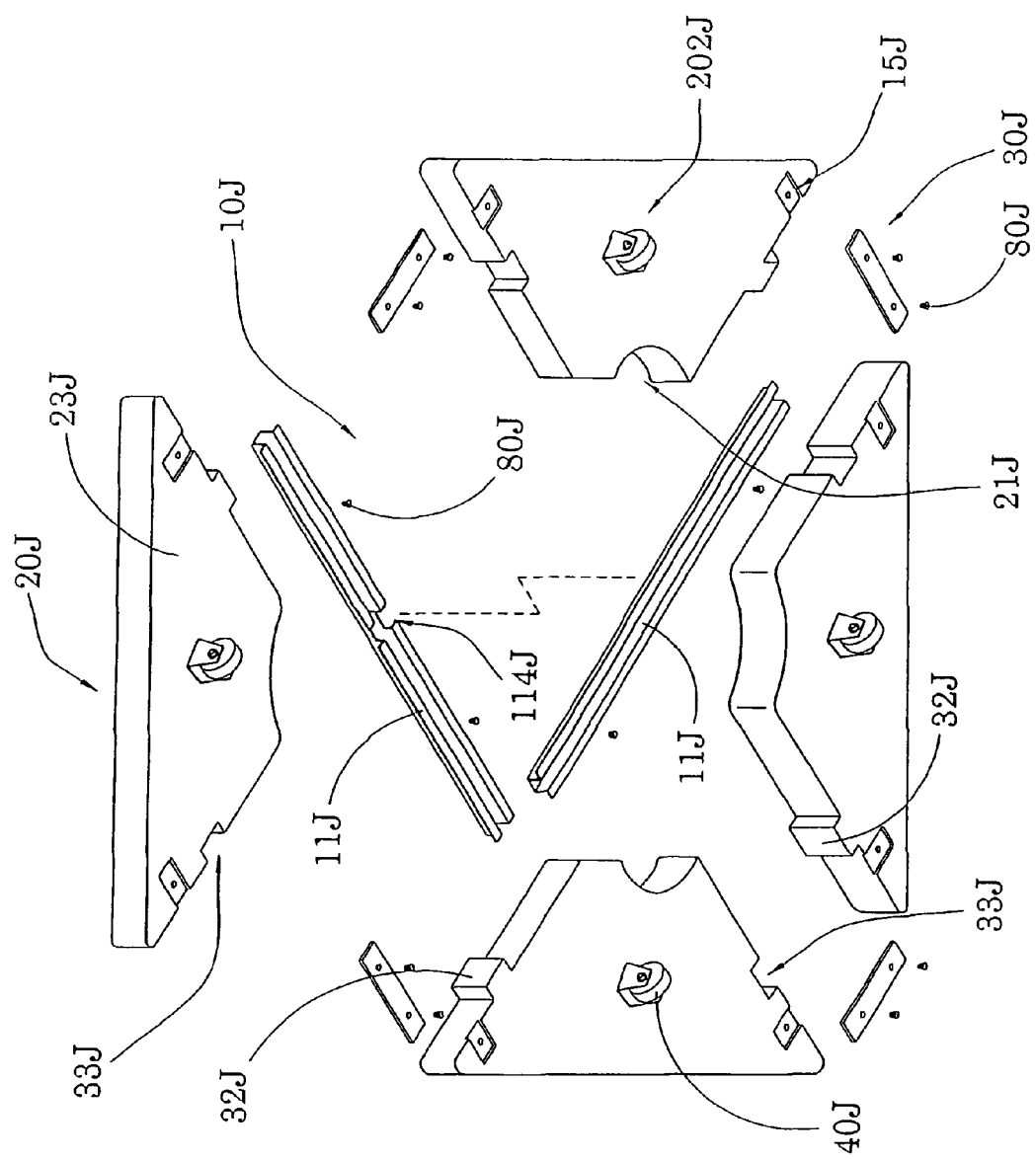
FIG. 25 is a perspective view of an outdoor umbrella having a base structure according to the above eighth preferred embodiment of the present invention.
Figure 26:
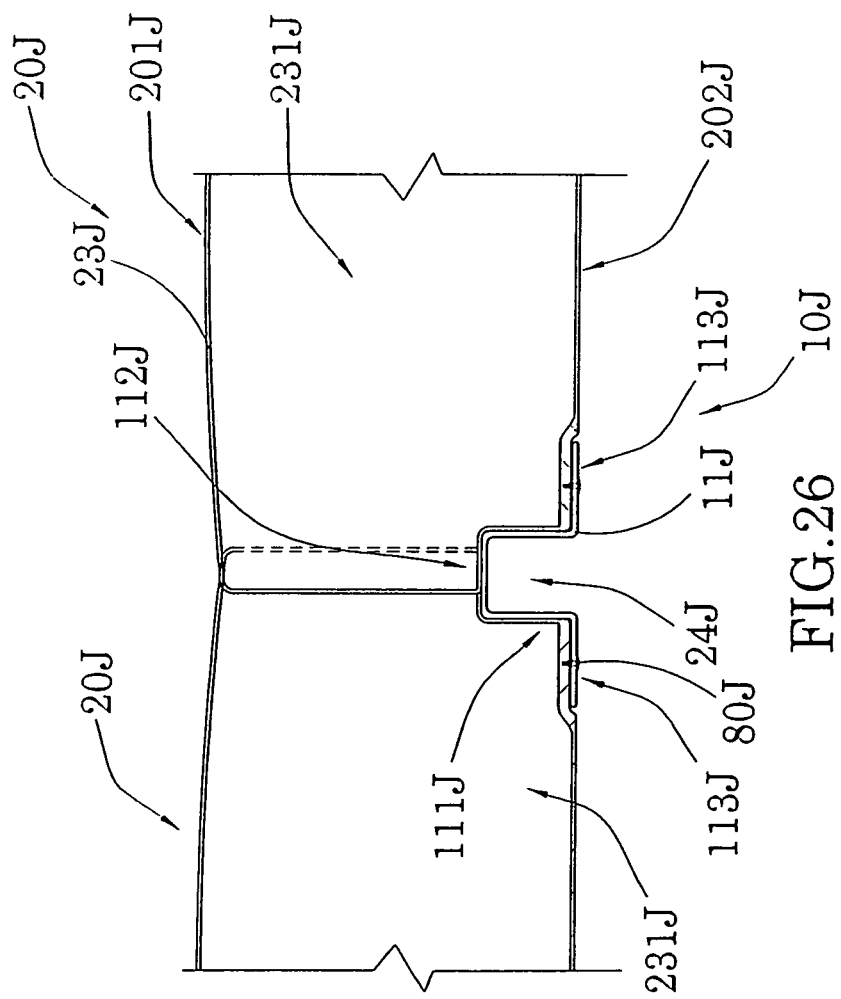
FIG. 26 is a perspective view of an outdoor umbrella having a base structure according to the above eighth preferred embodiment of the present invention.

Referring to FIG. 24 to FIG. 26 of the drawings, a base structure for supporting an outdoor umbrella 70J having a supporting post 71J according to an eighth preferred embodiment of the present invention is illustrated, in which the base structure comprises a base frame 10J, a plurality of base housings 20J, and a reinforcing arrangement 30J.

Each of the plurality of base housings 20J is adapted for being filled with a predetermined mass medium, such as water or sand, for substantially increasing a weight and a density of the respective base housing 20J, wherein each of the base housings 20J is detachably connected with the base frame 10J and with an adjacent base housing 20J so as to allow a user to conveniently assemble and disassemble the base housings 20J for forming the base structure. In other words, when the base housings 20J are fully filled with the mass medium, the base housings 20J would have substantial weight for providing a secure base support for the outdoor umbrella extended from the base structure of the present invention.

Moreover, each of the base housings 20J has a receiving cavity 21J formed on a corresponding position of the base housing in such a manner that when the base housings 20J are assembled to form the base structure, the receiving cavities 21J of the base housings 20J form a support cavity 22J, wherein the supporting post 71J of the outdoor umbrella 70J is adapted for being detachably received and supported in the support cavity 22J so as to be securely supported by the base housings 20J filled with the mass medium, such as water or sand. Moreover, the reinforcing arrangement 30J connects the base housings 20J for reinforcing a structural integrity of the base structure for the outdoor umbrella 70J.

According to the eighth embodiment of the present invention, each of the base housings 20J comprises a housing body 23J having a filler cavity 231J formed therein, wherein the housing body 23J has a substantially hollow triangular structure for allowing the mass medium to be filled into the filler cavity 231J. Thus, each of the base housings 20J further comprises a filler inlet 24J formed on the housing body 23J to communicate the filler cavity 231J with an exterior of the housing body 23J so as to allow a user to fill the mass medium into the filler cavity 231J through the filler inlet 24J. Obviously, the mass medium filled into the filler cavity 231J is allowed to be offloaded from the filler cavity 231J through a filler outlet 25J. As shown in FIG. 24 to FIG. 25 of the drawings, each of the base housings 20J has a top surface 201J, a bottom surface 202J, and a plurality of side surfaces 203J for forming a substantially three-dimensional structure having the triangular cross section. According to this particular preferred embodiment, the filler inlet 24J of each of the base housings 20J is formed on the top surface 201J for allowing the user to fill the mass medium via the filler inlet 24J. On the other hand, the filler outlet 25J is provided on one of the side surfaces 203J of the corresponding base housing 20J for allowing the mass medium to be drained out of the filler cavity 231J.

The base frame 10J comprises a plurality of elongated frame members 11J connected with each other to form a secure frame structure for accommodating the base housings 20J. In this particular embodiment of the present invention, each of the frame members 11J has a predetermined cross section to define at least one frame platform 111J for engaging with the respective base housing 20J. As shown in FIG. 26 of the drawings, each of the frame members 11J has an elongated mid portion 112J and two elongated side portions 113J having L-shaped cross section for defining the frame platform 111J.

Each of the base housings 20J further has an elongated engaging slot 24J indently formed on the bottom surface 202J of the base housing, wherein a width of the engaging slot 24J corresponding with a width of the elongated mid portion 112J of the corresponding frame member 11J, so that the frame member 11J is capable of being fittedly received in the engaging slot 24J while the two elongated side portions 113J of the frame member 11J are extended to bias against the bottom surface 202J of the respective base housing 20J in the vicinity of the engaging slot 24J. A plurality of connectors 80J can be used for fastening the frame member 11J to the base housing 20J within the engaging slot 24J.

Note that a thickness of the bottom surface 202J of each of the base housings 20J is substantially increased at the positions where the connectors 80J are fastened so as to prevent the fastening procedure from breaking the respective base housing 20J and leakage of the mass medium through the punctured area caused by the connectors 80J.

According to this particular embodiment of the present invention, the base frame 10J comprises two frame members 11J arranged to have a predetermined angle of inclination of 90° so as to define a cross structure. In order to allow fit engagement between the two frame members 11J, one of the frame members 11J further has a through slot 114J formed thereon wherein the other frame member 11J is allowed to pass through the through slot 114J for forming the predetermined angle of inclination between the two frame members 11J. When the frame members 11J are connected with the base housings 20J, the base housings 20J are grouped and substantially reinforced to support the supporting post 71J of the outdoor umbrella 70J.

The reinforcing arrangement 30J comprises a plurality of reinforcing members 31J provided on the bottom surfaces 202J of the base housings 20J, wherein each of the reinforcing members 31J is connected across a boundary of each two adjacent base housings 20J so as to substantially restrict any collateral movement between each two adjacent base housings 20J. Accordingly, each of the base housing 20J further has a plurality of reinforcing slots 15J indently and spacedly formed on the bottom surface 202J, wherein the reinforcing slot 15J of each of the base housings 20J is aligned with a corresponding reinforcing slot 15J of an adjacent base housing so that when the base housings 20J are connected to the base frame 10J, the aligned reinforcing slots 15J of each two base housings 20J is arranged to be fittedly connected with a reinforcing member 31J so as to allow the reinforcing member 31J to connect across a boundary of each two adjacent base housings 20J.

A plurality of connectors 80J is used to connect the reinforcing members 31J to the base housings 20J. Thus, a thickness of the bottom surface 202J of each of the base housings 20J is also substantially increased at the positions where the connectors 80J are fastened so as to prevent the fastening procedure from breaking the respective base housing 20J and leakage of the mass medium through the punctured area caused by the connectors 80J.

The reinforcing arrangement 30J further comprises a plurality of engagement teeth 32J formed on each of the base housings 20J, and contains a plurality of engagement slots 33J indently formed on the base housings 20J at a position aligning with the engagement teeth 32J of the adjacent base housing 20J, so that when the base housing 20J are connected by the base frame 10J, each of the engagement teeth 32J is arranged to securely engage with the corresponding engagement slot 33J for further restricting a collateral movement between two adjacent base housings 22J.

Furthermore, the reinforcing arrangement 30J further comprises a plurality of supporting members 34J spacedly provided at the support cavity 22J so as to support the supporting post 71J of the outdoor umbrella 70J at the support cavity 22J.

The base structure of the present invention further comprises a plurality of wheels 40J rotatably provided at bottom side of the base housings 20J for allowing easy transportation of the base structure. The wheels 40J can be connected with the base frame 10J or the bottom surfaces 202J of the base housings 20J for rotatably supporting the base structure.

Figure 27:
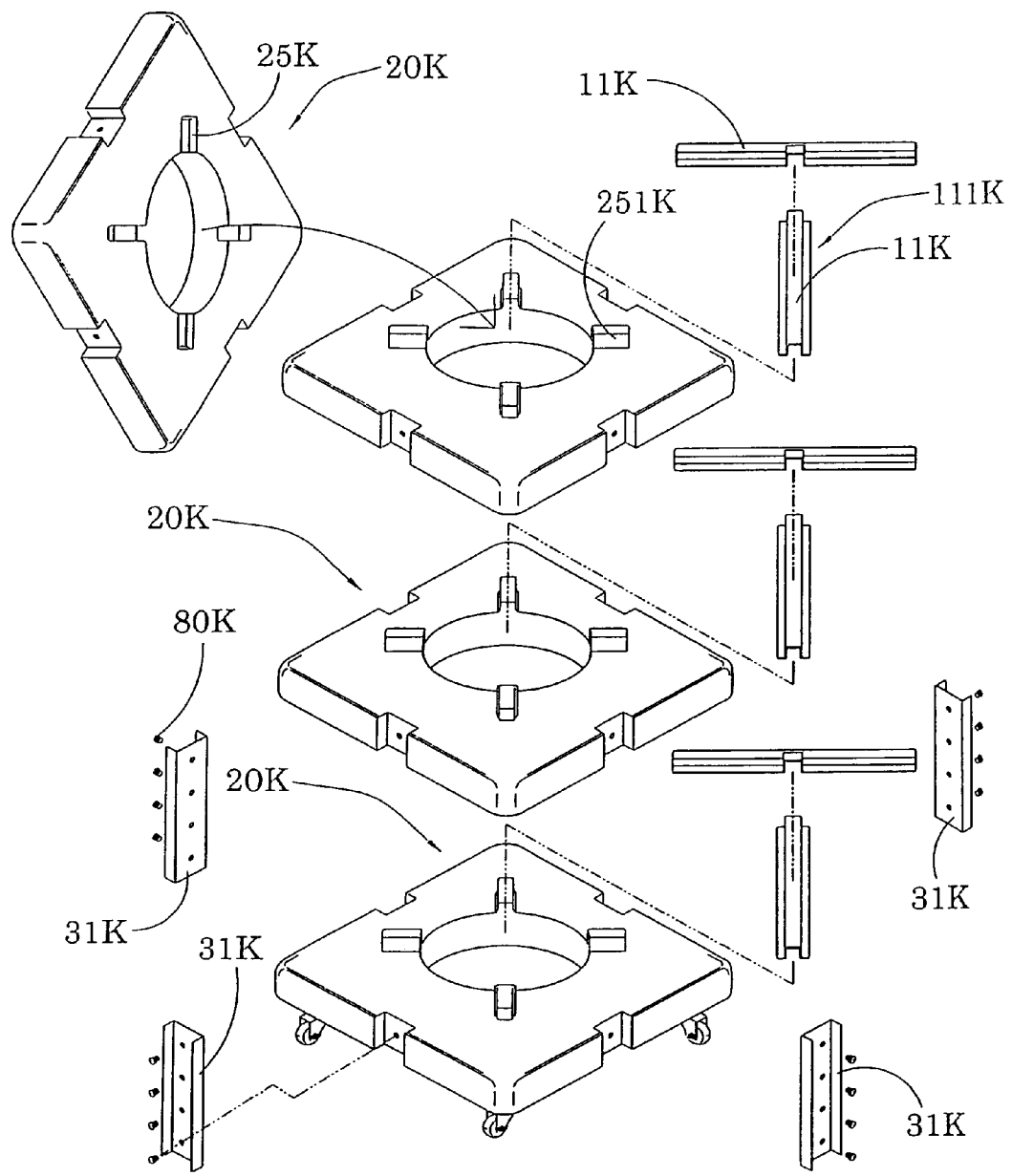
FIG. 27 is an alternative mode of an outdoor umbrella having a base structure according to the above eighth preferred embodiment of the present invention.

Referring to FIG. 27 of the drawings, an alternative mode of the base structure according to the above seventh preferred embodiment of the present invention is illustrated. According to the alternative mode to the eighth preferred embodiment of the present invention, each (except one at the bottom) of the base housings 20K is put on top of another base housing 20K so as to form a stack of base housings 20K, wherein the base frame 10K comprises a plurality of frame members 11K provided between each two adjacent base housings 20K so as to support the base housings 20K to form the base structure having sufficient strength and weight to support the outdoor umbrella 70J. The frame members 11K provided between each two adjacent base housings 20K are conveniently grouped as forming a divider frame 111K, so that the base frame 10K comprises a plurality of divider frames 111K each of which formed by a predetermined number of frame members 11K for providing support between each two base housings 20K.

In this particular alternative mode, each of the base housing 20K has a top surface 201K, a bottom surface 202K, and a plurality of side surfaces 203K for forming a substantially three-dimensional structure having a quadrilateral cross section (such as a rectangular cross section). Each of the base housing 20K has a plurality of connecting slots 25K indently formed on the bottom surface 202K of the base housing 201, wherein a corresponding number of frame members 11K is connected on the top surface 201K of the base housing 20K at a corresponding protrusion 251K which is right below the base housing 20K having the connecting slots 25K at positions aligning therewith, so that the frame members 11K are arranged to be partially received into the corresponding connecting slots 25K for connecting the two corresponding base housings 20K via the divider frame 111K. As such, each two of the base housings 20K are connected in the similar fashion for forming a stack of base housings 20K for supporting the outdoor umbrella 70J.

A plurality of connectors 80K are used to connect the frame members 11K with the base housings 20K. A thickness of the bottom surface 202K and top surface 201K of each of the base housings 20K is also substantially increased at the positions where the connectors 80K are fastened so as to prevent the fastening procedure from breaking the respective base housing 20K and leakage of the mass medium through the punctured area caused by the connectors 80K.

The reinforcing arrangement 30K comprises a plurality of reinforcing members 31K provided on the side surfaces 203K of the base housings 20K, wherein each of the reinforcing members 31K is connected across a boundary of each two vertically adjacent base housings 20K so as to substantially restrict any collateral movement between each two adjacent base housings 20K.

Figure 28:
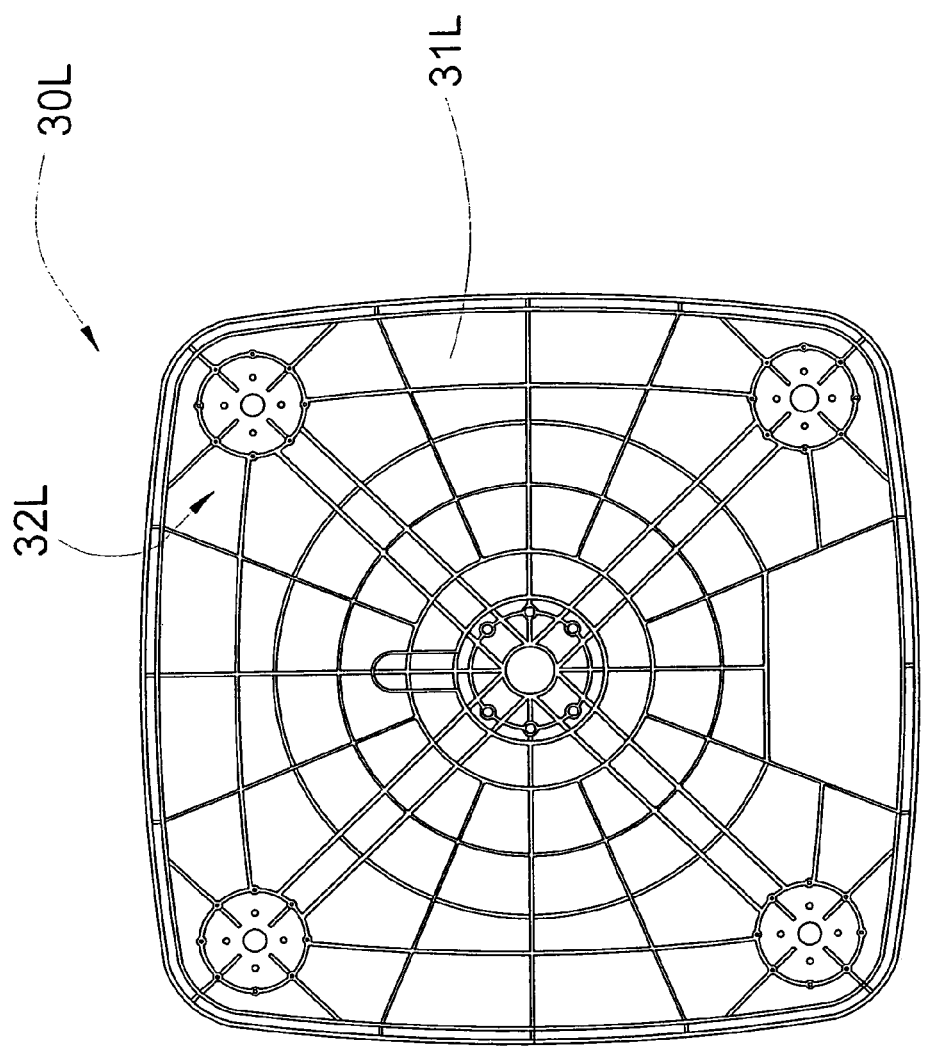
FIG. 28 is a schematic diagram of an outdoor umbrella having an adjustable rotation base according to a ninth preferred embodiment of the present invention.
Figure 29:
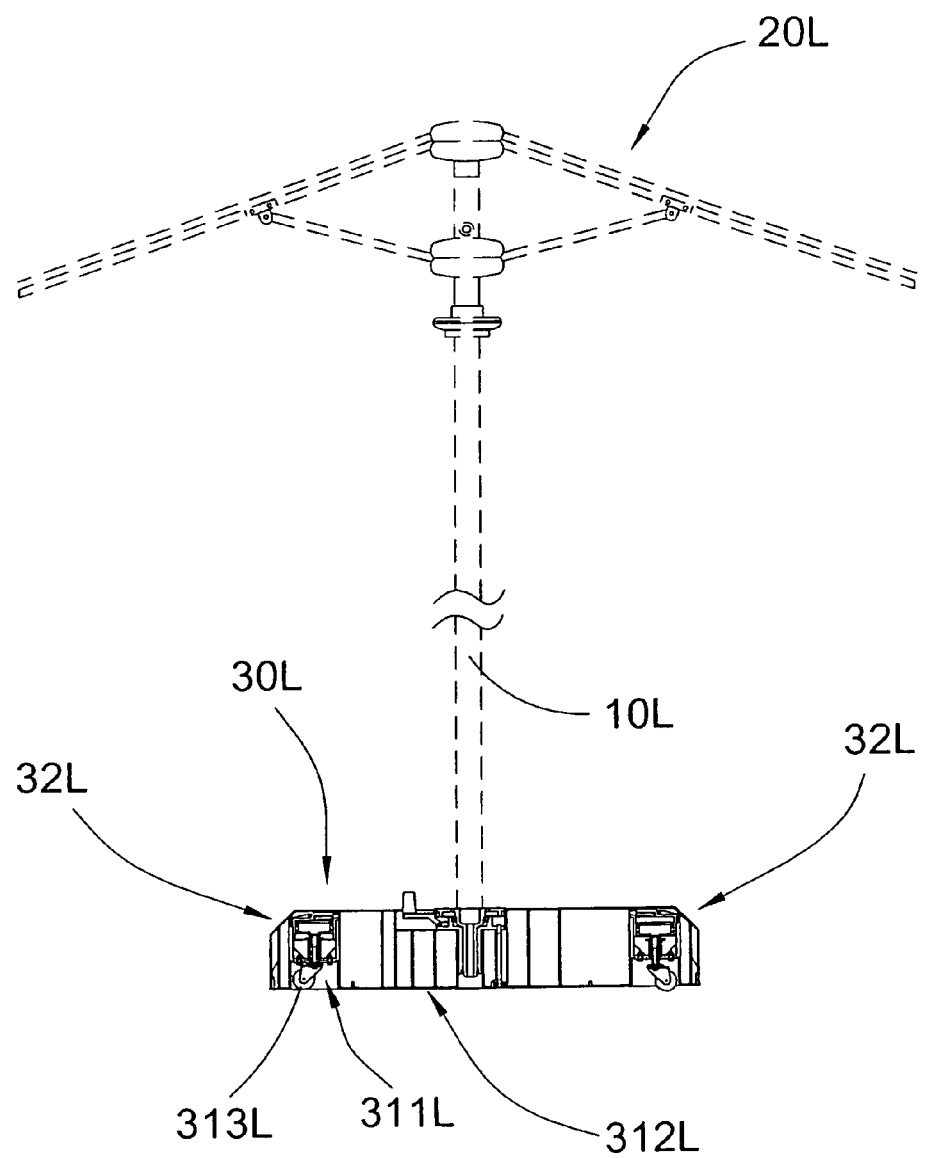
FIG. 29 is a sectional side view of an adjustable rotation base according to the above ninth preferred embodiment of the present invention.
Figure 30:
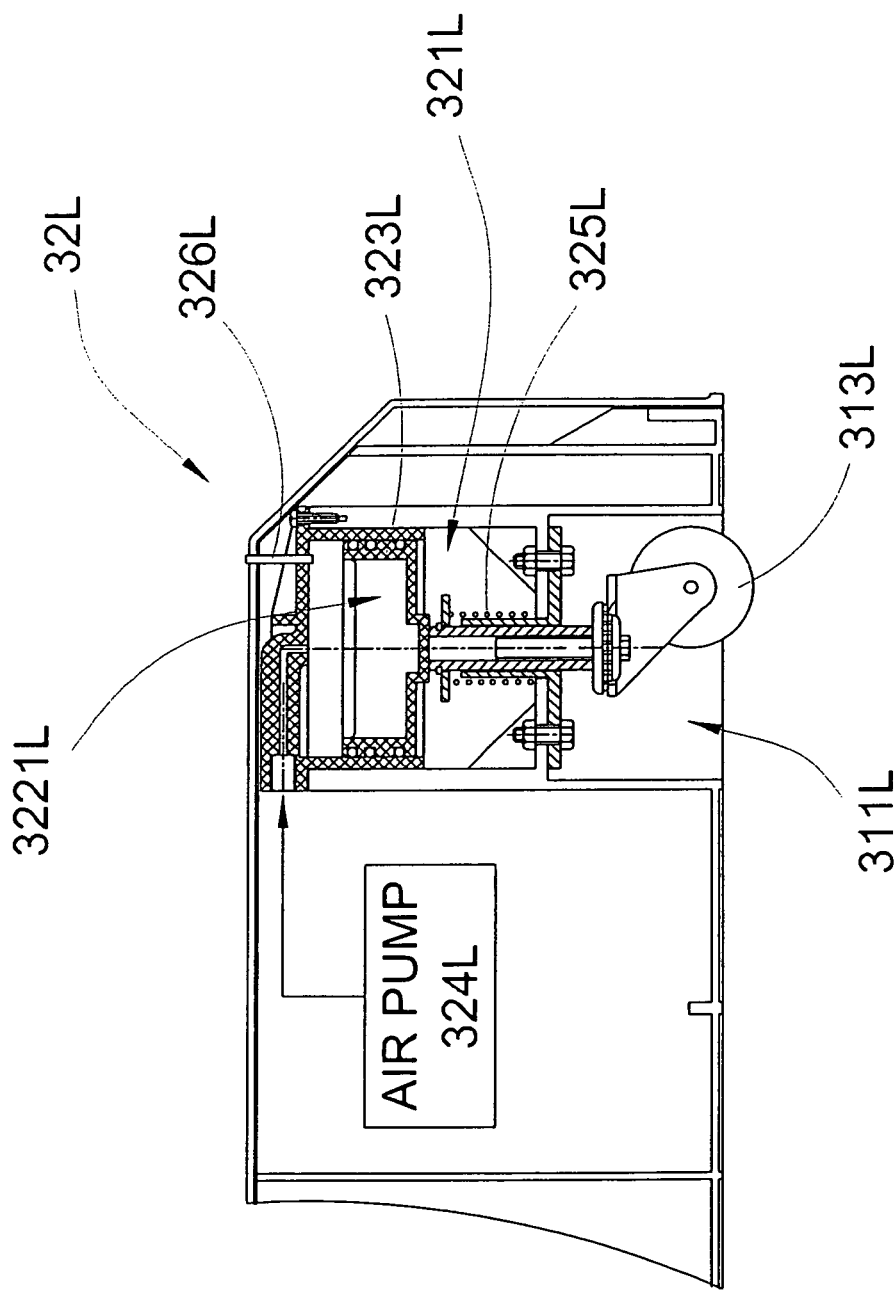
FIG. 30 is a sectional side view of the transportation arrangement according to the above ninth preferred embodiment of the present invention.

Referring to FIG. 28 to FIG. 30 of the drawings, an outdoor umbrella according to a ninth preferred embodiment of the present invention is illustrated. The ninth preferred embodiment is similar to the first preferred embodiment except the adjustable rotation base. According to the ninth preferred embodiment, the outdoor umbrella comprises an awning frame 10L, a supporting shaft 20L supporting the awning frame 10, and an adjustable rotation base 30L, which comprises a base housing 31L and a transportation arrangement 32L. The base housing 31L has a receiving cavity 311L and a bottom edge 312L, arranged to couple with the supporting shaft 20L to support the awning frame 10L in an upright manner, and comprises a plurality of transferring wheels 313L.

On the other hand, the transportation arrangement 32L is provided at the base housing 31L to operate the base housing 31L between an idle mode and a transportation mode, wherein in the idle mode, the transferring wheels 313L are suspendedly lifted up to position above the bottom edge 312L of the base housing 31L for defining a clearance between the transferring wheels 313L and the ground surface such the base housing 31L is sat on the ground surface in a stationary manner. In the transportation mode, the base housing 31L is lifted up by air pressure for allowing the transferring wheels 313L to move out of the receiving cavity 311L at a position below the bottom edge of the base housing 31L for allowing the transferring wheels 313L to rotatably sit on a ground surface to freely transport the outdoor umbrella along the ground surface.

The transportation arrangement 32L further comprises a plurality of actuation units 321L provided at four corner portions of the base housing 31L for selectively operating the base housing 31L between the transportation mode and the idle mode. More specifically, each of the actuation unit 321L is arranged to couple between the base housing at the corresponding corner portion and the corresponding transferring wheel 313L.

The actuation unit 321L comprises a driving member 323L, having an actuation cavity 3221L, movably received in the base housing 31L and operatively coupled with the corresponding transferring wheel 313L, in such a manner that when the driving member 323L is driven to move downwardly, the corresponding transferring wheel 313L is also driven to move downwardly. Since the driving member 323L is connected to the base housing 31L, the downward force exerted by the driving member 323L and the transferring wheel 313L is reacted (by simple physics theory) as an upward force exerted to the base housing 31L so as to uplift the base housing 31L to create a clearance between the bottom edge 311L of the base housing 31L and the ground on which the transferring wheel 313L rests. The result is that the base housing 31L is uplift at a predetermined elevation and the transferring wheel 313L is free to transport the outdoor umbrella to a predetermined location. This brings the base housing 31L to operate in the transportation mode.

The transportation arrangement 32L further comprises at least one air pump 324L (preferably four) provided on the base housing 31L for allowing a user to pump air 324L to the actuation cavity 3221L. The air pump 324L can be operated to pump air into the actuation cavity 3221L in such a manner that when the actuation cavity 3221L fills with air, the driving member 323L is subject to air pressure and is driven to depress (i.e. moving downwardly) with respect to the base housing 31L.

Each of the actuation units 321L further comprises a resilient element 325L mounted between the transferring wheel 313L and the driving member 323L for normally exerting an upward urging force to the driving member 323L. As such, when the air pressure inside the actuation cavity 3221L decreases, the resilient element 325L pushes the driving member 323L in the upward direction with respect to the base housing 31L. Accordingly, the actuation unit 321L further comprises an air release valve 326L provided in the base housing 31L for communicating the actuation cavity 3221L with ambient atmosphere. When the air release valve 326L is opened, the air trapped within the actuation cavity 3221L will release through the air release valve 326L and the air pressure within the actuation cavity 3221L decreases.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A base for an outdoor umbrella which comprises a supporting shaft, comprising: a base housing having a bottom side, an upper side for coupling with said supporting shaft to support said outdoor umbrella in an upright manner; a plurality of transportation wheels spacedly provided at said base housing; and a transportation arrangement provided at said base housing to operate said base between an idle position and a transportation position, wherein at said idle position, said bottom side of said base housing is arranged for standing on a ground surface, wherein at said transportation position, said transportation wheels are concurrently reached said ground surface and are located below said bottom side of said base housing such that said transportation wheels reach said ground surface for transporting said outdoor umbrella, wherein said transportation arrangement comprises a driving unit provided in said base housing to uplift said base housing at a predetermined elevation until said transportation wheels are located below said bottom side of said base housing, wherein said driving unit comprises an adjustment assembly provided in said base housing for incrementally lowering said transportation wheels and a manual actuation unit operatively coupled with said adjustment assembly for allowing a user to actuate said adjustment assembly to uplift said base housing, wherein said manual actuation unit comprises a handle member operatively linked to said adjustment assembly for allowing the user rotating said handle member to actuate said adjustment assembly, wherein when said handle member is rotated, said base housing is uplifted, wherein said adjustment assembly comprises a gear structure operatively coupled with said transportation wheels, wherein when said handle member is rotated, said transportation wheels is are concurrently lowered through said gear structure and said base housing is uplifted afterwards.

2. A base for an outdoor umbrella which comprises a supporting shaft, comprising: a base housing having a bottom side, an upper side for coupling with said supporting shaft to support said outdoor umbrella in an upright manner; a plurality of transportation wheels spacedly provided at said base housing; and a transportation arrangement provided at said base housing to operate said base between an idle position and a transportation position, wherein at said idle position, said bottom side of said base housing is arranged for standing on a ground surface, wherein at said transportation position, said transportation wheels are concurrently reached said ground surface and are located below said bottom side of said base housing such that said transportation wheels reach said ground surface for transporting said outdoor umbrella, wherein said transportation arrangement comprises an adjustment assembly which comprises a central hub provided in said base housing and a plurality of levers radially extended from said central hub to couple with said transportation wheels, wherein said adjustment assembly further comprises a transferring magnitude angle gear slidably coupled with said central hub and arranged in such a manner that when said transferring magnitude angle gear is driven to rotate, said central hub is slid at said transferring magnitude angle gear to uplift said base housing.

* * * * *